United States Patent
Sato et al.

(10) Patent No.: US 6,748,446 B2
(45) Date of Patent: Jun. 8, 2004

(54) COMMUNICATION METHOD AND APPARATUS WITH MODIFICATION OF ROUTING PATH BY INTERMEDIATE RELAY APPARATUS

(75) Inventors: Hiroaki Sato, Kawasaki (JP); Hiroshi Okazaki, Yokohama (JP); Shigeo Suzuki, Yokohama (JP); Toshihiko Fukasawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/979,252

(22) Filed: Nov. 26, 1997

(65) Prior Publication Data

US 2001/0011301 A1 Aug. 2, 2001

(30) Foreign Application Priority Data

Nov. 29, 1996 (JP) .............................. 8-319895
Dec. 17, 1996 (JP) .............................. 8-336837

(51) Int. Cl.[7] .............................................. G06F 15/16
(52) U.S. Cl. ....................................................... 709/241
(58) Field of Search ................................ 709/225, 203, 709/216, 217, 218, 200, 219, 238, 239, 241, 242, 243, 244; 710/35

(56) References Cited

U.S. PATENT DOCUMENTS

| | | | | |
|---|---|---|---|---|
| 4,905,233 A | * | 2/1990 | Cain et al. .................... | 370/237 |
| 5,115,495 A | * | 5/1992 | Tsuchiya et al. ............. | 709/239 |
| 5,117,422 A | * | 5/1992 | Hauptschein et al. ........ | 370/255 |
| 5,222,242 A | * | 6/1993 | Choi et al. ................... | 709/227 |
| 5,224,205 A | * | 6/1993 | Dinkin et al. ................ | 709/226 |
| 5,295,154 A | * | 3/1994 | Meier et al. ................. | 370/351 |
| 5,317,566 A | * | 5/1994 | Joshi ........................... | 370/238 |
| 5,321,815 A | * | 6/1994 | Bartolanzo et al. .......... | 709/241 |
| 5,341,474 A | * | 8/1994 | Gelman et al. .............. | 709/219 |
| 5,355,371 A | * | 10/1994 | Auerbach et al. ............ | 370/255 |
| 5,583,994 A | * | 12/1996 | Rangan ....................... | 711/117 |
| 5,603,058 A | * | 2/1997 | Belknap et al. .............. | 710/35 |
| 5,604,868 A | * | 2/1997 | Komine et al. .............. | 709/238 |
| 5,671,377 A | * | 9/1997 | Bleidt et al. ................. | 345/328 |
| 5,673,031 A | * | 9/1997 | Meier ........................... | 340/2.4 |
| 5,751,968 A | * | 5/1998 | Cohen ......................... | 709/201 |
| 5,838,683 A | * | 11/1998 | Corley et al. ................ | 370/408 |
| 5,872,773 A | * | 2/1999 | Katzela et al. ............... | 370/256 |
| 5,898,456 A | * | 4/1999 | Wahl ............................ | 348/7 |
| 5,926,101 A | * | 7/1999 | Dasgupta ................. | 340/825.02 |
| 5,933,603 A | * | 8/1999 | Vahalia et al. ............... | 711/105 |
| 5,991,306 A | * | 11/1999 | Burns et al. ................. | 370/429 |

* cited by examiner

*Primary Examiner*—Dung C. Dinh
(74) *Attorney, Agent, or Firm*—Morgan & Finnegan, L.P.

(57) ABSTRACT

A communication apparatus, a communication system, and a communication method are provided for relaying and receiving data from an information source which presents data services such as video data services via a network such as Internet. With this configuration, the service data can be dynamically changed and a digest corresponding to such a change can be presented. Also with this configuration, a communication apparatus, a communication system, and a communication method are provided which are capable of reducing the load of the whole network and relaying and receiving data at high efficiency.

18 Claims, 41 Drawing Sheets

FIG. 6

STORAGE SETTING TABLE 311

| NO. | STORAGE STREAM 601 | ACCESS INTERVAL 602 | READING LENGTH 603 | SELF-CONTROL STORAGE 604 |
|---|---|---|---|---|
| 1 | 150.61.31.1 : 65301 : 1 | 3600 | 10 | TRUE |
| 2 | 150.61.22.10 : 65301 : 1 | 500 | 10 | TRUE |
| 3 | 150.61.31.122 : 65301 : 1 | 500 | 10 | TRUE |
| 99 | 0 | 500 | 10 | FALSE |

FIG. 7

DELIVERY MANAGEMENT TABLE (312)

| DELIVERY STREAM ID (701) | DELIVERED SIDE ID (702) | CONNECTION TIME COUNTER (703) | DIGEST (704) | DIGEST COUNTER (705) |
|---|---|---|---|---|
| 256 | 1 | 128 | FALSE | * |
| 33 | 3 | 211 | FALSE | * |
| 56 | -2 | 0 | FALSE | * |
| -1 | 33 | 223 | TRUE | 102 |
| | 15 | 0 | TRUE | 34 |
| | 12 | 0 | TRUE | 57 |
| | ... | | | |

FIG. 8

STORAGE MANAGEMENT TABLE (PART) 313

| STREAM NUMBER | CYCLE | READING LENGTH | STORAGE COUNTER | READING | SELF-CONTROL MODE |
|---|---|---|---|---|---|
| 1045 | 1000 | 10 | 569 | FALSE | FALSE |
| 123 | 500 | 10 | 9 | TRUE | TRUE |
| ... | | | | | |

FIG. 9

STREAM MANAGEMENT TABLE 314

| STREAM ID NUMBER | ADDRESS | PORT NUMBER | ID |
|---|---|---|---|
| 1 | 150.61.31.12 | 65011 | 1 |
| 2 | 150.61.22.2 | 65012 | 1 |
| ... | | | |

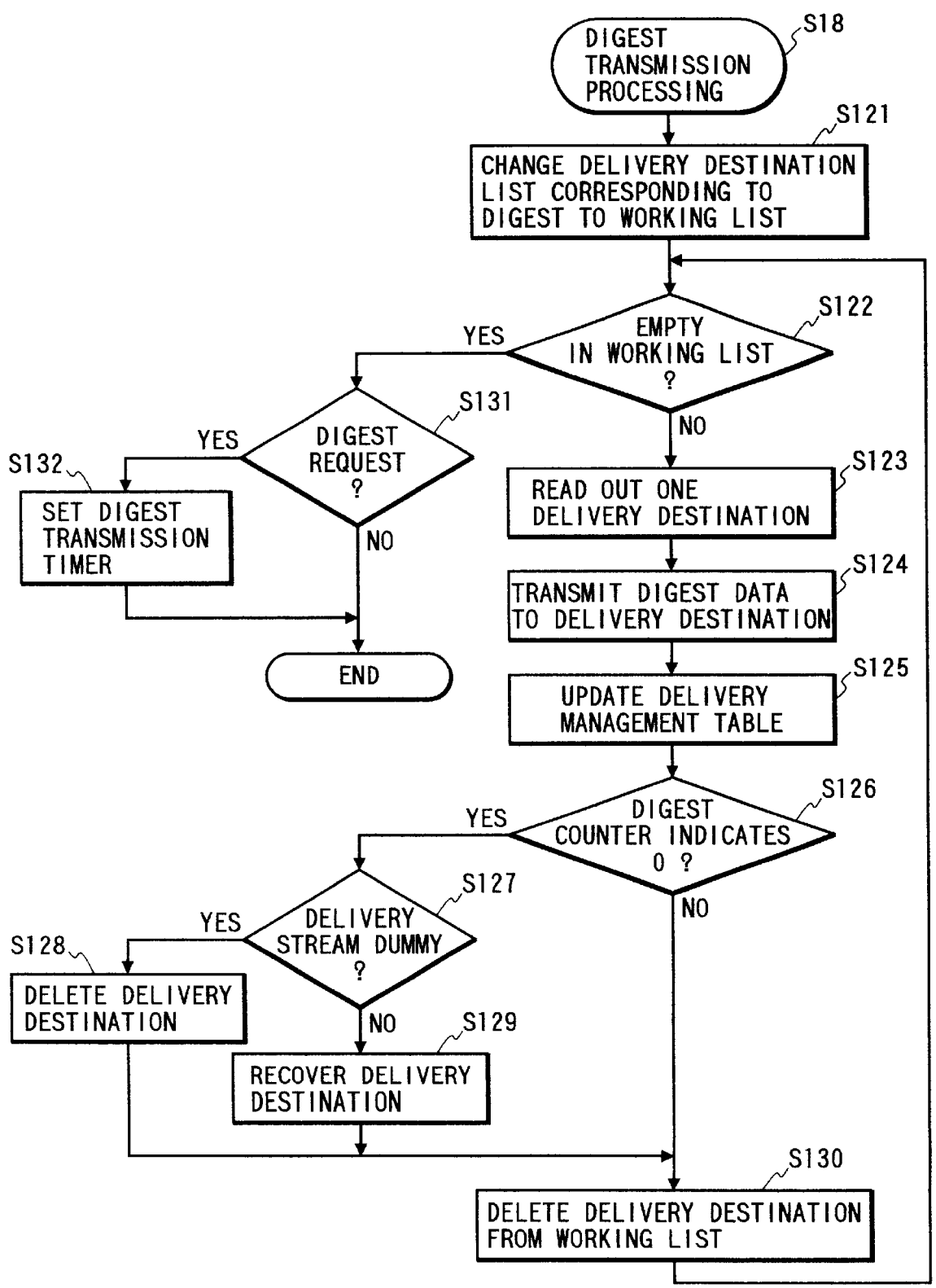

| STREAM NUMBER | READING LENGTH | READ OUT POINTER | WRITING POINTER | READING POINTER | WRITING BUFFER | READING WAIT |
|---|---|---|---|---|---|---|
| 1045 | 10 | 6 | 3 | 1 | 2 | FALSE |
| 123 | 10 | 0 | 7 | 0 | 1 | FALSE |
| 222 | 10 | 0 | 5 | 2 | 1 | FALSE |
| ... | | | | | | |

801, 803, 811, 812, 813, 814, 815

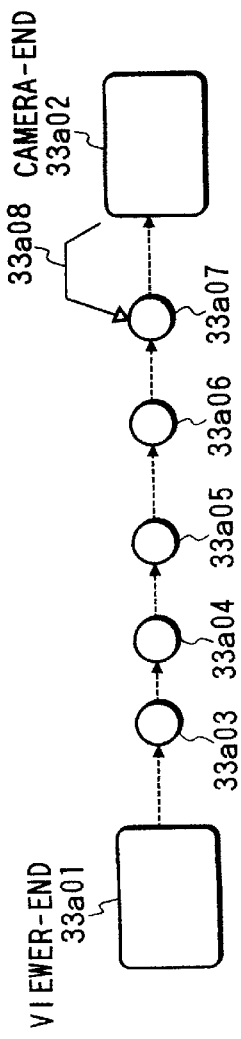
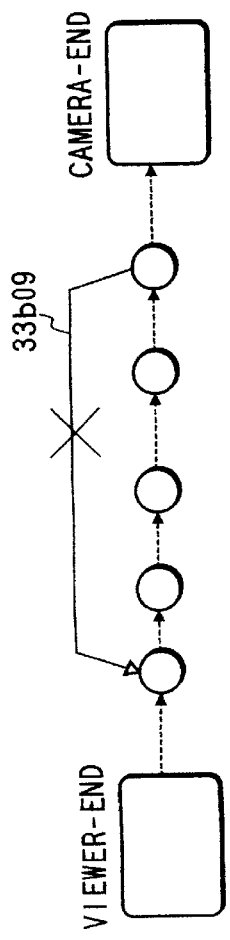
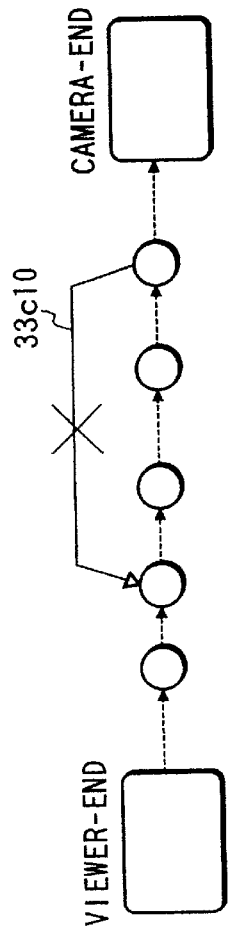
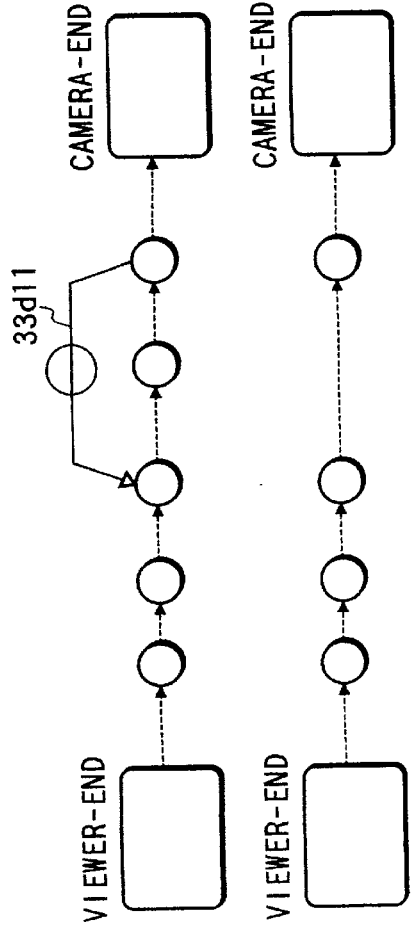
FIG. 33A
FIG. 33B
FIG. 33C
FIG. 33D
FIG. 33E

COMMUNICATION METHOD AND APPARATUS WITH MODIFICATION OF ROUTING PATH BY INTERMEDIATE RELAY APPARATUS

BACKGROUND OF THE INVENTION

1. Field of the Invention

The present invention relates to a communication method, a communication apparatus, and a communication system having the communication apparatus, for relaying and delivering data from an information source to clients to provide traffic services of data such as video signals via a network such as Internet.

2. Related Background Art

An information system known as World Wide Web (hereinafter abbreviated as WWW) is rapidly spreading and used widely among a plurality of users. In WWW, a data server called a WWW server supplies data to a number of clients via a network such as Internet. A proxy server (hereinafter simply called a proxy) is also used in a local network having a number of clients which access the same data, in order to reduce the number of accesses to the WWW server by storing the data frequently accessed by local users.

Such a proxy has treated a complete set of data such as text data used in WWW or other networks, without permitting even one byte error. In contrast, multimedia data such as audio and video data recently increasing its amount is not a complete set itself, and has the characteristics that even if some data error occurs during the data transmission, this error does not become a fatal error. Furthermore, when live images or sounds picked up in real time are transmitted and broadcast via a network, it is impossible to store such data in the complete form because such data is renewed from time to time, and storing a complete set of such data is rather meaningless.

It is therefore understood from the above considerations that a conventional proxy is not suitable for use in the field such as multimedia live broadcast. The factor that makes the conventional proxy unsuitable mainly pertains to data storage. If a system called a delivery server or a relay server for delivering data collected in real time to a plurality of clients is configured by omitting the data storage function, this system can be used also for multimedia live broadcast.

Systems for broadcasting multimedia such as video and audio data via Internet are becoming available recently. For the reasons described above, some of these systems provide a delivery server for distributing and delivering data obtained in real time from an information source to a number of clients, in order to increase the number of users capable of accessing the video and audio data at the same time.

Such a delivery server can supply data to a new client which accesses the already relayed and delivered data by the delivery server, without supplying the data again from the information source. Therefore, the information source is not required to increase the data amount to be supplied to the network. This provides merits such as quick response of information services and good quality of delivered data. Further, it is a natural desire of a client to obtain data at the information source upstream from the delivery server as viewed from the client, from a site nearer to the client having a good access environment, i.e., good audio and video data quality.

In providing multimedia delivery services via Internet or the like, other services become necessary which notify each client of an accessible information source (transmitting station). At present, such service information is described stationarily in a file constituted of home pages possessed by a WWW server, and each client accesses this file to select a desired information source.

However, information of a proxy server near to each client cannot be acquired from only directory services provided by a conventional WWW home page. Still further, if audio and video data from the information source is live data, the audio and video data supplied from the information source changes from time to time. Therefore, it is preferable to change a method of processing such data from a method of processing general stationary data such as accessing a simply described file.

Next, problems associated with data transmission/reception in the above-described relay/delivery scheme will be discussed further.

As a recent high speed LAN and Internet become widely used, it becomes possible to use various services (supply of information, games and the like) presented by a remote computer via a computer network.

FIG. 24 is a conceptual diagram illustrating such services. A service provider 2402 is software running on a computer (hereinafter abbreviated as a host or a machine) and presents adequate services to users 2405 and 2406. Typical examples of services include information supply service by WWW, database service by a server-client system, and the like. It can be expected that a variety type of the contents of services will be presented as the multimedia technology develops.

In order for the users 2405 and 2406 to use such services, it is necessary to start up service clients 2403 and 2404 at proper hosts. The service clients 2403 and 2404 provide the users 2405 and 2406 with user interfaces for using services presented by the service provider 2402.

By using this user interface, a user selects a service provider which can present necessary services, and requests for the execution of services. The service client 2403, 2404 performs communication via the selected service provider 2402 and a network 2401 to allow the service requested by the user to be executed.

In such a system, it is necessary to supply the service client and a user with the information on where and how a service provider capable of dealing with a process desired by the user is mounted.

As a conventional method of acquiring the information of service providers distributed on a network, there is an approach that a service client broadcasts a message (hereinafter called a search message) for searching a service provider to all machines on the network at the same time.

The broadcast search message is transmitted to almost all machines connected to the network. Therefore, if there is any service provider in the network, this service provider can receive this search message. Upon reception of the search message, the service provider sends an answer message (reply message) back to the service requesting client so that the client can detect a presence of the service provider and acquire the information of the service provider.

However, the following problems occur when such an approach of broadcasting a search message, because a large scale of a recent computer network system.

(1) The search message is transmitted in a broad area.

As the search message is broadcast, this message is transmitted to all machines connected to the network and designated by the broadcast parameter.

Therefore, as the scale of the network becomes large, the search message is transmitted to a number of machines.

However, this search message is meaningless to those machines different from service providers. Therefore, if the search message is broadcast to the whole network at the same time, the load of the whole network increases and the usage efficiency thereof is lowered.

This problem may be dealt with by properly limiting the area to which a search message is broadcast. However, if a desired service provider is not present in the limited search area, this service provider cannot be found and the service cannot be received.

(2) There is a host to which the search message does not reach.

In many cases a barrier (hereinafter called a firewall) is used for limiting the transfer of a message between two networks, a large scale network such as Internet and a small scale network such as a company LAN interconnected each other, in order to prevent information leakage and the like.

Therefore, the search message is intercepted by the firewall so that a service provider in the network at the back of the firewall cannot be detected.

Furthermore, in a-network having a very small bandwidth and a slow transmission speed, a search message may be lost during transmission. Also in such a case, detecting a service provider fails.

SUMMARY OF THE INVENTION

It is an object of the present invention to provide a communication method, a communication apparatus, and a communication system capable of solving the above-described problems.

The invention has been made in order to solve the above problems and aims at providing a communication method, a communication apparatus, and a communication system with such a communication apparatus, in which a portion of data from an information source is stored, and the stored data is supplied to a client in response to an instruction from the client.

According to a preferred embodiment of the invention, a communication apparatus interposed between an information source and a client via a network, is provided which comprises: storage means for storing a portion of data sent from the information source in accordance with setting information; and delivery means for delivering the data stored in the storage means to the client in response to a request from the client.

Another object of the invention is to provide a communication method, a communication apparatus, and a communication system with such a communication apparatus, in which an information source is requested to supply data in response to a request from a client, at least a portion of the data transmitted from the information source in response to the request is stored, and a predetermined amount of the stored data is transmitted.

Still another object of the invention is to provide a communication method, a communication apparatus, and a communication system with such a communication apparatus, in which an information source is periodically requested to supply data at a predetermined interval, a portion of the data is stored, and the stored data is transmitted as desired.

A further object of the invention is to provide a communication method providing good communication efficiency.

A still further object of the invention is to provide a communication method, a communication apparatus, and a communication system with a novel function.

The features of the invention will become apparent from the following detailed description when read in conjunction with the accompanying drawings.

BRIEF DESCRIPTION OF THE DRAWINGS

FIG. 6 is a diagram showing an example of the contents of a storage setting table of the first embodiment.

FIG. 7 is a diagram showing an example of the contents of a delivery management table of the first embodiment.

FIG. 8 is a diagram showing an example of the contents of a storage management table of the first embodiment.

FIG. 9 is a diagram showing an example of the contents of a stream management table of the first embodiment.

FIG. 20 is a flow chart illustrating the details of a digest transmitting process (S18) shown in FIG. 10.

FIG. 22 is a diagram showing an example of a portion of the contents of the storage management table of the first embodiment.

FIGS. 33A, 33B, 33C, 33D and 33E are diagrams illustrating the flow of a leap-back process for optimizing a probe path according to the second embodiment.

DETAILED DESCRIPTION OF THE PREFERRED EMBODIMENTS

Preferred embodiments of the invention will be described in detail with reference to the accompanying drawings.

FIRST EMBODIMENT

Figure 1:
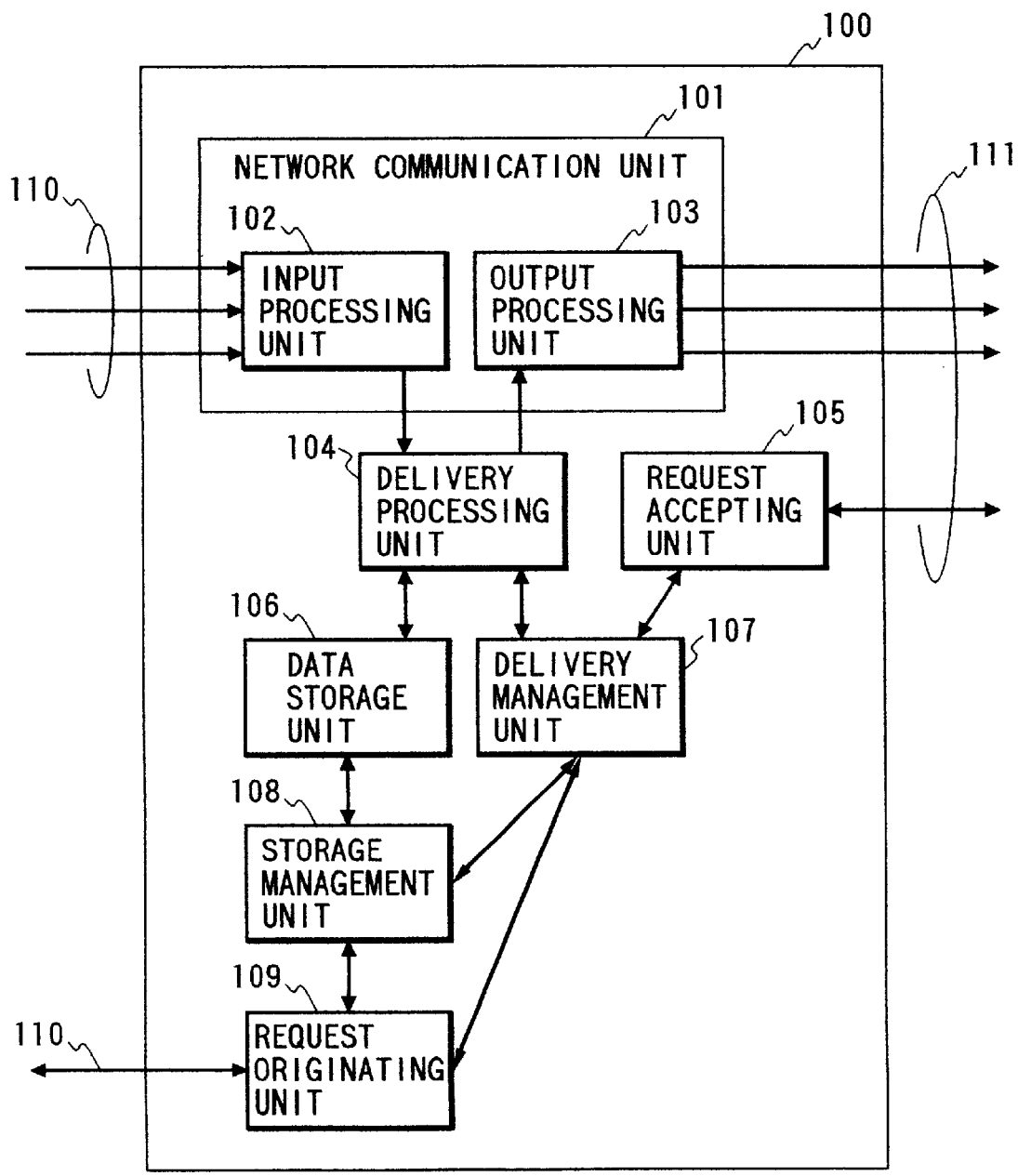
FIG. 1 is a functional block diagram showing the structure of a delivery server according to a first embodiment of the invention.

FIG. 1 is a block diagram showing a functional structure of a delivery server (relay server) 100 according to the first embodiment of the invention. Although each unit of the delivery server may be realized either by hardware or software, each unit is realized in this embodiment by software.

Referring to FIG. 1, reference numeral 101 represents a network communication unit which includes an input processing unit 102 and an output processing unit 103. The input processing unit 102 receives data via a network 110 from an information source as an originating transmission side. The output processing unit 103 transmits data to a client side machine via another network 111 (although this network may be the same as the network 110, a different network is used for the convenience of description). Reference numeral 104 represents a delivery processing unit which controls the network communication unit 101. Reference numeral 105 represents a request accepting unit which receives various request from client side machines at the downstream side. Reference numeral 106 represents a data storage unit which stores a portion of data delivered via the delivery processing unit 104. Reference numeral 107 represents a delivery management unit which manages as to which data is received and to whom the data is delivered. Reference numeral 108 represents a storage management unit which manages as to which portion of the data received via the network 110 is stored in the data storage unit 106. Reference numeral 109 represents a request originating unit which issues various requests to an upstream (information supplier) machine via the network 110.

With the above configuration, upon reception of a request (such as a delivery start request, delivery end request and the like) from a downstream client machine via the network 111, the request accepting unit 105 notifies the delivery management unit 107 of this effect. The delivery management unit 107 then updates the management information stored therein, if new data is necessary, it instructs the request originating unit to request data from the information supplier, and if addition/change of stored data is necessary, a change is informed to the storage management unit. The delivery management unit 107 also sets necessary delivery information to the delivery processing unit 104.

As a request issued from the request originating unit 109 is received by an information source server or delivery server at the upstream side, this upstream server starts transmitting data to the delivery server 100. Then, the input processing unit receives the data from the network 110 and supplies it to the delivery processing unit 104. In accordance with the designated setting of the delivery management unit 107, the delivery processing unit 104 instructs the output processing unit 103 to deliver the data to the downstream side, and in accordance with the information set to the delivery management unit 107 by the storage management unit 108, it instructs the data storage unit 106 to read the received data and store it. The setting by the storage management unit 108 includes an intermittent storage operation, a storage operation by short time sampling, and other operations. With this setting, the data storage unit 106 can store a portion of a data stream supplied from each information source and relayed and delivered by the delivery server 100.

Upon reception of a "digest delivery" as a request from a downstream machine (client), the request accepting unit 105 supplies this request to the delivery management unit 107. The delivery management unit 107 updates the internal management information thereof and sets necessary delivery information to the delivery processing unit 104. Namely, if the "digest delivery" is set, the delivery processing unit 104 receives the data from the upstream side and delivers it to the downstream side, and in addition, reads the data stored in the data storage unit 106 and delivers it to the downstream machine which issued the "digest delivery".

Figure 2:
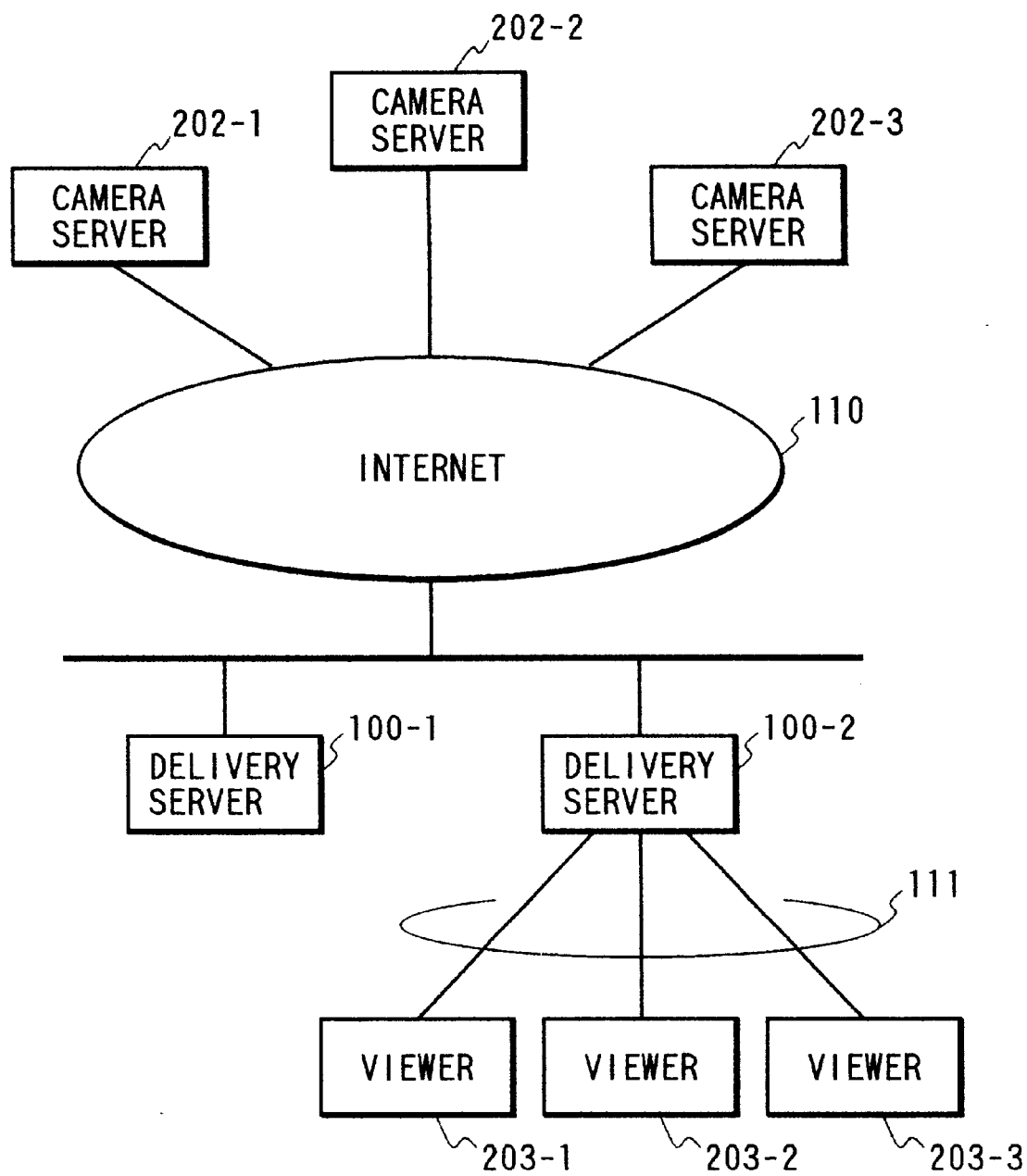
FIG. 2 is a conceptual diagram showing the structure of a network system of the first embodiment.

FIG. 2 is a diagram showing the structure of a video transmission system including the delivery server of the first embodiment.

Reference numerals 100-1 and 100-2 represent the delivery server shown in FIG. 1. Reference numerals 202-1 to 202-3 represent a camera server equipped with a video camera for taking images, a microphone for picking up sounds, and the like. The camera server transmits video and audio data (hereinafter collectively called video data) produced by the video camera and microphone to the network 110. Reference numerals 203-1 to 203-3 each represent a viewer (client) which observes video data transmitted from the network 110 and received via the delivery server 100-2. This video data is transmitted from the camera server 202 and supplied via Internet 110 to the delivery server 100 which in turn distributes and re-delivers it to one or a plurality of viewers 203 via the network 111.

Figure 3:
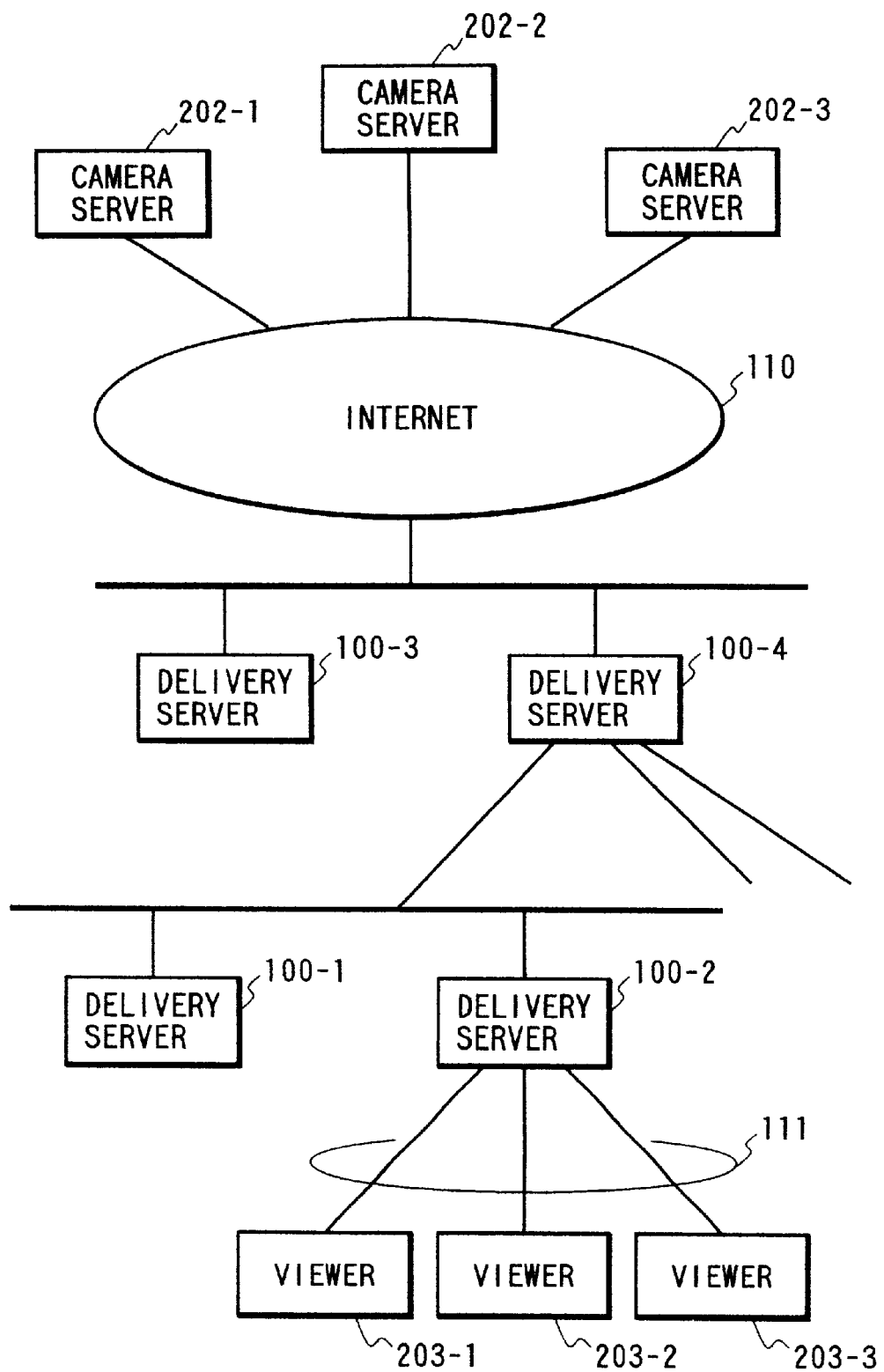
FIG. 3 is a conceptual diagram showing the structure of a network system according to a modification of the first embodiment.

FIG. 3 is a conceptual diagram showing the structure of a video transmission system according to a modification of the first embodiment. Like parts to those shown in FIG. 2 are represented by identical reference numerals, and the description thereof is omitted.

With the configuration shown in FIG. 3, video data transmitted from the camera server 202 is supplied via Internet 110 to delivery servers 1003 and 1004. The delivery server 100-4 distributes and re-delivers the video data to one or a plurality of servers including delivery servers 100-1 and 100-2, or directly to a viewer 203. The delivery server 100-2 further distributes and re-delivers the video data to one or a plurality of viewers. In this embodiment, a plurality of delivery servers can be configured in a cascade connection. In the above configuration, the number of delivery servers, camera servers and viewers connected to Internet 110 and the number of viewers connected to the delivery server are set as desired without being limited to this embodiment.

Figure 4:
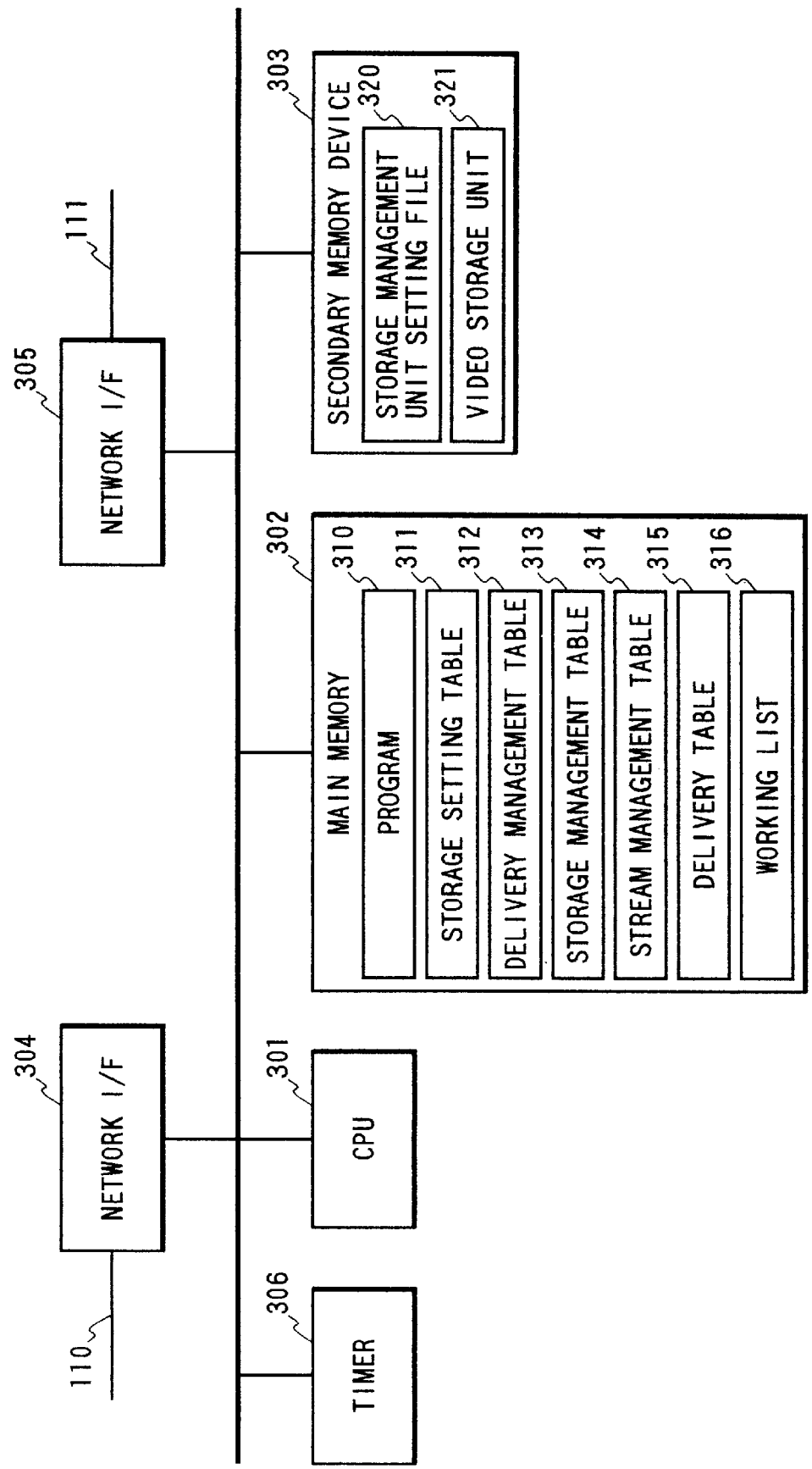
FIG. 4 is a block diagram showing the structure of the delivery server of the first embodiment.

FIG. 4 is a block diagram showing the structure of the delivery server 100 of this embodiment.

In FIG. 4, reference numeral 301 represents a CPU for controlling the whole operation of the delivery server, and reference numeral 302 represents a main memory having a program area 310 for storing programs to be executed by CPU 301 (or for storing programs downloaded from a secondary memory 303) and various tables 311 to 316 and the like to be later described. Reference numeral 303 represents the secondary memory such as a hard disk. The secondary memory 303 has a video storage unit 321 serving as the previously described data storage unit 106, and stores a storage management unit setting file 320 to be later described, control programs to be executed by CPU 301 and the like. Reference numeral 304 represents a network interface (I/F) for controlling communication with Internet 110. Reference numeral 305 represents a network interface for controlling communication with the network connected to the viewer 203. Reference numeral 306 represents a timer which counts time under the control of CPU 301 and generates a timer event of CPU 301 each time a predetermined time lapses.

Figure 5:
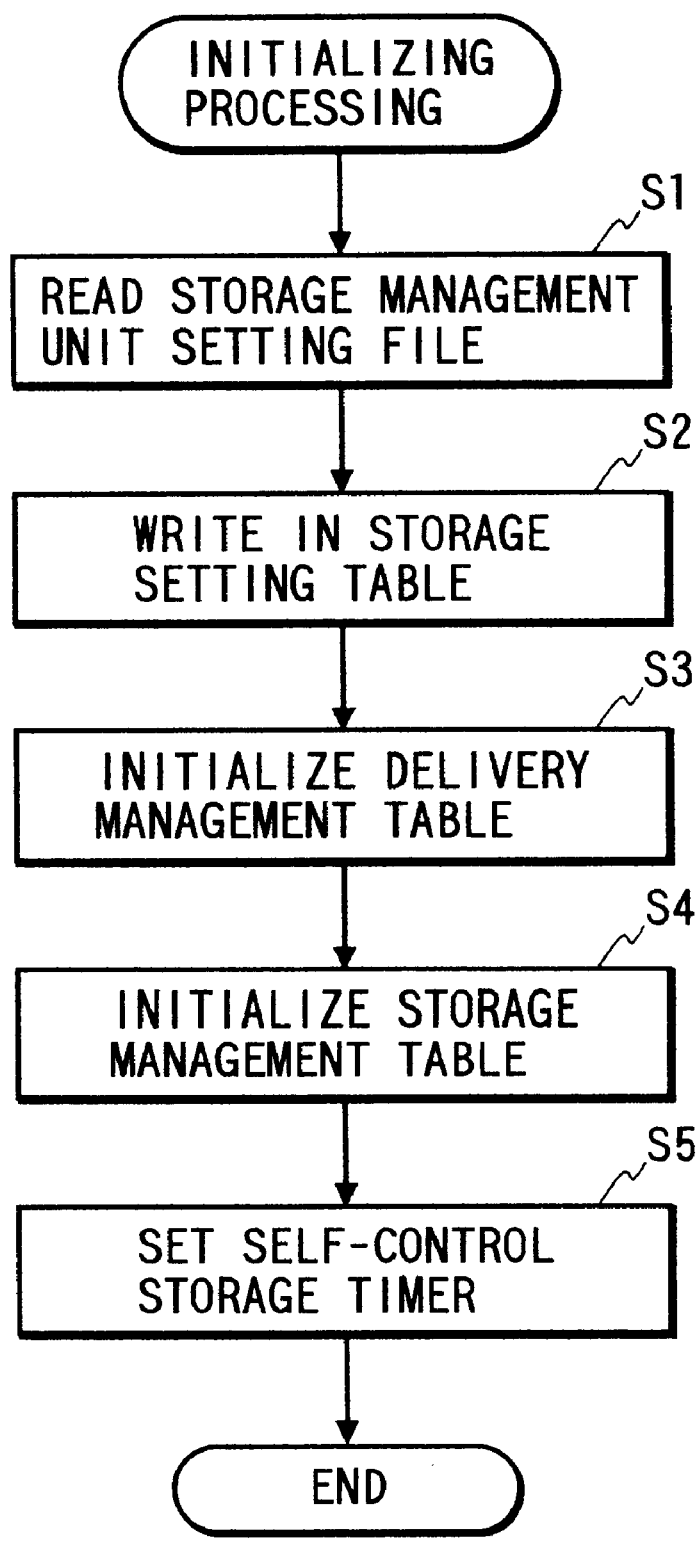
FIG. 5 is a flow chart illustrating a start-up process of the delivery server of the first embodiment.

FIG. 5 is a flow chart illustrating an initializing process at the start-up of the delivery server 100 of the first embodiment. A control program for performing this process is stored in the main memory 302 and it is executed under the control of CPU 301.

First at Step S1, a file containing setting information regarding a data storage operation, called the storage management unit setting film 320 stored in the secondary memory 303, is read. Next at Step S2 the fine information is written in a storage setting table 311 of the main memory 302. Next at Step S3 a delivery management table 312 is initialized and at Step S4 a storage management table 313 is initialized. At Step S5 a self-control storage timer 306 is set.

FIG. 6 is a diagram illustrating the contents of the storage setting table 311.

Reference numeral 601 represents an area used for designating an information source of a data stream to be stored and set with an address, a port number and a stream number of the information source. Reference numeral 602 represents an area set with an access (sampling) interval in the unit of frame number or second for the intermittent storage operation. Reference numeral 603 represents an area set with a reading length in the unit of frame number or second. Reference numeral 604 represents an area for storing a flag representative whether a data delivery request is automatically output to an upstream side (information source) even if there is no request from a downstream (viewer), or for storing other information. "True" indicates that a data delivery request is automatically output to the upstream (information source), and "False" indicates a contrary case. If the value in the storage stream 601 is "0", it means that the information source is not specified in the initializing process and that an information source is specified only in response to a request from a downstream (viewer).

FIG. 7 is a diagram illustrating the contents of the delivery management table 312.

Reference numeral 701 represents a serial number (ID) of an input data stream (delivery stream) delivered from an information source. Reference numeral 702 represents an ID of a delivery destination (client such as a delivery server and a viewer). Reference numeral 703 represents a connection time counter indicating a lapse time in the unit of frame number or second from the connection start of the information source. Reference numeral 704 represents a flag indicating whether there is a digest delivery request from the delivery destination, "True" indicating a presence of a digest delivery request. Reference numeral 705 represents a counter for counting a lapsed data number from the digest delivery start in the unit of frame number or second (hereinafter called a digest counter). If the delivery stream ID is "−1", it means that the delivery stream is not designated, i.e., there is only a digest request for outputting stored data.

FIG. 8 is a diagram illustrating the contents of the storage management table 313.

Reference numeral 801 represents a stream number of the stream to be stored. Reference numeral 802 represents a storage cycle in the unit of frame number or second. Reference numeral 803 represents a reading length in the unit of frame number or second. Reference numeral 804 represents a counter for counting a lapsed data number from the storage start in the unit of frame number or second (hereinafter called a storage counter). Reference numeral 805 represents a flag indicating whether data is being read or not, "True" indicating data is being read and "False" indicating data is not being read. Reference numeral 806 represents a flag indicating whether the delivery server was started up in a self-control mode or not, "True" indicating a self-control mode start-up and "False" indicating another mode. The storage setting file 320 stored in the secondary memory 303 is a fixed setting file which is not changed during the operation, whereas the storage management table 313 stores a storage designation state which dynamically changes.

FIG. 9 is a diagram illustrating the contents of the stream management table 314.

Reference numeral 901 represents a stream ID number, reference numeral 902 represents a communication partner address, reference numeral 903 represents a port number, and reference numeral 904 represents a designated stream number.

The initializing process will be described by referring again to the flow chart of FIG. 5. At Step S1, the storage management unit setting file 320 stored in the secondary memory 303 is read. This storage management unit setting file 320 stores therein the address, port number and stream number of a storage stream 601 to be used for designating an information source of the data stream to be stored, the access interval 602 for the intermittent storage operation, each reading length 603, and the self-control storage flag 604 indicating whether the data delivery request is automatically issued to an upstream even if there is no request from a downstream. Next at Step S2 this information is written in the storage setting table 311 of the main memory 302. Next at Step S3 the delivery management table 312 and stream management table 314 are cleared and at Step S4 the storage management table 313 is cleared. Lastly at Step S5 the contents of the storage setting file 320 are referred to set the timer 306 at a proper time interval (e.g., 60 seconds) sequentially to those storage streams having the self-control storage flag 604 of "True". The time, and storage number indicated by a storage table number are added to a timer start-up queue list.

Figure 10:
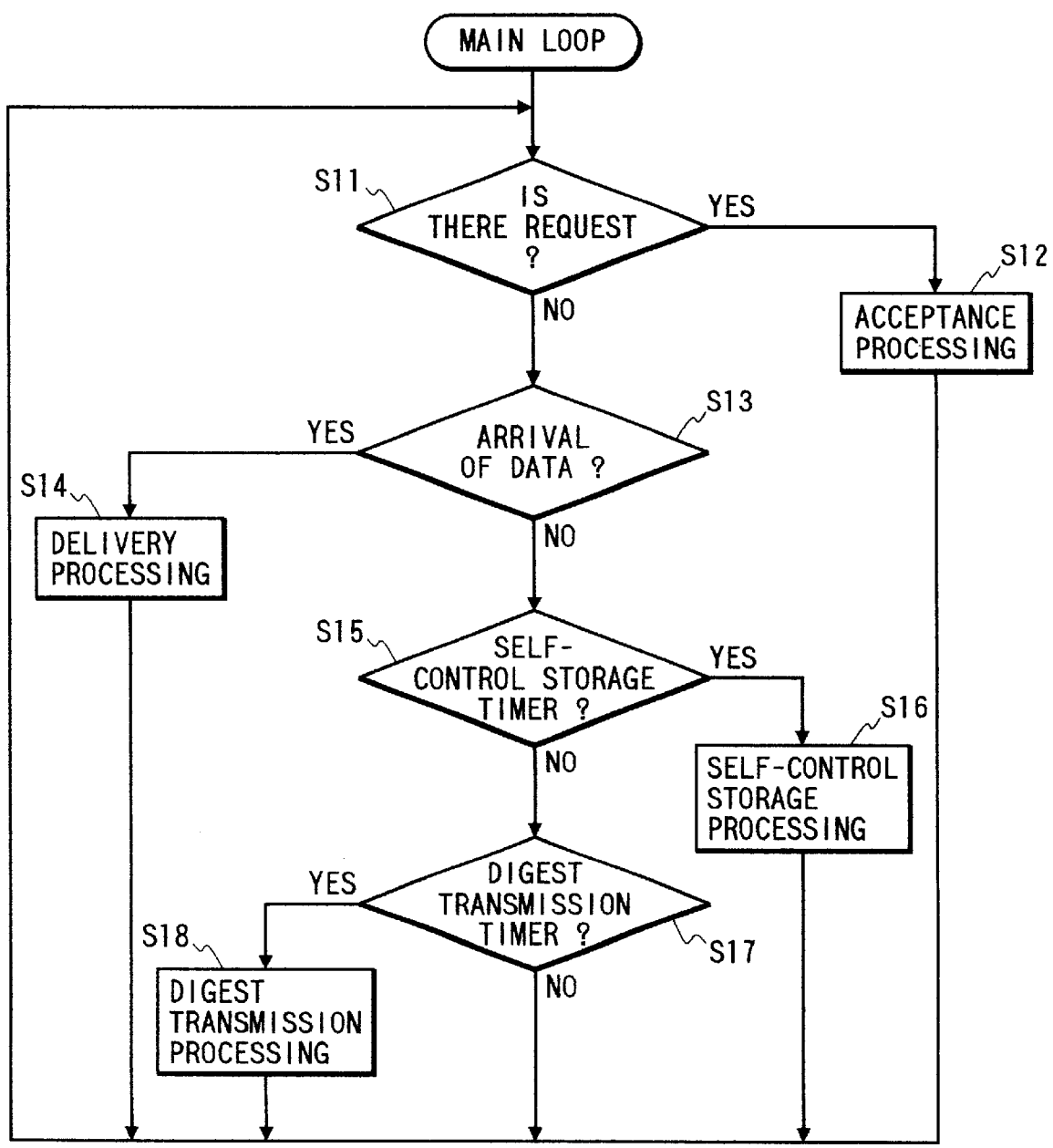
FIG. 10 is a flow chart illustrating a main process of the delivery server of the first embodiment.

FIG. 10 is a flow chart illustrating a main process to be executed by the delivery server 100 of the first embodiment, the program for performing this process being storing in the program memory 310.

After the initializing process at the start-up, the delivery server 100 of this embodiment repeats the main loop to perform the following processes: including a request judgement at Step S11, a data arrival judgement at Step S13, a self-control storage timer judgement at Step S15, processes corresponding to four types of events for a digest transmission timer judgement at Step S17, an acceptance process at Step S12, a delivery process at Step S14, a self-control storage process at Step S16 and a digest transmission process at Step S18.

First at Step S11 the request accepting unit 105 judges whether there is a request from a downstream. If there is a request, the flow advances to Step S12 whereat the reception process for the request is performed. If there is no request from a downstream at Step S11, the flow advances to Step S13 whereat it is judged whether data arrives at the input processing unit 102 via the network 110. If the data arrives, the flow advances to Step S14 whereat the arrived data is delivered to the downstream client under the control of the delivery processing unit 104, and if necessary stored in the data storage unit 106. If data does not arrive at Step S13, the flow advances to Step S15 whereat it is checked whether an event is generated by the self-control storage timer. If a timer even occurs, the flow advances to Step S16 to perform the self-control storage process. If a timer event does not occur at Step S15, the flow advances to Step S17 whereat it is checked whether a digest delivery timer event occurs. If the digest delivery timer event occurs, the flow advances to Step S18 to perform the digest transmission process.

The process Steps S12, S14, S15 and S18 will be described in detail with reference to respective flow charts.

Figure 11:
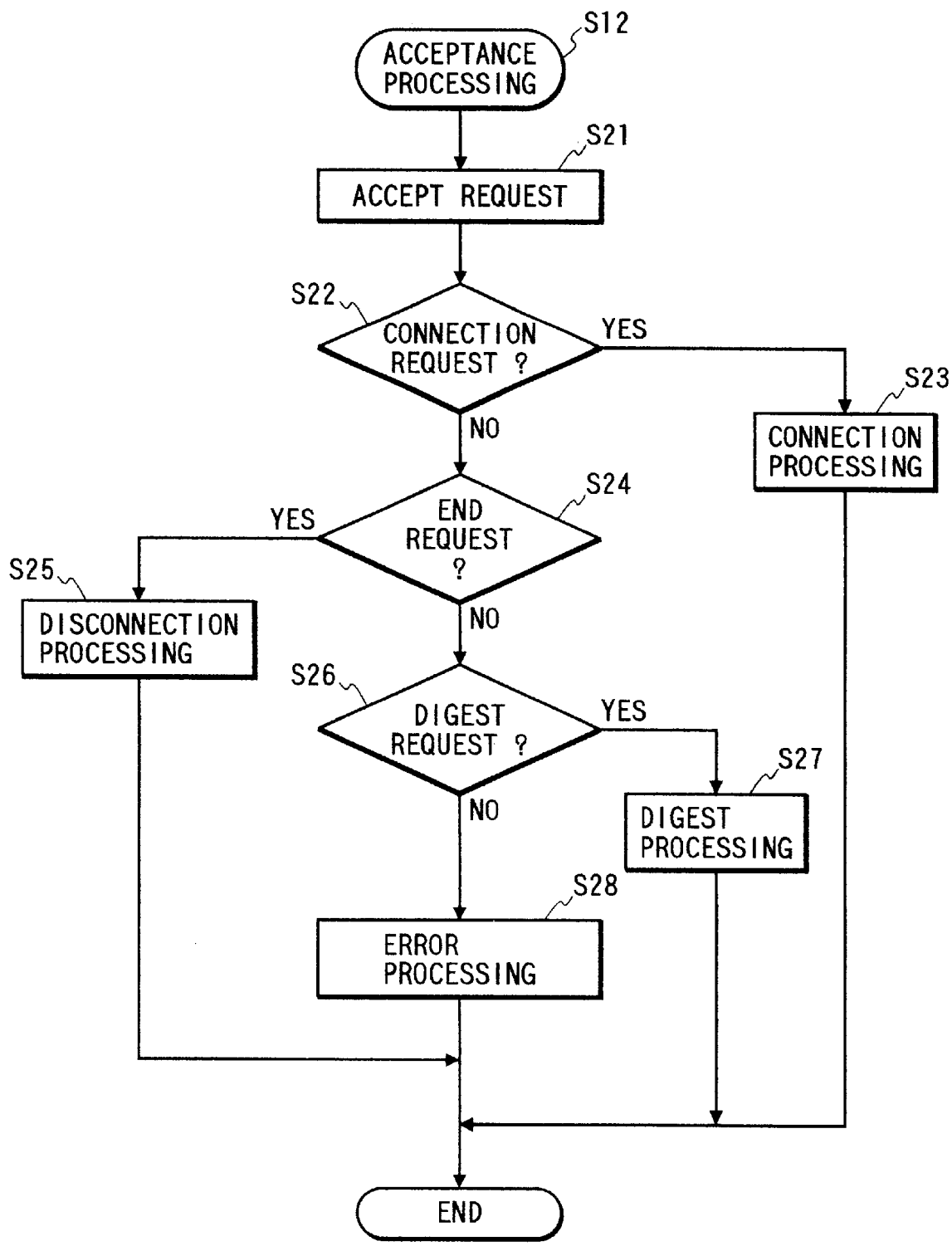
FIG. 11 is a flow chart illustrating the details of an acceptance process (S12) shown in FIG. 10.

FIG. 11 is a flow chart illustrating the acceptance process at Step S12 shown in FIG. 10.

First at Step S21 the request accepting unit 105 judges whether there is a request from a client at the downstream. If there is a request, the flow advances to Step S11 whereat it is judged whether the request is a connection request. If connection request, the flow advances to Step S23 to execute a connection process for a camera server at the information source by the operations of the delivery management unit 107, delivery processing unit 104 and network communication unit 101. This connection process will be later detailed with reference to the flow chart of FIG. 12.

If it is judged at Step S22 that the request is not a connection request, the flow advances to Step S24 whereat it is checked whether the request is an end request. If end request, the flow advances to Step S25 to execute a disconnection process for communication with a camera server via the network 110 by the operations of the delivery management unit 107, delivery processing unit 104 and network communication unit 101. This disconnection process will be later detailed with reference to the flow chart of FIG. 14.

If it is judged at Step S24 that the request is not an end request, the flow advances to Step S26 whereat it is judged whether the request is a digest request. If digest request, the flow advances to Step S27 to execute a digest process of sending video signals stored in the data storage unit 106. The details of this process will be later given with reference to the flow chart shown in FIG. 15. If it is judged at Step S26 that the request is different from the above-described requests, the flow advances to Step S28 to execute an error process. The requests received by the request accepting unit 105 at Step S21 are as in the following.

<Connection request>
(1) <Connect camera 1.canon.co.jp: 60001:1 #1 150.64.33.44:8901>
<Disconnection request>
(2) <Disconnect #1 150.64.33.44:8901>
<Digest request>
(3) <Directory 0 150.64.33.44:8901>

The request (1) is a connection request for delivering data from an information source [camera 1.canon.co.jp: 60001:1] as [#1] to a delivered side (delivery destination) address [150.64.33.44:8901]. The request (2) is an end request for disconnecting "#1" from a delivery destination address [150.64.33.44:8901]. The request (3) is a delivery request for delivering a digest ("0" indicating a 0-th digest) to a delivery destination address [150.64.33.44:8901].

Figure 12:
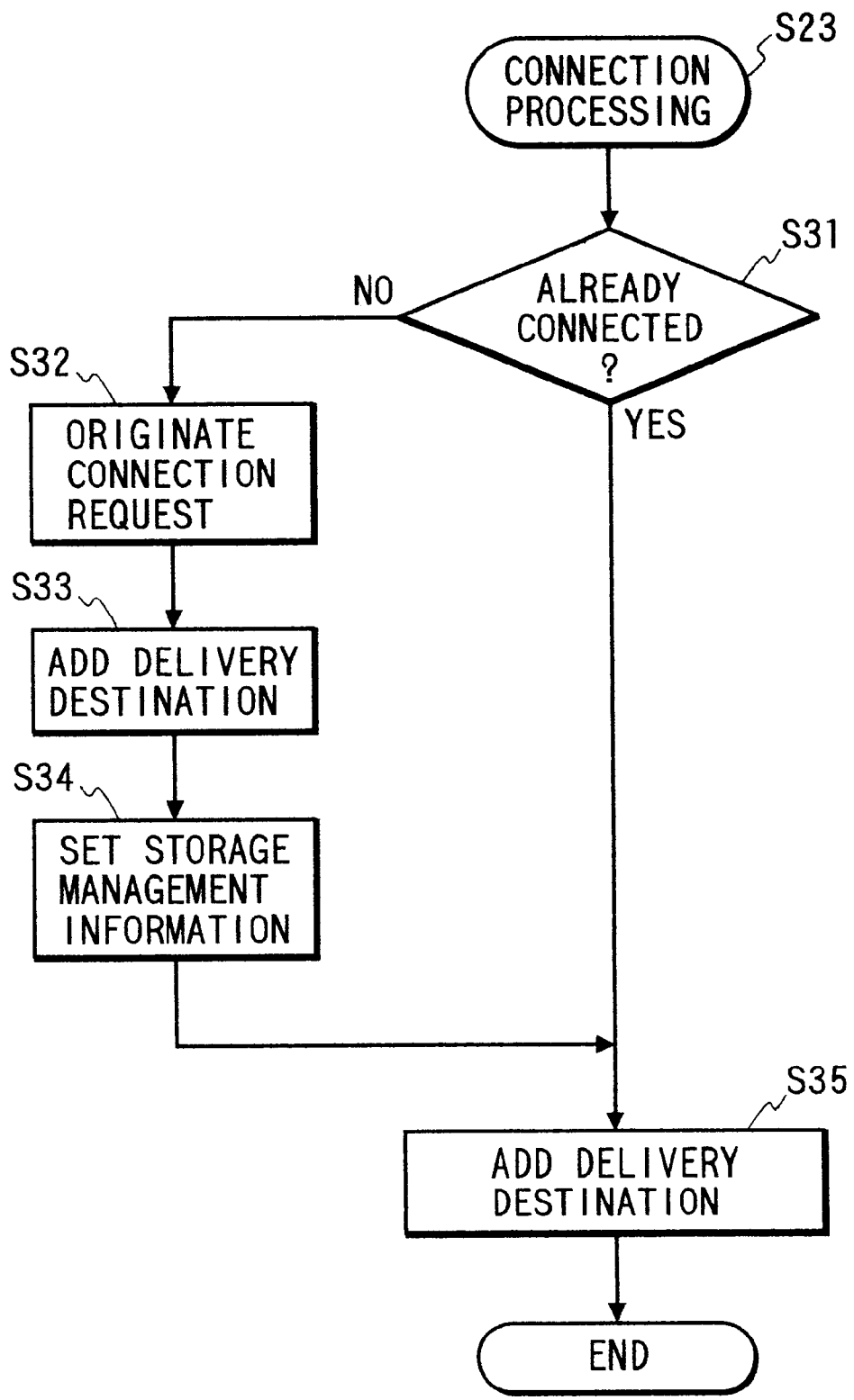
FIG. 12 is a flow chart illustrating the details of a connection process (S23) shown in FIG. 11.

FIG. 12 is a flow chart illustrating the contents of the connection process at Step S23 shown in FIG. 11.

At Step S31 the delivery management unit 107 judges whether there is a delivery stream corresponding to the connection destination information source designated by the request received at the request accepting unit 105, by referring to the stream management table 314 shown in FIG. 9. In the above example, the received request is <Connect 150.31.11.09:65011:1 #1 150.64.33.44:8901>, and the connection destination information source is [150.31.11.09:65011:1] which is assumed to indicate an address 150.31.11.09, a port number 65011 and a stream ID number 1. If the information source is already connected, the flow advances to Step S35, whereas if not, the flow advances to Step S32 whereat the request originating unit 109 is instructed to issue a connection request to the connection destination information source. In this manner, a connection request is issued to an upstream camera server or delivery server. At Step S33 the delivery management unit 107 sets newly connected stream information to the stream management table 314, and forms a new entry of this stream in the delivery management table 312 shown in FIG. 7. At Step S34, storage management information of this new stream is set to the storage management table 313 shown in FIG. 8. The setting sequence for this storage management information will be later described with reference to FIG. 13. At Step S35 a delivery destination ID is allocated and delivery side information (in the above example, the delivery destination ID, address 150.64.33.44, port number 8901, delivery management ID #1) is set to a delivery destination table 315. In the delivery stream ID 701 (150,31.11.09:65011:1) of the delivery management table 312, an entry of this delivery ID is formed to set the connection time counter 703 to a default value, the digest 704 to "False" and the digest counter 705 to "0".

Figure 13:
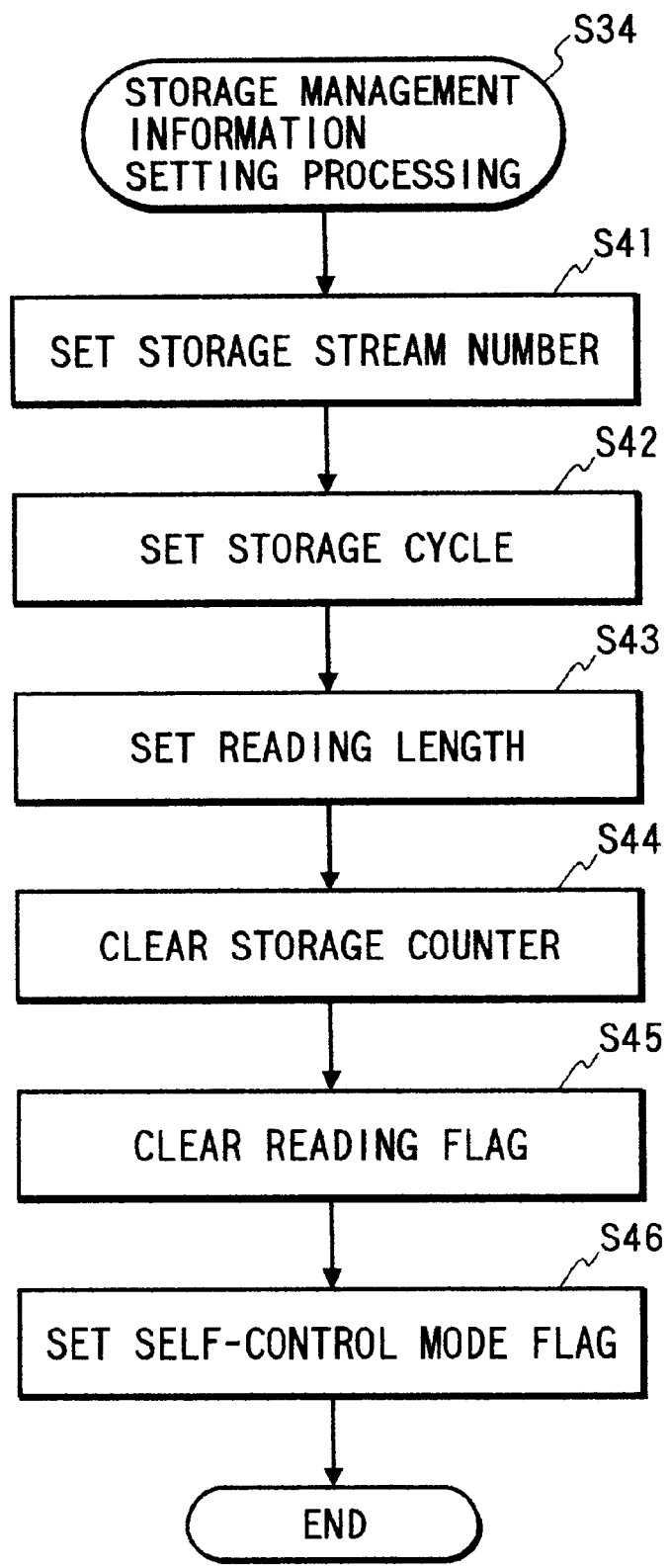
FIG. 13 is a flow chart illustrating the details of a storage management information setting process (S34) shown in FIG. 12.

FIG. 13 is a flow chart illustrating the contents of the storage management information setting process at Step S34 of FIG. 12.

First at Step S41 with reference to the new stream information supplied from the delivery management unit 107 and the storage setting table 311, the storage management unit 108 determines the setting contents of the storage management table 313. The new stream information is added with information indicating whether this information was generated by the self-control storage process (to be described later) or by the request at the downstream. After the storage management unit 108 generates a new entry in the storage management table 313, a delivery stream ID is set as the stream number 801. If the stream is generated by the self-control mode (self-control storage 604 is "True"), the storage setting information for the information source of this stream is read from the storage setting table 311, whereas if not (self-control storage 604 is "False"), the default of the storage stream (=0) of the storage setting table 311 is read. Next at Step S42 the access interval 602 in the storage setting table 311 is set to the storage cycle 802 in the storage management table 313. At Step S43 the reading length 803 is set. At Step S44 the storage counter 804 is set to "0", and at Step S45 the reading flag 805 is set to "False". At Step S46 the self-control mode flag 806 is set to "True" if the stream was generated in the self-control mode, whereas if not, it is set to "False".

Figure 14:
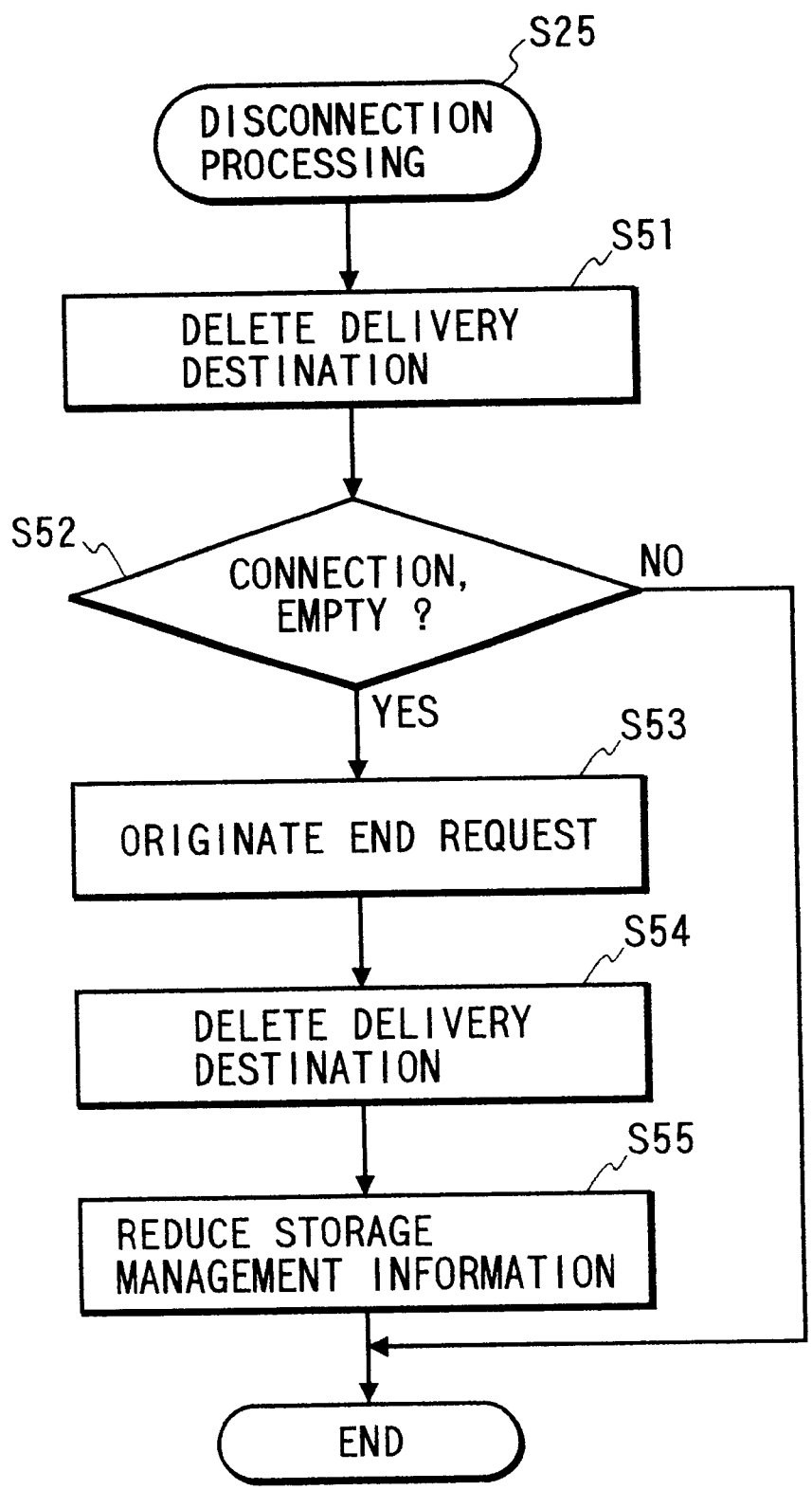
FIG. 14 is a flow chart illustrating the details of a disconnection process (S25) shown in FIG. 11.

FIG. 14 is a flow chart illustrating the contents of the disconnection process at Step shown in FIG. 11.

First at Step S51, prior to performing the disconnection process, the delivery management unit 107 deletes an entry corresponding to the delivery destination ID 702 in the delivery management table 312. Next at Step S52 it is checked whether the delivery destination ID is not still left in the delivery stream ID 701 corresponding to the deleted entry. If still left, this connection process is terminated, whereas if not left (empty), the flow advances to Step S53 whereat the request originating unit 109 is instructed to issue an end request of communication for the delivery stream ID 701. Next at Step S54 an entry in the delivery management table 312 corresponding to the delivery stream ID 701 is deleted, and the corresponding entry in the stream management table 314 is also deleted. At Step S55 an entry in the storage management table 313 corresponding to the delivery ID 701 is deleted. In this case, if the original delivery stream is coincident with the stream having the self-control storage 604 of "True" in the storage setting table 311, it is checked whether a re-start of this stream is in the timer start-up queue list. If not, a proper time interval (e.g., 60 seconds) is set to the timer and the timer start-up queue list is added with a set time and a storage number indicated by the number in the storage setting table 311.

Figure 15:
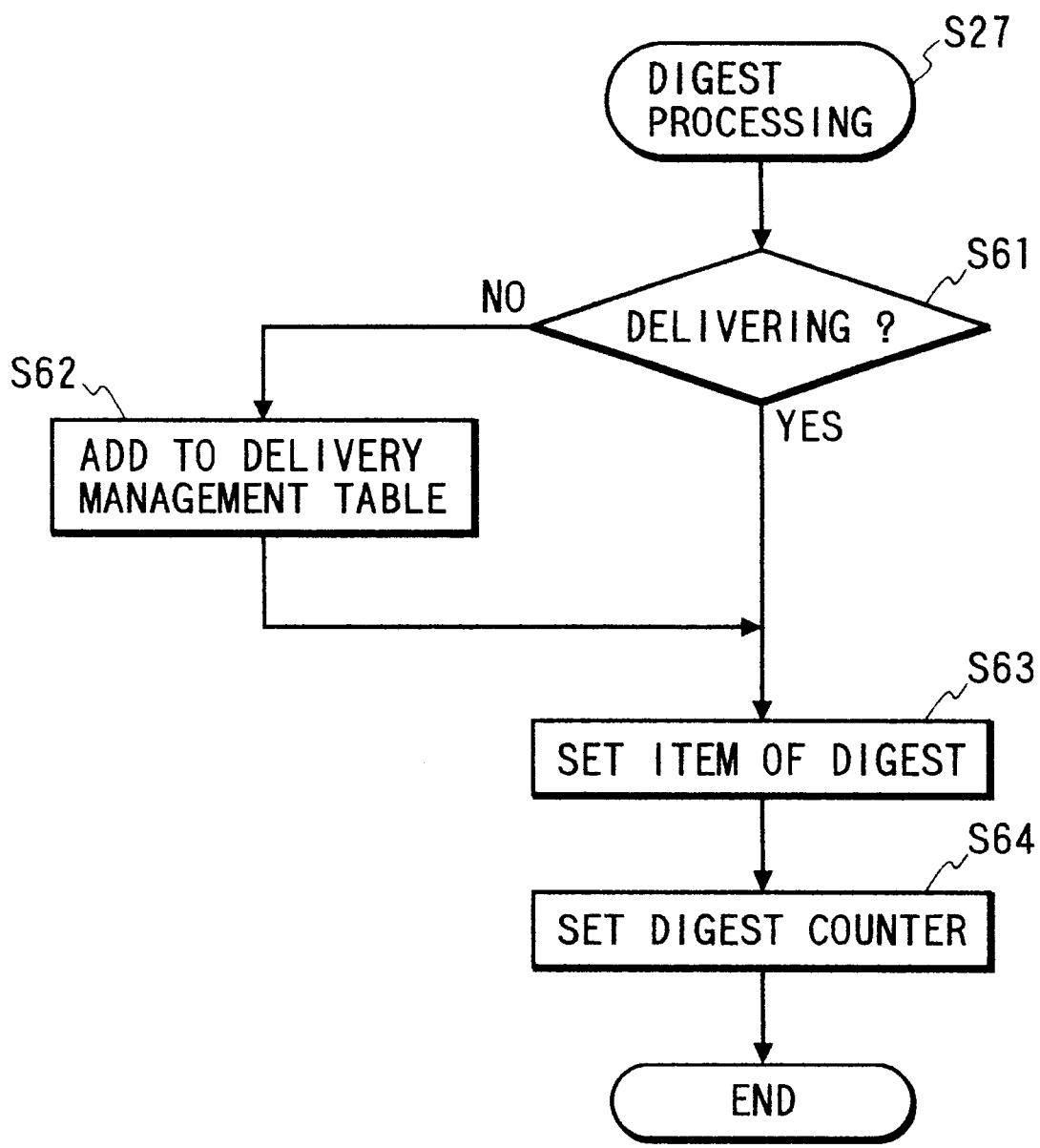
FIG. 15 is a flow chart illustrating the details of a digest process (S27) shown in FIG. 11.

FIG. 15 is a flow chart illustrating the contents of the digest process at Step S27 shown in FIG. 11.

If the request supplied from the request accepting unit 105 to the delivery management unit 107 is a digest request, the digest process at Step S27 starts. First at Step S61 the delivery management unit 107 judges whether the delivery destination issued the digest request is already under delivery, by referring to the delivery management table 312. If not under delivery (i.e., no entry in the delivery management table 312), the flow advances to Step S62 whereat an entry for a new delivery destination is formed in the delivery management table 312. If under delivery, the flow directly advances to Step S63. At Step S63 the delivery management unit 107 sets the digest 704 corresponding to the entry for the delivery destination to "True", and if there is no other digest request in the delivery management table 312, the digest transmission timer is set. Next at Step S64 the digest counter 705 in the delivery management table 312 is set with the length of the digest stored in the data storage unit 106. The above operations are the contents of the acceptance process shown in the flow chart of FIG. 11.

Figure 16:
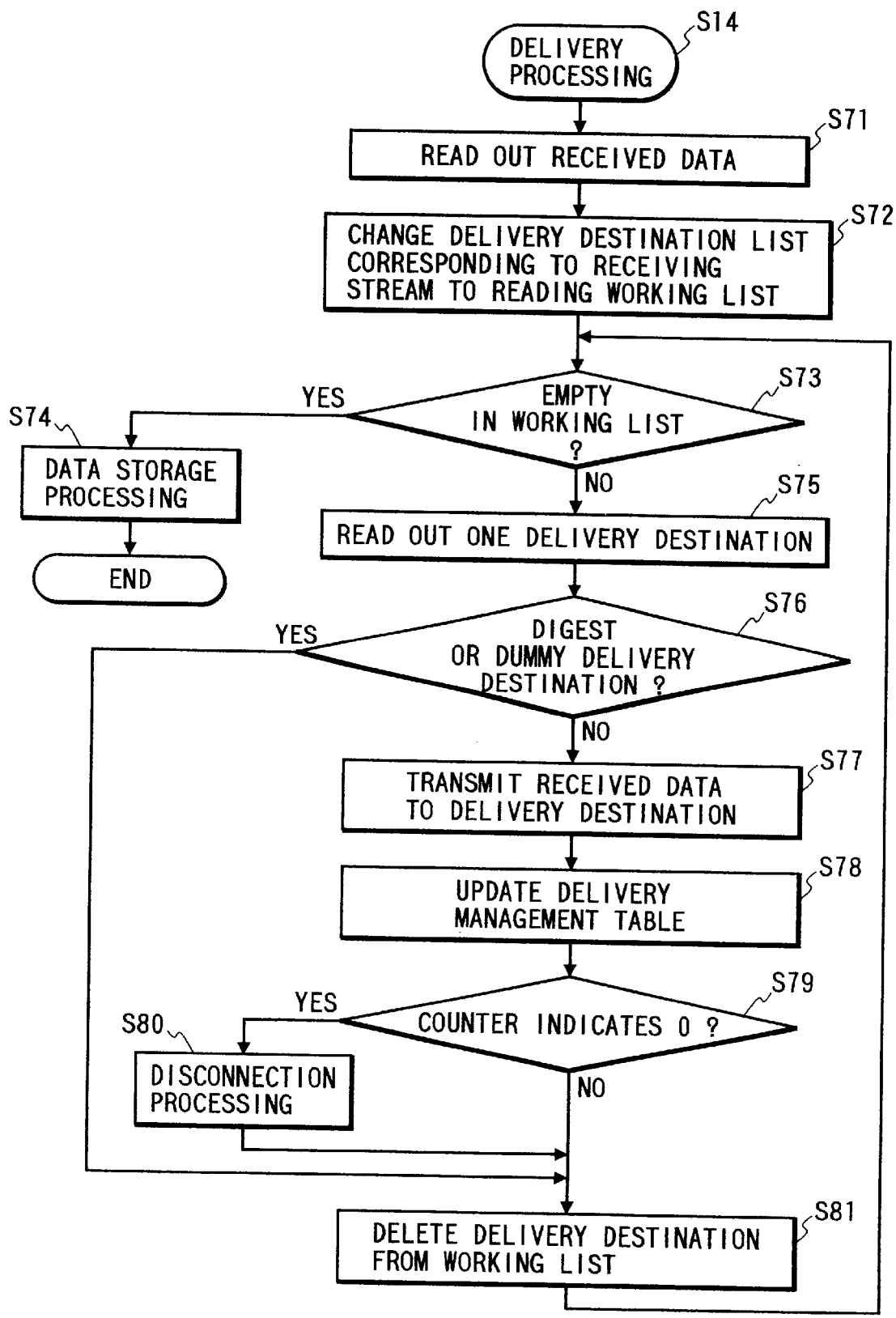
FIG. 16 is a flow chart illustrating the details of a delivery process (S14) shown in FIG. 10.

FIG. 16 is a flow chart illustrating the contents of the delivery process at Step S14 which is activated in succession after the data reception at Step S13 in the flow chart of FIG. 10.

This process includes: Step S71 for reading reception data; Step S72 for reading a delivery list from the reception stream in the delivery management table 312 and inserting it into a working list 316; Step S73 for judging whether the working list 316 is empty; Step S74 for storing digest data if the working list 316 is empty; Step S75 for reading one delivery destination from the working list 316 if it is not empty; Step S76 for judging whether the read delivery destination is in a digest mode not necessary to transmit received data or receive data from the upstream only for data storage, i.e., has a delivery destination ID of a negative value (dummy data); Step S78 for updating the delivery management table 312 for delivery; Step S79 for judging whether the connection time counter of the delivery management table 312 is "0" after the table updating; Step S80 for disconnecting from the delivery destination if the connection time counter 12 is "0"; and Step S81 for deleting the read delivery destination from the working list 316 to shorten the working list 316.

Specifically, the delivery processing unit 104 starts the delivery process for the data to be delivered among the data received by the input processing unit 102. The delivery processing unit 104 reads the received data at Step S71, and with reference to the delivery management table 312, reads the delivery destination from the delivery destination ID 702 of the received data stream 701 and enters it into the working list 316 (Step S72). The flow then advances to Step S73 to check whether the working list 316 is empty.

If not empty, the flow advances to Step S75 to read one delivery destination from the working list 316. At Step S76 it is checked whether the delivery destination ID has a negative value or the digest 704 in the delivery management table 312 corresponding to the delivery destination is "True". If affirmative, it means that the digest transmission has been set and it is not necessary to transmit data so that the flow advances to Step S81, and in the other case the flow advances to Step S77. At Step S77 the delivery processing unit 104 transmits the received data from the output processing unit 103 to the delivery destination, and decrements the corresponding connection time counter 703 in the delivery management table 312 by "1" (Step S78). It is checked at Step S79 whether the value of the connection time counter 703 is "0" or smaller. If "0" or smaller, the flow advances to Step S80 to perform the disconnection process for the delivery destination because the connection time (frame number) exceeded a limit value. After this Step S80 or if the value of the counter 703 is not "0" or smaller at Step S79, the flow advances to Step S81 whereat the processed delivery destination is deleted from the working list 316 to return to the next delivery destination.

If the working list 316 is empty at Step S73, the flow advances to Step S74 whereat the delivery processing unit 104 passes the control to the data storage process.

Figure 17:
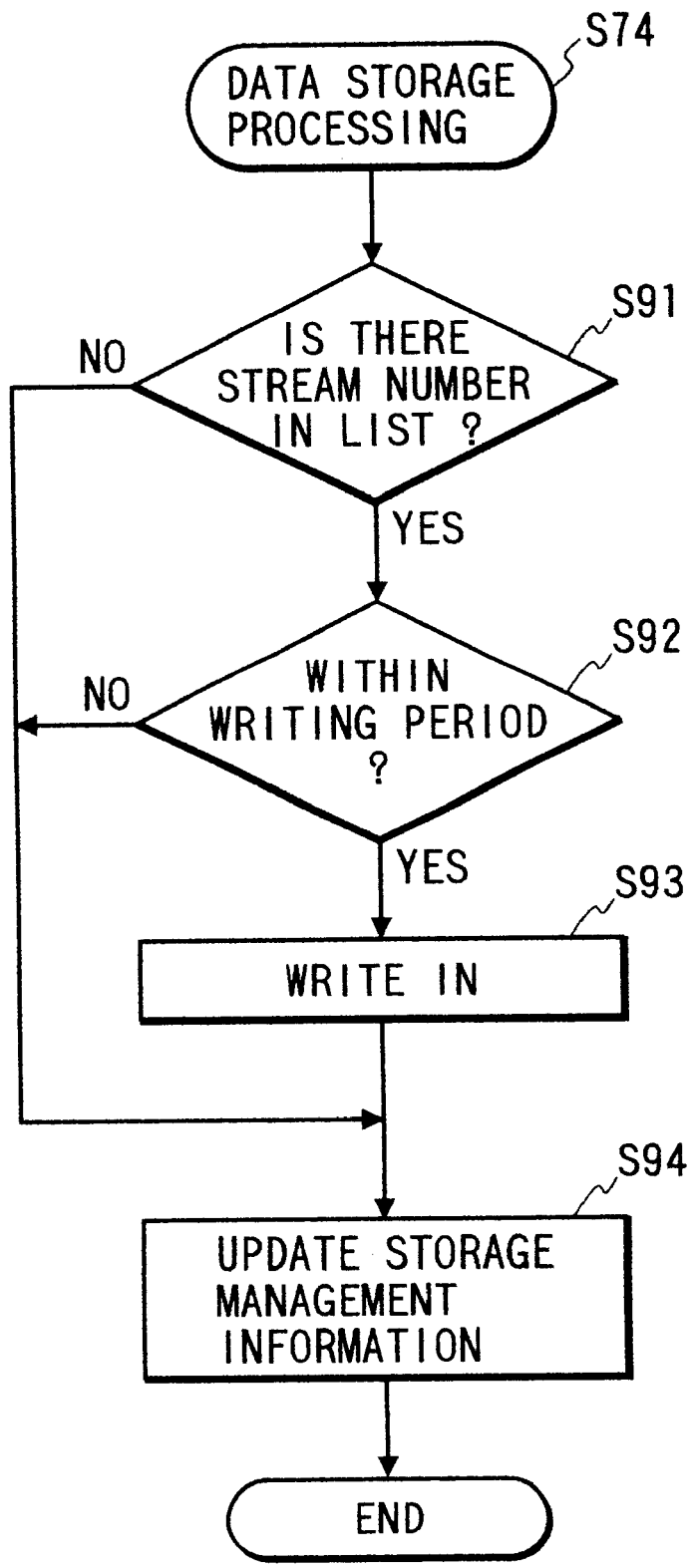
FIG. 17 is a flow chart illustrating the details of a data storage process (S74) shown in FIG. 16.

FIG. 17 is a flow chart illustrating the contents of the data storage process at Step S74 shown in FIG. 16.

This process includes: Step S91 for judging whether a steam is a stream to be stored; Step S92 for judging whether the current time or frame is in the write period; Step S93 for actually writing received data in the data storage unit 106; and Step S94 for updating the storage management information.

First at Step S91 the delivery processing unit 104 refers to the storage management table 313 to judge whether the number of the stream including the received data to be processes is in the storage management table 313. If not, the flow advances to Step S94, whereas if present, the flow advances to Step S92 whereat it is judged by referring to the reading flag 805 in the storage management table 313 whether data is now being read. If the reading flag 805 is "False", it means the current time is not in the write period and so the flow advances to Step S94, whereas if this flag 805 is "True", the flow advances to Step S93 to write the received data in the data storage unit 106 to follow Step S94. At Step S94 the storage management information written in the storage management table 313 is updated.

Figure 18:
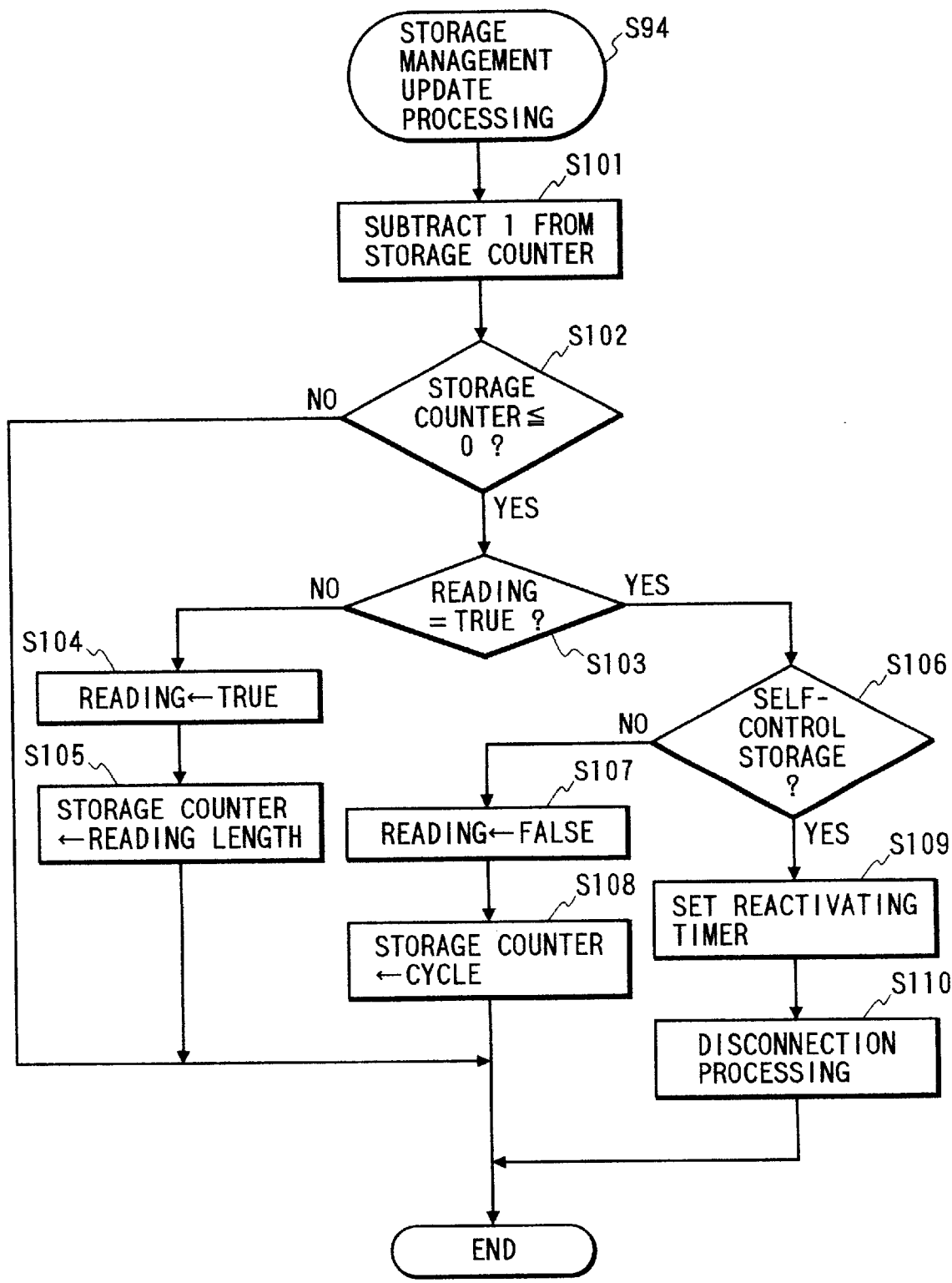
FIG. 18 is a flow chart illustrating the details of a storage management information updating process (S94) shown in FIG. 17.

FIG. 18 is a flow chart illustrating the process of updating storage management information at Step S94 shown in FIG. 17. This process includes: Step S101 for decrementing by "1" the value of the storage counter 804 at the corresponding entry of the storage management table 313; Step S102 for judging whether the value of the storage counter 804 is "0" or smaller; Step S103 for judging whether the reading flag 805 is "True"; Step S104 for setting the reading flag 805 to "True"; Step S105 for entering the value in the reading length 803 into the storage counter 804; Step S106 for judging whether the operation is the self-control mode; Step S107 for setting the reading flag 805 to "False"; Step S108 for entering the value of the cycle 802 into the storage counter 804; Step S109 for setting the re-start timer for self-control storage; and Step S110 for the disconnection process.

First at Step S101 the delivery processing unit 104 accesses the entry of the storage management table 313 at the corresponding entry and decrements by "1" the storage counter 804. Next at Step S102 the value of the storage counter 804 is compared with "0". If larger than "0", it means no change and the process is terminated. If "0" or smaller, the flow advances to Step S103 to check the value of the reading flag 805. If this flag 805 is not set to "True", the flow advances to Step S104 whereat the reading flag 805 is set to "True" and at Step S105 the value of the reading length 803 is set to the storage counter 804 to terminate the process.

If it is judged at Step S103 that the reading flag 805 is "True", the flow advances to Step S106 to check the value of the self-control mode 806. If the self-control mode is not "True", the flow advances to Step S107 whereat the reading flag 805 is set to "False" and at Step S108 the value of the cycle 802 is entered into the storage counter 804. If it is judged at Step S106 that the self-control mode 806 is "True", the flow advances to Step S109. At Step S109 the value of the access interval 602 of the storage setting table 311 at the corresponding entry of the stream shown in FIG. 6 is referred to set a time to the timer in order to re-start the self-control storage process. Next at Step S110 the disconnection process for the stream is performed. The contents of this disconnection process are similar to those described with reference to the flow chart of FIG. 14.

With the above operations, a stream is once disconnected when the data storage is completed in the self-control storage mode, and is again connected after a lapse of the designated time period to resume reception and storage of data. In the case of a stream not in the self-control storage mode, data storage continues by the amount corresponding to the value of the reading length 803 in the storage management table 313, and after the lapse of the time indicated by the cycle 802, data storage is resumed. These operations are repeated. In this manner, data in the data storage 106 is periodically updated so that new data is always stored.

Figure 19:
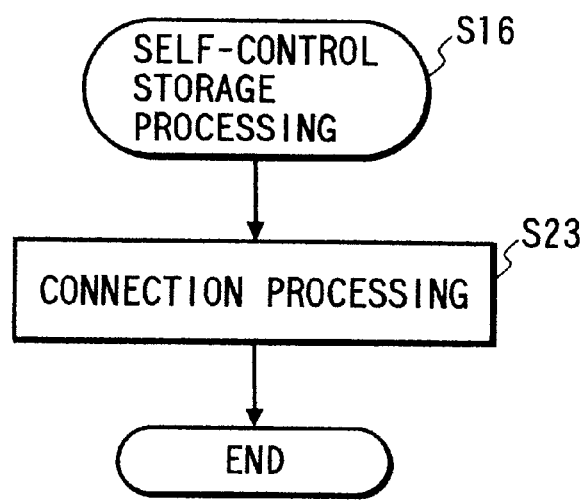
FIG. 19 is a flow chart illustrating the details of a self-control storage process (S16) shown in FIG. 10.

FIG. 19 is a flow chart illustrating the contents of the self-control storage process at Step S16 shown in FIG. 10. This process is performed by the connection process same as that at Step S23 shown in FIG. 11.

FIG. 20 is a flow chart illustrating the contents of the digest transmission process at Step S18 shown in FIG. 10. This process includes: Step S121 for reading the delivery table 315 corresponding to a digest and forming the working list 316; Step S122 for judging whether the working list 316 is empty; Step S123 for reading one delivery destination; Step S124 for transmitting received data (digest data) stored in the data storage unit 106 to the delivery destination; Step S125 for updating the delivery management table 312; Step S126 for judging whether the value of the digest counter 705 updated at Step S125 is "0"; Step S127 for judging whether the delivery stream is dummy; Step S128 for deleting the delivery destination; Step S129 for recovering the delivery destination; Step S130 for deleting the delivery destination from the working list 316; Step S131 for judging, if the working list 316 is empty, whether there is a digest request; and Step S132 for setting the timer in order to transmit digest data.

First at Step S121 the delivery processing unit 104 refers to the delivery management table 312 to search the delivery destination with the digest 704 of "True". If there is such a delivery destination, it is entered into the working list 316. Next at Step S122 it is checked whether the working list 316 is empty. If empty, the flow advances to Step S131, whereas if not, the flow advances to Step S123. At Step S123 one delivery destination is read from the working list 316, and at Step S124 data in the data storage unit 106 is read and transmitted to the read delivery destination. Next at Step S125 the value of the digest counter 705 of the delivery management table 312 is decremented by "1" and at Step S126 it is judged whether the value of the digest counter 705 is "0". If not, the flow advances to Step S130 whereat the delivery destination is deleted from the working list 316 to return to Step S122.

If it is judged at Step S126 that the value of the digest counter 705 is "0", the flow advances to Step S127 whereat if the delivery stream ID 701 of the delivery management table 312 has a negative value, the delivery stream is dummy so that the flow advances to Step S128 of a delivery destination deletion process. If not dummy, the flow advances to Step S129 to execute a delivery destination recovery process. Namely at Step S128 the entry of the delivery destination is deleted from the delivery management table 312, and at Step S130 the delivery destination is deleted from the working list 316 to return to Step S122. At Step S129 the digest 704 at the entry corresponding to the delivery destination in the delivery management table 312 is set to "False" to advance to Step S130 whereat the delivery destination is deleted from the working list 316 to return to Step S122. The processes from Step S122 to Step S130 are repeated until the working list 316 becomes empty. After the working list 316 becomes empty at Step S122, the flow advances to Step S131 whereat the delivery management table 312 is referred to judge whether there is an entry with the digest 704 of "True". If present, the flow advances to Step S132 to set the timer 306 for re-starting the digest transmission process. If there is no entry with "True" at Step S131, the process is then terminated.

As above, the operations illustrated in the flow chart of FIG. 20 are repeated by resetting the timer 306. Therefore, data stored in the data storage unit 106 can be transmitted to a delivery destination which issued a digest request. Setting the digest counter 705 is realized by setting the length (frame number) of digest data to be delivered. The order of reading data stored in the storage unit 106 is sequentially incremented each time the digest transmission process is called, and when all data is read, the order returns to the original point.

When digest data is transmitted, additional information such as an address, a port number and a stream number of an information source is written in the header of a data packet so that this information as well can be transmitted to the reception side at the downstream. As an alternative, a control packet different from a data packet may be formed to transmit the above information. This alternative method can be realized by using RTCP (RT Control Protocol) described in one of standard documents of Internet Engineering Task Force, RFC 1889 (A Realtime Transport Protocol). By adjusting a ratio of control packets, a load of data flow can be regulated.

It is obvious that by displaying, at a terminal of the delivery destination of storage data, the data and additional information, a client can select a desired information source and issue a connection request to a delivery server of this embodiment.

Figure 21:
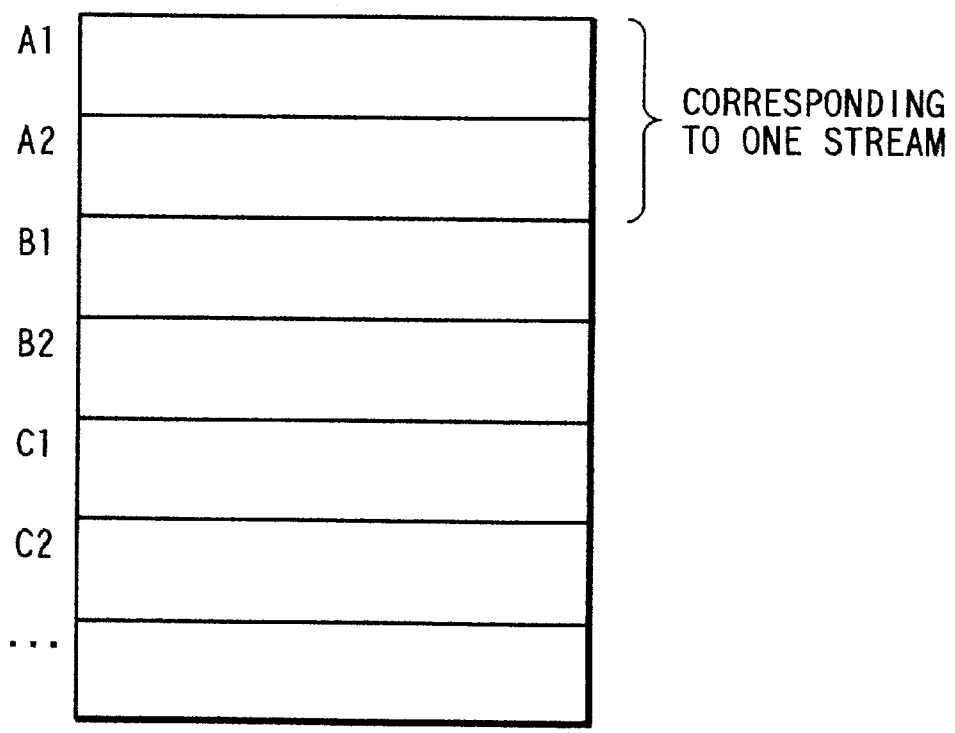
FIG. 21 is a diagram showing an example of the structure of a buffer memory of a data storage unit.

FIG. 21 is a diagram showing an example of the buffer memory of the data storage unit 106 to be used for data storage. In this example, each stream is provided with two buffer areas (A1 and A2, . . . ).

FIG. 22 is a diagram showing a portion of the storage management table 313 similar to that shown in FIG. 8.

In addition to the data structure shown in FIG. 8, this table shown in FIG. 21 stores two pointers for the stream number 801, a read pointer 811 and a write pointer 812, locations 813 and 814 of two read and write buffers, and a read completion flag 815. As will be described later, this read completion flag 815 is used for indicating a wait for completion of a read process of reading a read buffer before the switching between the read buffer and write buffer.

The structure of these buffer memories allows to execute updating the contents of buffers and transmitting digest in parallel. Specifically, a buffer under the write operation is not used for data read, but only those buffers assigned as read buffers are used sequentially from the top to down in the storage management table 313 while referring to the read buffer location 813 and pointer 811 in the storage management table 313. As this read operation is performed, the read pointer 811 is incremented by "1", and when the read pointer 811 takes the same value as the reading length 803, reading the butter is completed. In this case, if the read completion wait flag is set to "True", the read butter and write buffer are exchanged, and thereafter the read completion wait flag 815 is set to "False" and both the read and write pointers 811 and 812 are set to "0".

As shown at the second row of FIG. 22 (at the entry of the stream number "123"), if the read buffer is not still in a use state, the value for the read buffer will not take a normal value "1" or larger but it always takes "0", and such a stream is skipped from reading it.

Figure 23:
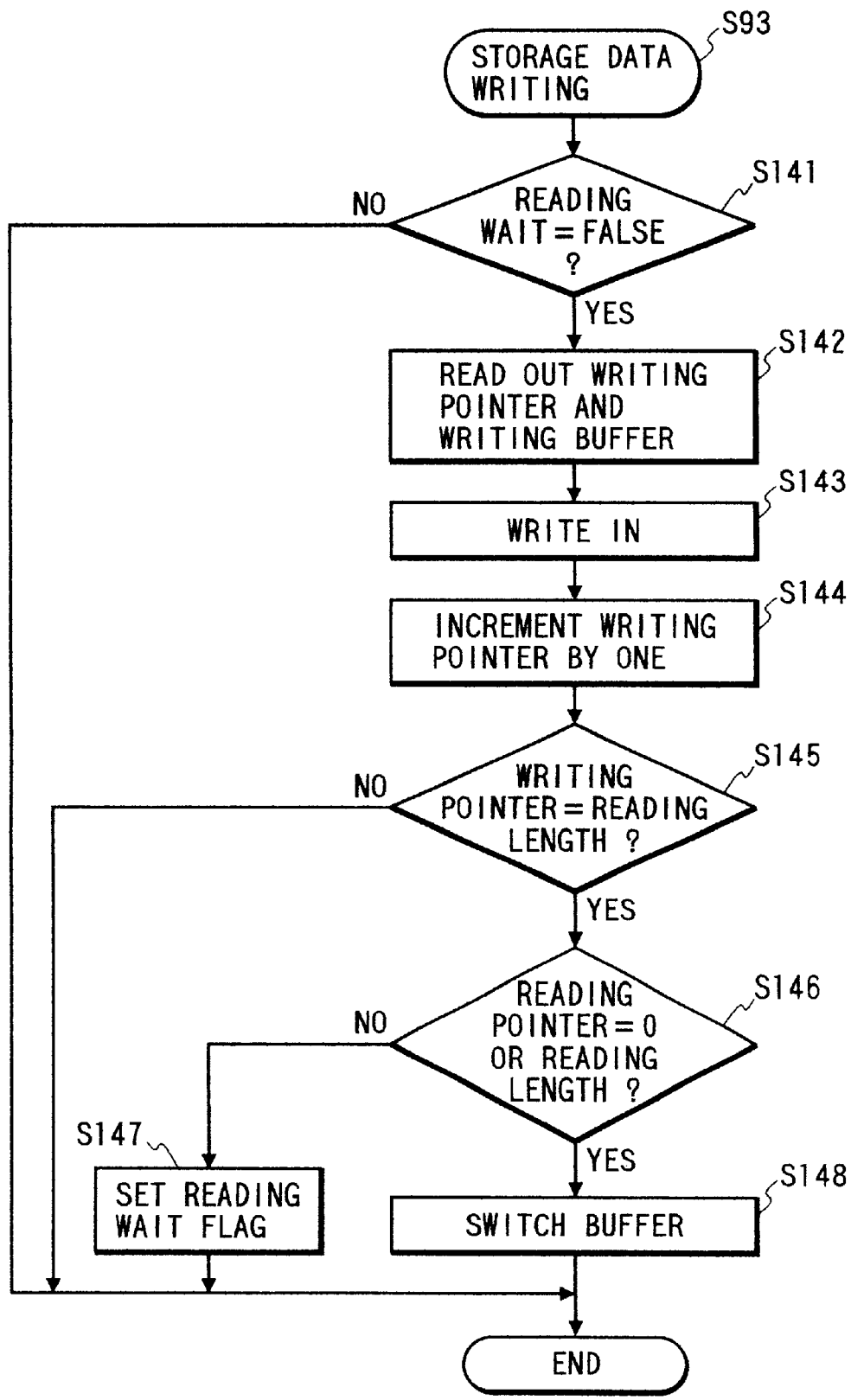
FIG. 23 is a flow-chart illustrating the details of a storage data writing process (S93) shown in FIG. 17.
Figure 24:
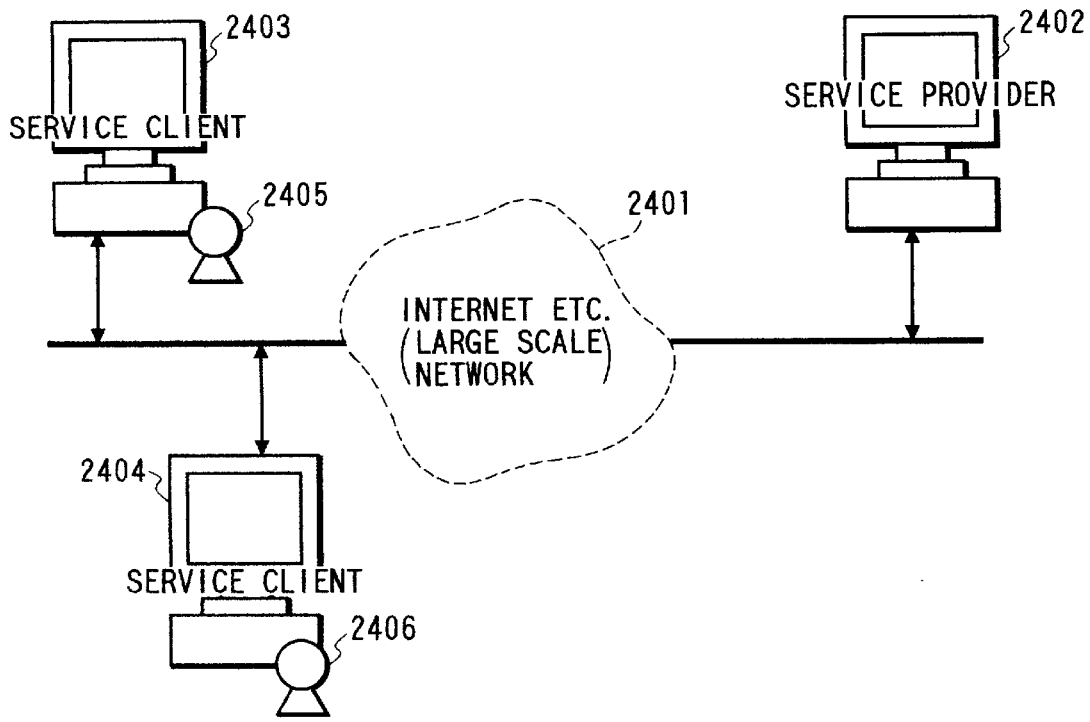
FIG. 24 is a conceptual diagram illustrating service presentation by a service provider.

FIG. 23 is a flow chart illustrating the operation of writing storage data at Step S93 shown in FIG. 17. This process includes: Step S141 for judging whether the read completion wait flag 815 is "False"; Step S142 for reading write pointer 812 and write buffer location 814 from the storage management table 313; Step S143 for writing received data in a location designated by the write pointer 812 and write buffer 814: Step S144 for incrementing the write pointer 812 by "1"; Step S145 for judging whether the value of the write pointer 812 becomes equal to the reading length 803; Step S146 for judging whether the read pointer 811 is "0" or equal to the reading length 803; Step S147 for setting the read completion wait flag 815; and Step S148 for performing a buffer switching operation.

In writing the reception data, the data storage unit 106 first refers to the entry of a reception entry in the storage management table 313 and judges whether the read flag 815 is set. If this flag is not "False" (set), it is judged that the write operation is not allowed until the read operation is completed, and the process is terminated. If the read flag 815 is not set and "False", then the flow advances to Step S142 to read the write pointer 812 and write buffer location 814. Next at Step S143 the data received via the network from the input processing unit 102 is written in the memory area designated by the write pointer 812 and write butter location 814, and the write pointer 812 is incremented by "1".

Next at Step S144 it is judged whether the write pointer 812 is equal to the reading length 803 (i.e., whether the write operation is completed). If the write pointer is not equal to the reading length 803 (i.e., the write operation is not still completed), the process is terminated, whereas if equal (completed), the flow advances to Step S146 whereat it is judged whether the read pointer 811 is "0" (i.e., the read operation is not performed at all) or equal to the reading length 803 (i.e., the read operation was completed). If not "0" nor equal to the reading length, the flow advances to Step S147 whereat the read completion wait flag 815 is set to "True" to terminate the process. If "0" or equal to the read length at Step S146, the flow advances to Step S148 to perform the buffer switching process to exchange the read and write buffers, and the read and write pointers are set to "0".

With the above structure, it becomes possible to store a portion of the data transmitted from an information source and deliver it as a digest to the delivery destination at the downstream.

In this case, even if there is no request from the client at the downstream, the information source at the upstream is automatically connected in accordance with predetermined setting contents and the data transmitted from the information source can be stored.

In this embodiment whose structure is illustratively shown in FIG. 2, in response to a request from the viewer 203, data from the camera server 202 can be delivered to the viewer 203 and the viewer 203 can know which camera server 202 the delivery server 100 uses for data relaying, by using the digest function.

By allowing the delivery server to set the self-control storage mode, latest video data of several designated camera servers 202 can be delivered as digest data from the delivery server 100 to the downstream side, while periodically updating the latest video data.

OTHER MODIFICATIONS

In the first embodiment, if the relay delivery function is omitted, the delivery server can be used as a so-called directory service server which collectively delivers latest data from several camera servers.

In the structure shown in FIG. 3, if a digest is requested from the lower delivery server to the upper delivery server and the data transmitted in response to this digest request is stored as a portion of digest data in the lower delivery server, then it becomes possible to deliver the information of information sources such as cameras, as digest data, to more clients.

As described so far, according to the first embodiment, it is possible to store portions of data from a plurality of information sources, and in response to a request from a user at a delivery destination terminal to collectively deliver the stored data to the client and supply the information on which type of data can be used via the relay server.

Further, since the main data to be supplied from an information source is continuous data such as video and audio data, it is easy to store and read a portion of the data.

Still further, since the storage method of data to be delivered is made settable in accordance with setting information and a portion of the data transmitted from an information source is stored in the setting information, data can be stored properly in accordance with the conditions of the delivery server.

Still further, in the delivery server of this embodiment, the data storage method is made settable in accordance with at least three parameters, including a data reading side, a data reading length and a data reading interval. Accordingly, it is possible to obtain the data of a designated length at a designated interval from a designated information source (data reading side). Furthermore, a plurality of information sources (data reading sides) can also be set.

Still further, in response to a relay delivery request from a delivery destination (client), a data delivery can be requested to an information source, and the storage method of data from the information source can be made to be capable of storing a portion of the delivery data. Accordingly, the data delivery via the delivery server in response to a request from the delivery destination and the generation of digest data from the delivered data can be performed at the same time.

Still further, data is requested periodically at a predetermined interval to an information source and a portion of the data is stored. Accordingly, it is possible to automatically access latest data of the information source and to transmit digest data of the accessed data.

Still further, in storing a portion of data from an information source, the data is stored in a double-buffer. It is therefore possible to perform the operation of writing and storing data and the operation of reading data for the digest data delivery to a client both at the same time.

As described so far, with the above-described configuration, it is possible to store a portion of data from an information source and to transmit the stored data to a client in response to a request from the client.

Further, with the above-described configuration, data is requested to an information source in response to a request from a client, a portion of the data transmitted from the information source in response to the request is stored, and the stored data can be transmitted by a desired amount.

Still further, with the above-described configuration, data is requested to an information source periodically and at a preset interval, a portion of the data is stored, and the stored data can be transmitted as desired.

SECOND EMBODIMENT

In the second embodiment, a remote camera service system will be described with reference to relevant drawings. This remoter camera system allows a user to see an image picked up with a video camera installed at a remote site and transmitted via a network such as Internet.

Figure 25:
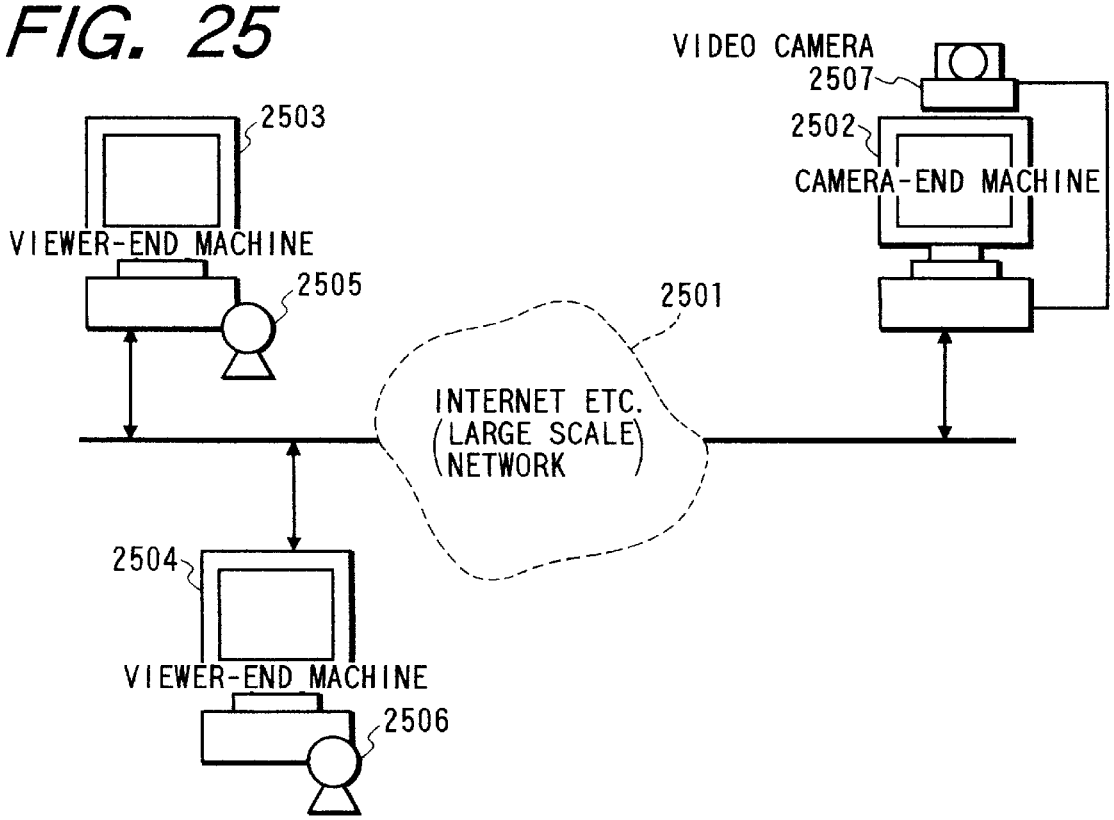
FIG. 25 is a conceptual diagram illustrating a remote camera service system according to a second embodiment of the invention.

FIG. 25 shows one example of using a remote camera service system. In FIG. 25, a camera-end machine 2502 and viewer-end machines 2503 and 2504 are connected via a large scale network 2501 such as Internet. The camera-end machine is a host equipped with a video camera 2507 which is operated by a service provider called a camera-end server. An image picked up with the video camera 2507 installed at the camera-end machine 2502 is delivered by the camera-end server to the viewer-end machines 2503 and 2504.

The viewer-end machine 2503, 2504 is a host operated by a service client (viewer-end process) corresponding to the camera-end server. The viewer-end process displays an image delivered from the camera-end machine 2502 to the display unit of each viewer-end machine 2503, 2504 to allow a user to see an image at a remote site. In FIG. 25, one camera-end machine and two viewer-end machines are configured in the system. However, in practice, a number of camera-end machines and viewer-end machines are provided on the large scale network.

Figure 26:
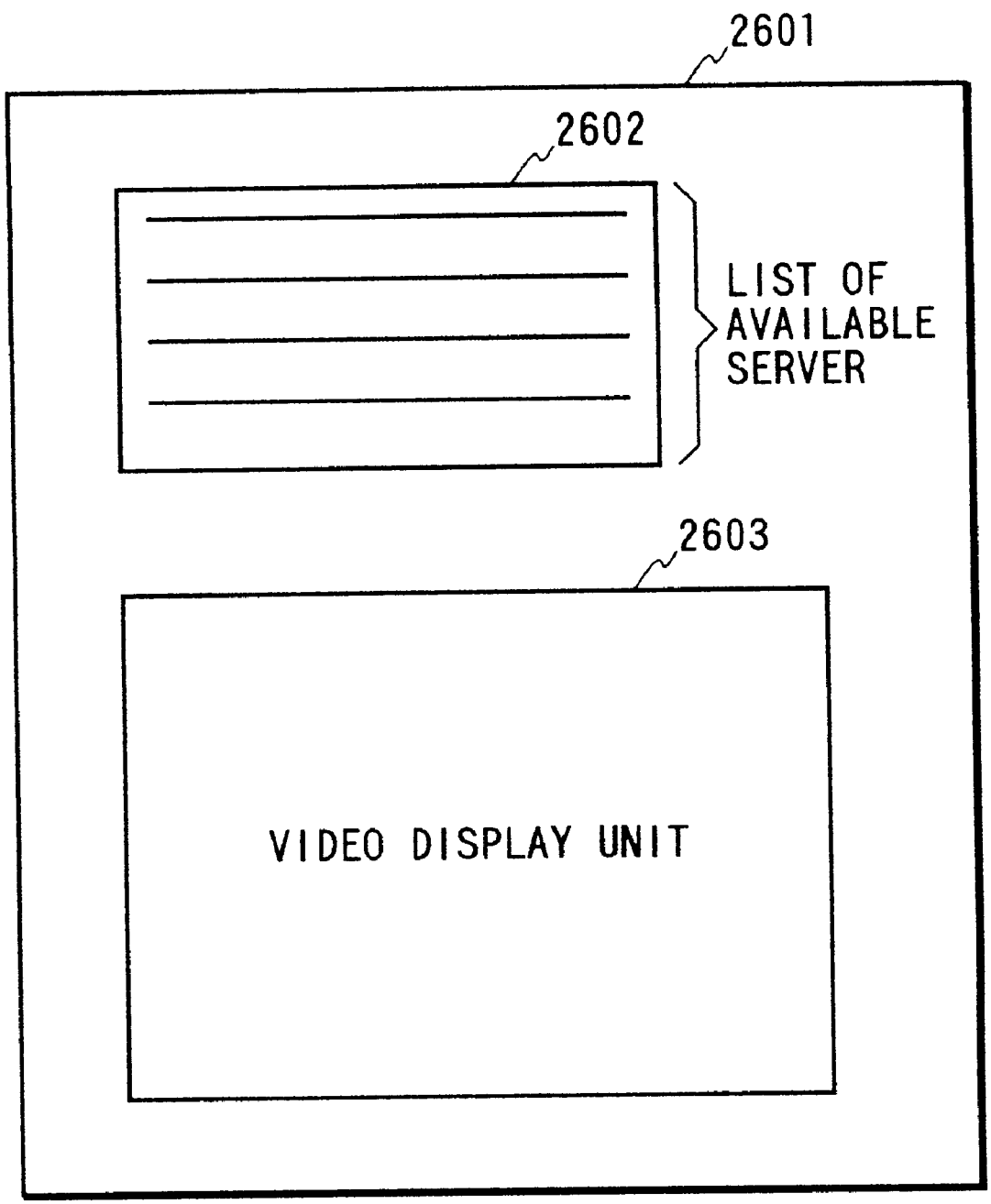
FIG. 26 is a diagram showing the outline of a user interface provided by a viewer-end process according to the second embodiment of the invention.

A user interface which the viewer-end process supplies to users is illustrated in FIG. 26. On the display unit of each viewer-end machine 2503, 2504, a window 2601 is displayed. Formed in this window 2601 are a list 2602 of available video cameras and a video display unit 2603 for displaying an image sent from a camera-end server. When a user selects a desired video camera from the video camera list 2602, an image picked up with this video camera is displayed in the video display unit.

In this embodiment, information of a camera-end server necessary for generating the video camera list 2602 is obtained and a relay process of relaying video data delivered from a camera-end server is realized.

Figure 27:
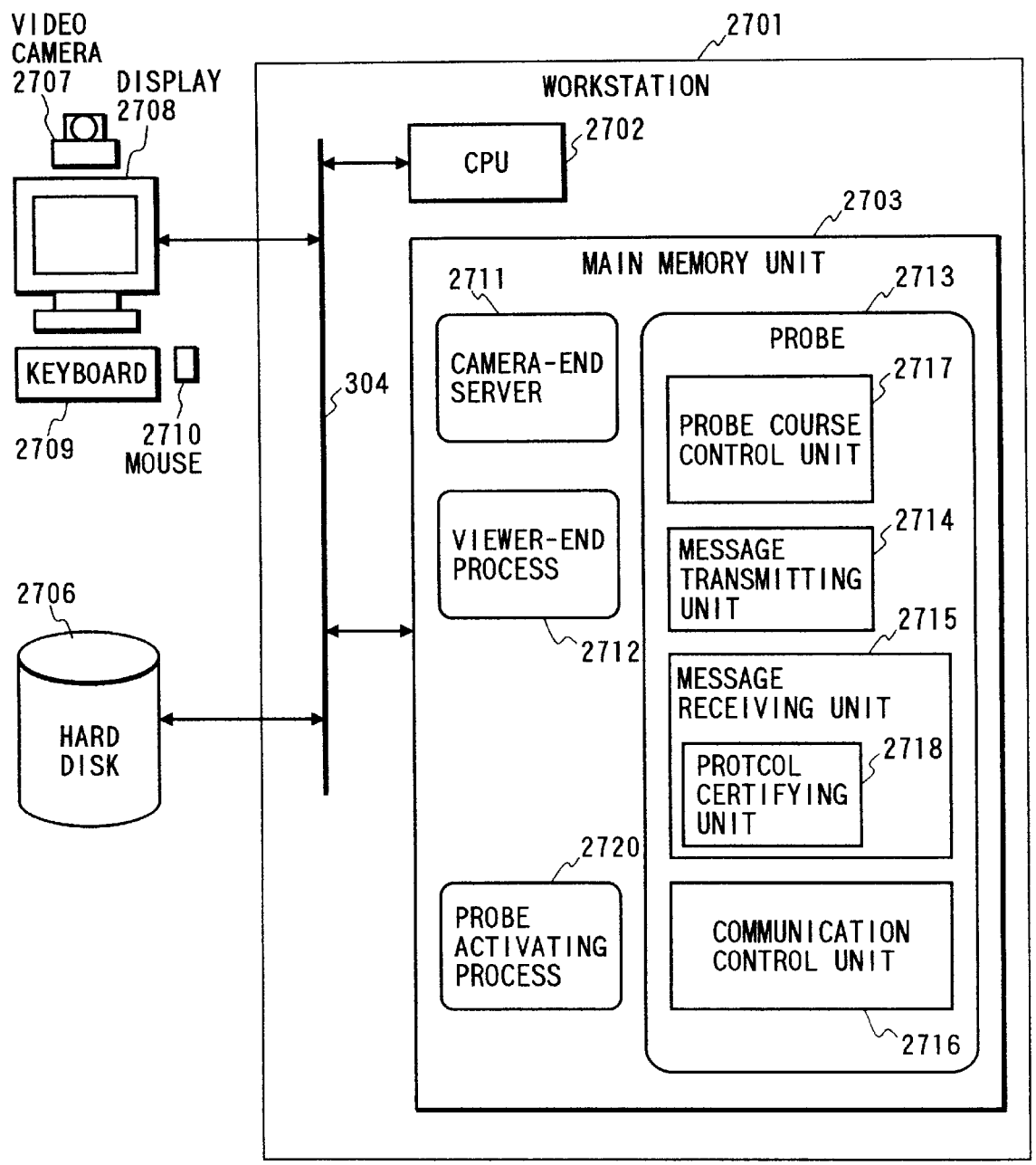
FIG. 27 is a conceptual diagram illustrating a remote camera service system of the second embodiment.

FIG. 27 is a diagram showing the structure of the remote camera service system.

In FIG. 27, a work station 2701 is configured by connecting a computer bus 2704 to a CPU 2702 constituted of a microprocessor and the like performing processes of this embodiment and to a main memory unit 2703 having a main process group 2711, 2712 and 2713 of this embodiment. The process group 2711, 2712 and 2713 performs the operations to be later described on an operating system (hereinafter called an OS) of the work station 2701.

Also connected to the work station are: a hard disk 2706 as a secondary memory unit for storing programs of the process group 2711, 2712 and 2713 in the main memory unit 2703; a video camera 2707 for image input/output; a display unit 2708, a keyboard 2709 and a mouse 2710.

A camera-end server 2711 is a service provider operating on the camera-end machine 2502 shown in FIG. 25. An image picked up with the video camera 2707 is delivered via the network 2501 to the viewer-end process 2712.

The viewer-end process 2712 is a service client operating on the viewer-end machine 2503, 2504 shown in FIG. 25, and displays an image delivered from the camera-end server 2711.

Figure 28:
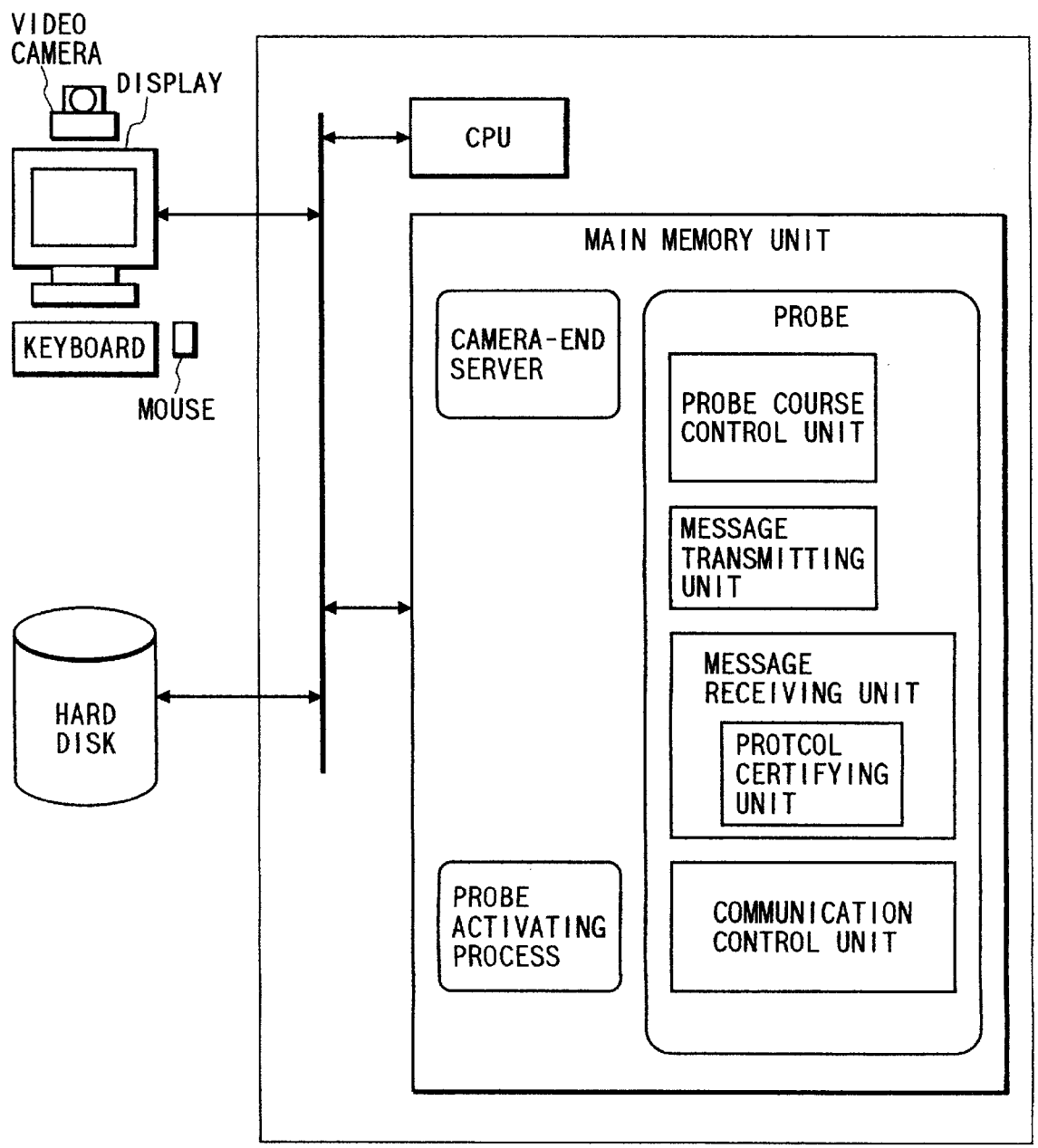
FIG. 28 is a conceptual diagram illustrating a remote camera service system according to a first modification of the second embodiment.
Figure 29:
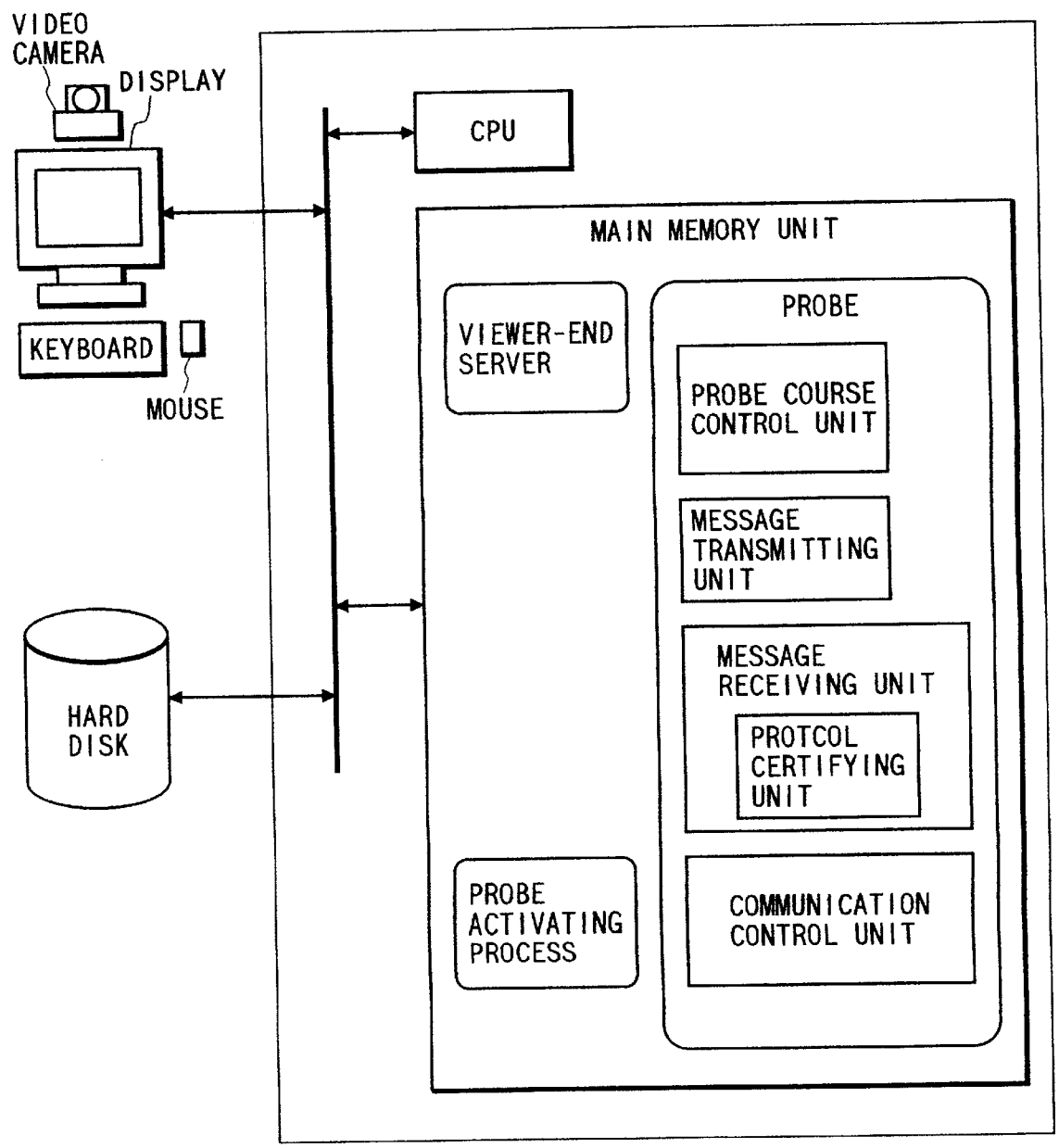
FIG. 29 is a conceptual diagram illustrating a remote camera service system according to a second modification of the second embodiment.

In FIG. 27, although the camera-end server 2711 and viewer-end process 2712 are operating on the same host, these may be operated on different hosts as shown in FIGS. 28 and 29, like the different hosts connected by the network shown in FIG. 25.

Figure 30:
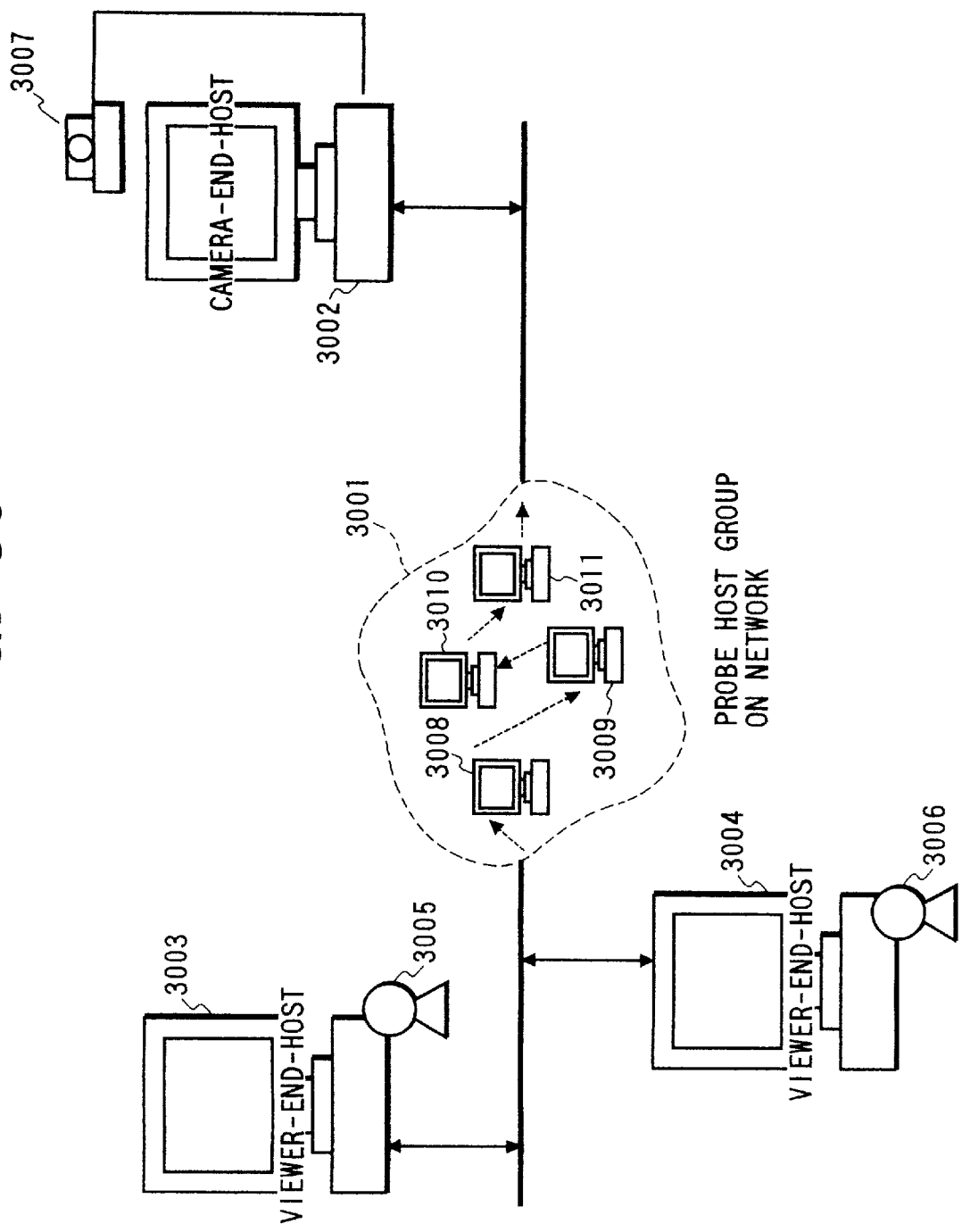
FIG. 30 is a conceptual diagram illustrating data search and relay by a probe of the second embodiment.

A probe 2713 is a process of supporting the viewer-end process 2712 for the execution of its process of searching the camera-end server 2711 and relaying video data from the camera-end server 2711 to the viewer-end process 2712. As shown in FIG. 30, the probe 2713 is activated on a plurality of hosts (probe hosts) on the network as shown in FIG. 30 during the search process of the camera-end server 2711. Also in the system shown in FIG. 30, similar to FIG. 25, an image of a video camera 3007 is delivered from a camera-end host 3002 to a viewer-end host 3003, 3004, and a user 3005, 3006 sees the image. The probe is activated on the four hosts 3008, 3009, 3010 and 3011 on the network 3001. These probes form a relay course (hereinafter called a probe course), and in accordance with this probe course, image information is delivered. In the probe course, the probe nearest to the viewer-end process is called a head probe and that nearest to the camera-end server is called as a last probe. In FIG. 30, the probe 3008 is the head probe and the probe 3011 is the last probe.

The probe 2713 is constituted of the following modules.

Message transmitting unit 2714:

This module performs the transmission of a search message, a probe control message and image data. The main transmission destinations are the camera-end server 2711, viewer-end process 2712 and other probes. This module may be realized by utilizing a socket of OS such as UNIX and Windows. Namely, this module transmits the search message, probe control message and image data by utilizing the transmission function of OS such as Windows or the transmission function of an application running on OS such as Windows.

Message receiving unit 2715:

This module receives a search message, image data and a probe control message sent to the probe 2713. This module can also be realized by using a socket of UNIX, Windows or the like. Namely, this module receives the search message, probe control message and image data by utilizing the reception function of OS such as Windows or the reception function of an application running on OS such as Windows.

In this embodiment, the message receiving unit 2715 includes a protocol certifying unit 2718.

The protocol certifying unit 2718 checks whether the message received at the message receiving unit 2715 was transmitted in the correct format. This check is performed by using a transmission originating side, message identifier and the like added to the header of the message.

Communication control unit 2716:

This module controls the search of services using a search message. The communication control unit 2716 determines another delivery destination of a search message received by the message receiving unit 2715 and certified by the protocol certifying unit 2718.

As the delivery destination is determined, the search message is transmitted again from the message transmitting unit 2714.

This module also delivers image information transmitted from the camera-end server 2711. This process is similar to the search message delivery, and the delivery destination is determined by the communication control unit 2716.

Probe course control unit 2717:

The search process of the camera-end server 2711 by using the search message forms a probe course constituted of a chain connection of a plurality of probes such as shown in FIG. 30. The probe course control unit 2717 controls a leap-back process and a cut-end process which remove unnecessary probes from this probe course (the details of the leap-back and cut-end processes will be later given).

The probe 2713 is not activated explicitly by a user or in advance as in the case of the camera-end server 2711 or viewer-end process 2712, but automatically activated urging the search process of the service provider. A prove activating process 2720 activates the probe 2713. This process may be realized by using a known remote program activating engine such as an inetd demon of UNIX.

In the following description, it is assumed that a message and data are transmitted from the message transmitting unit of the probe to the network by using a transmission function of an application running on OS. It is also assumed that a message and data are received by the message receiving unit of the probe by using the reception function of an application running on OS.

The outline of the search process of the camera-end server to be executed by the probe will be described with reference to FIGS. 31A and 31B. FIG. 32 is a flow chart illustrating the operation of the communication control unit of the probe.

Figure 31A:
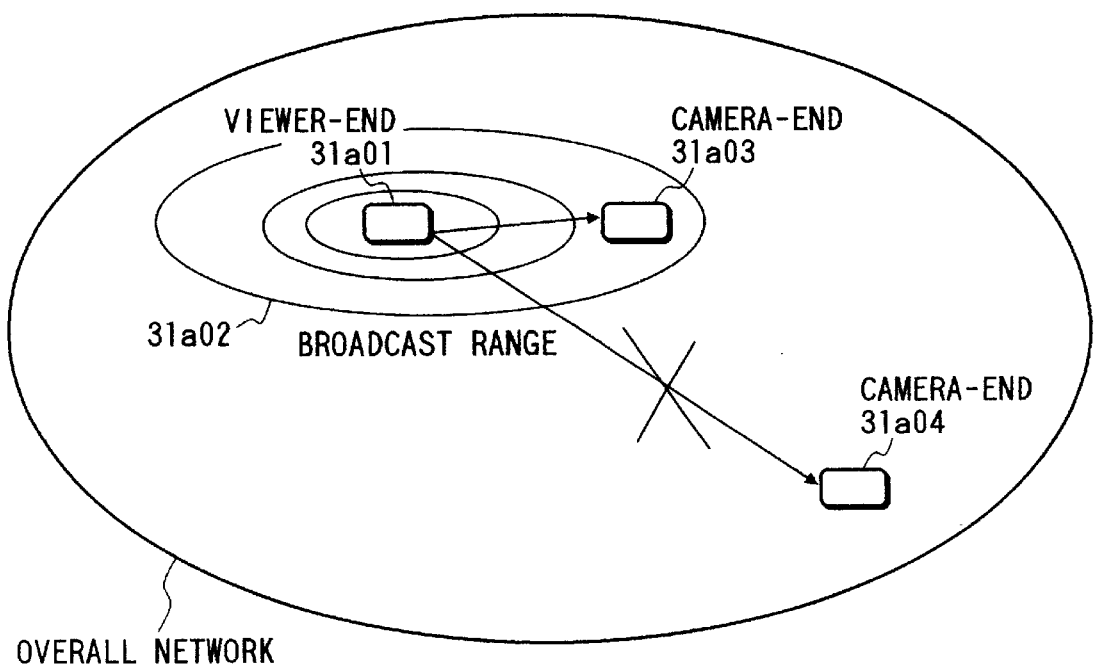
FIGS. 31A and 31B are diagrams illustrating the flow of a search process of the second embodiment.
Figure 32:
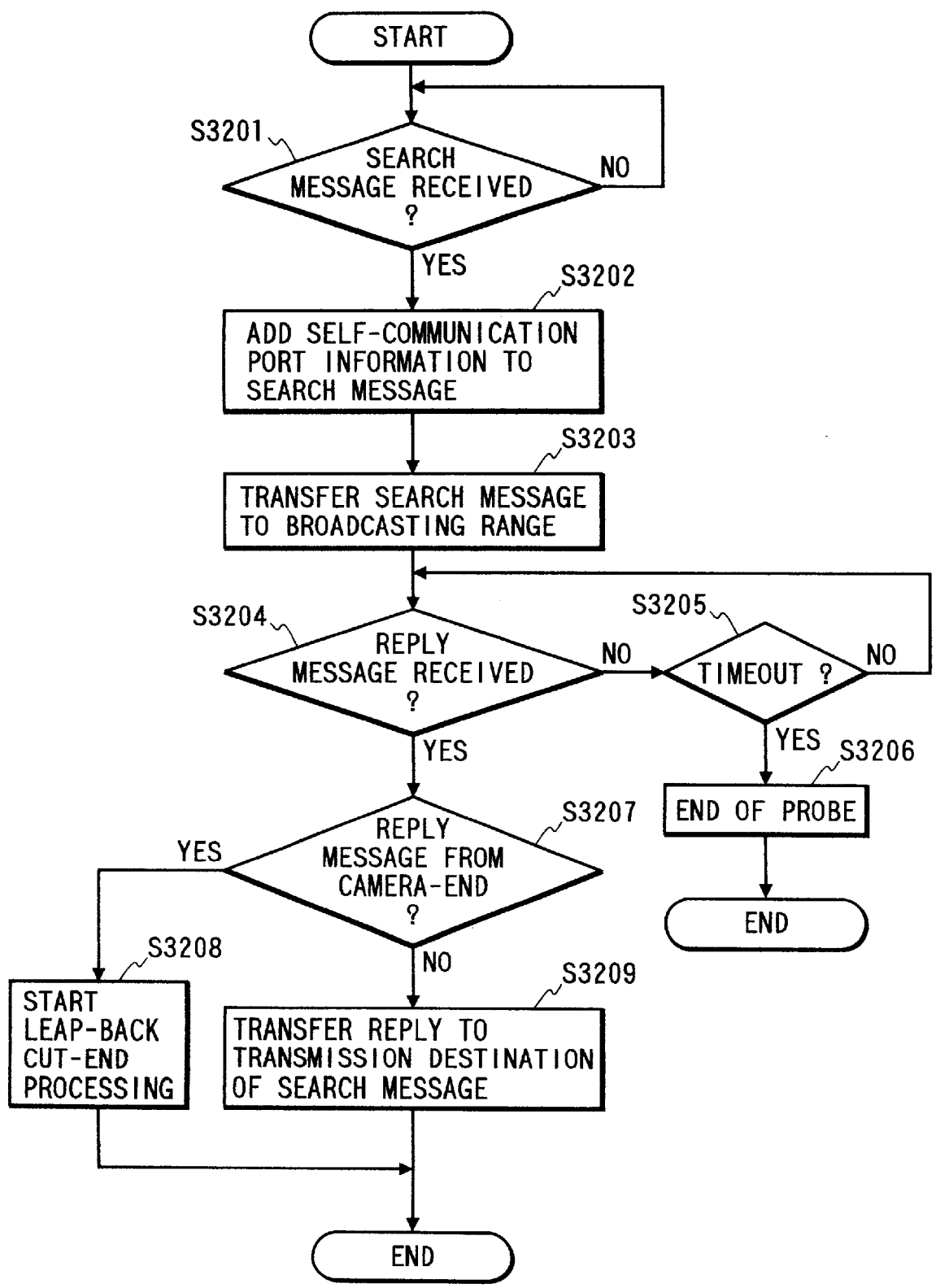
FIG. 32 is a flow chart illustrating the operation of a probe in the search process of the second embodiment.

In FIG. 31A, it is assumed that a viewer-end process 31a01 starts the camera-end server search. In this case, the viewer-end process 31a01 broadcasts a search message including its own address, a control signal for automatically activating the probe received the message, and information indicating that the camera-end server is under search. The broadcast area of this search message is an ellipsoidal area 31a02 which is a partial area of the whole network. This area is designated by a broadcast IP address (e.g., "150.61.26.255").

Since a camera-end server 31a03 is in this broadcast area 31a02, it can receive the search message. Upon reception of the search message broadcast from the viewer-end process 31a01, the camera-end server 31a03 returns a reply message relative to the search message to the viewer-end process 31a01. This reply message includes information indicating that the camera-end server 31a03 is a camera-end server, and information regarding available services. Upon reception of this reply message, the viewer-end process 31a01 can acquire the information (available services and the like) of the camera-end server 31a03.

Another camera-end server 31a04 is not in the broadcast area 31a02 of the viewer-end process 31a01. Therefore, the search message of the viewer-end process 31a01 cannot reach the camera-end server 31a04, and the viewer-end process 31a01 cannot detect the camera-end server 31a04.

Figure 31B:
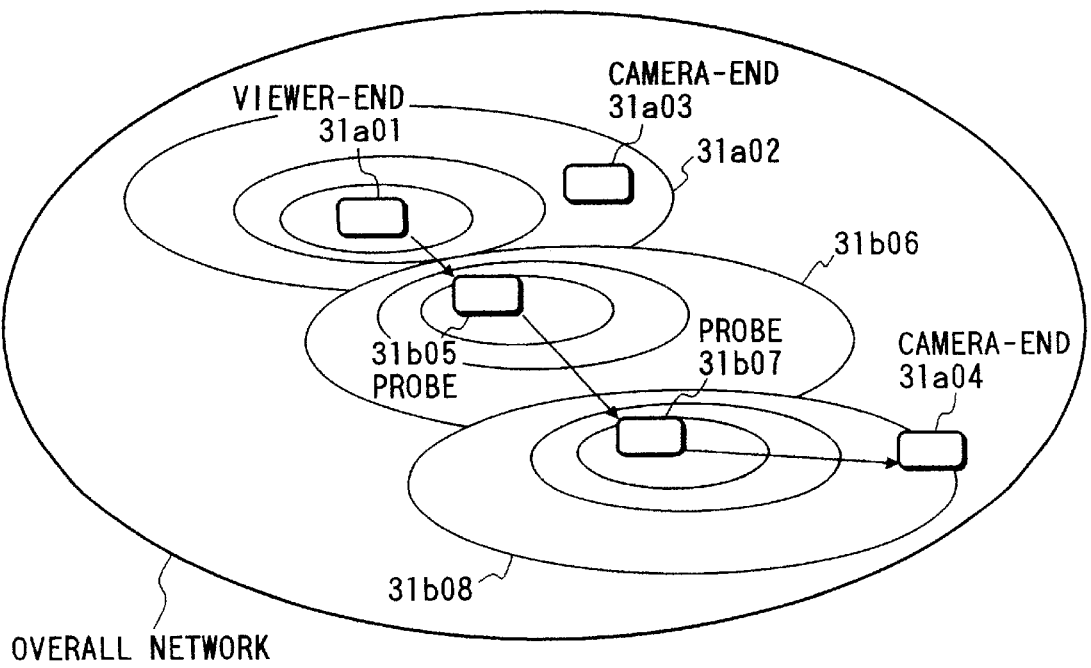

To detect the camera-end server 31a04, the viewer-end process 31a01 activates a probe 31b05 shown in FIG. 31B. This activation is automatically performed by the probe activation process when a probe host on the network detects the search message from the viewer-end process 31a01.

The activated probe 31b05 has its own broadcast area 31b06.

The probe 31b05 activated upon reception of the search message (Step S3201), adds information (address, communication port and the like) of the probe 31b05 to the search message including the information of the viewer-end process 31a01 (Step S3202). With this process, course information from the viewer-end process to the probe 31b05 is added to the search message. Then, the probe 31b05 transmits the search message in its broadcast area 31b06 (Step S3203). The probe 31b05 also transmits a reply message added with its information (address, communication port and the like) to the viewer-end process 31a01 first transmitted the search message. Since the search message transmitted from the probe 31b05 reaches also the viewer-end process 31a01, this search message may be used as the reply message to the viewer-end process 31a01. Upon reception of the reply message from the probe 31b05, the viewer-end process 31a01 can know that the probe 31b05 received the search message.

If the camera-end server 31a04 cannot be detected also in the broadcast area 31b06, the search message from the probe 31b05 is received by a probe 31b07 which is then activated. The probe 31b07 adds information (address, communication port and the like) of the probe 31b07 to the search message including the information of the viewer-end process 31a01 and probe 31b05, and broadcasts it in its broadcast area 31b08 to search the camera-end server 31a04. Also in this case, the probe 31b07 transmits a reply message including the information (address and the like) of the probe 31b07 to the probe 31b05. Since the probe 31b05 receives the search message transmitted from the probe 31b07, this search message may be used as the reply message. Upon reception of the reply message from the probe 31b07, the probe 31b05 can know the course from the viewer-end process 31a01 to the probe 31b07.

The above search process by probes inclusive of probes 31b05 and 31b07 and viewer-end process 31a01 continues until a time-out preset to each of these probes and viewer-end processor occurs (Steps S3204 and S3205). If the search process of a probe becomes time-out because the reply message cannot reach, (Steps S3204 and S3205), the probe terminates its operation (Step S3206). If necessary, however, this probe is activated again by another probe and another viewer-end process.

As shown in FIG. 31B, if the camera-end server 31a04 is in the broadcast area 31b08 of the probe 31b07, the camera-end server 31a04 can receive the search message transmitted from the probe 31b07. Upon reception of this search message, the camera-end server 31a04 returns a reply message back to the transmission originating side (in the case of FIG. 31B, probe 31b07), the reply message including the information of the address and communication port of the camera-end server 31a04 and the information indicating a presence of the camera-end server 31a04.

Upon reception of this reply message (Step S3204), the probe 31b07 checks the contents of the reply message to judge whether the reply message was transmitted from a camera-end server or from another probe (Step S3207). In this manner, the probe 31b07 can know a presence of the camera-end server 31a04 in its broadcast area 31b08 and can detect that a probe course was formed between the viewer-end process 31a01 and camera-end server 31a04.

A reply message is received either from another probe or from the camera-end server (in the example of FIG. 31B, received by the last probe 31b07 of the probe course). If the reply message is received from another probe, this probe returns a reply message to the search message transmitting side, similar to the case where the probe 31b05 receives the reply message from the probe 31b07 (Step S3209).

In order to judge the last probe of the probe course, it is checked whether the reply message is transmitted from the camera-end server or from another probe. The information of the reply message transmitting side necessary for this check is contained in the reply message.

By checking this reply message, the probe 31b07 received the reply message from the camera-end server 31a04 performs a leap-back process to be described later to optimize the probe course (Step S3208).

For the search process of the camera-end server in the broadcast area of each probe, if the probe starts broadcasting after some lapse of time after the search message is received, the search process is performed with a time shift between probes in the network. It is therefore possible to prevent the usage efficiency of the network from being-lowered, without raising the load of the whole network.

After the probe course is formed, the probe course is optimized.

In this embodiment, the optimizing process is divided into two steps, the leap-back process and the cut-end process being executed by the probe control unit of the probe.

Figure 34:
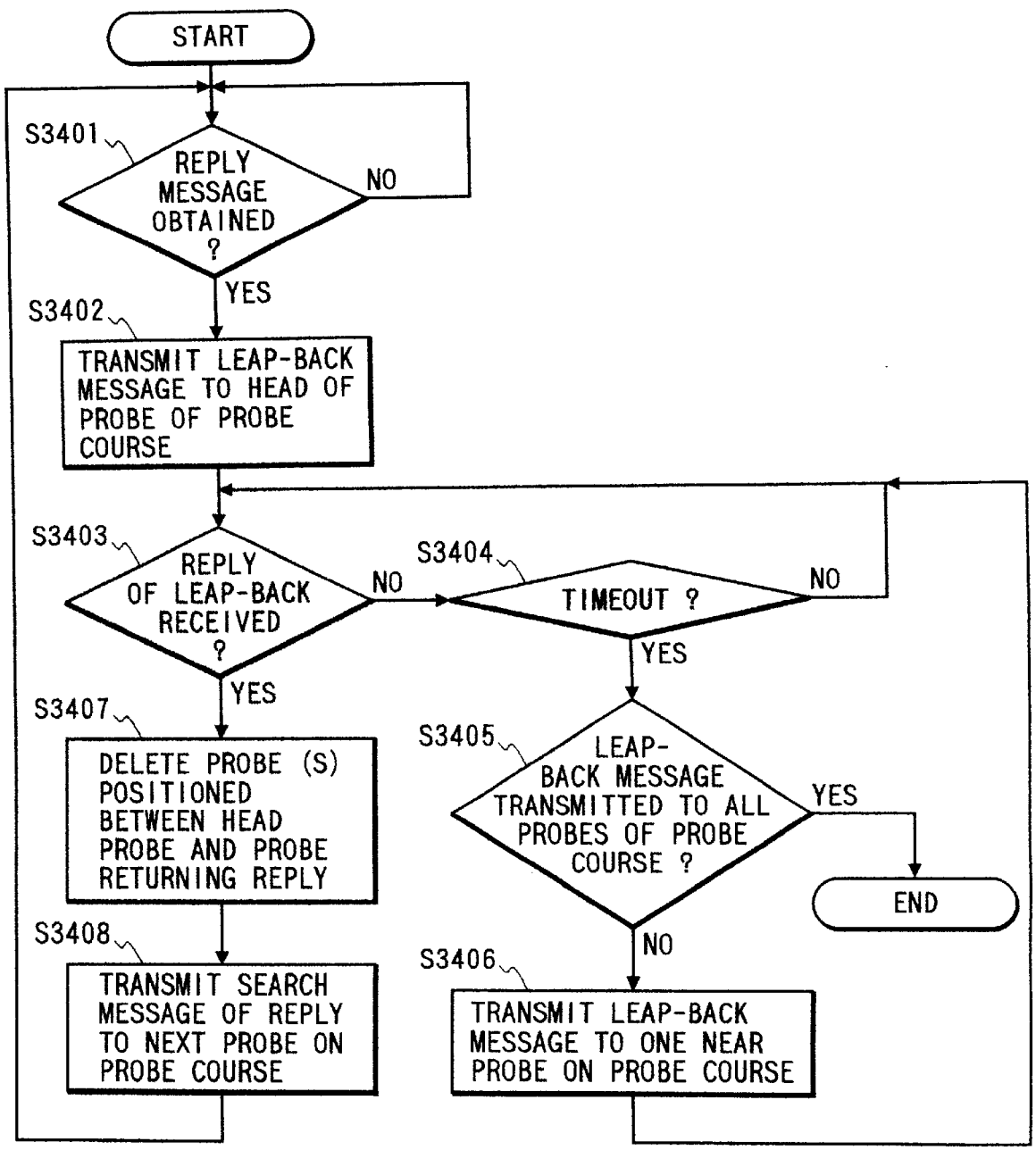
FIG. 34 is a flow chart illustrating the operation of a probe in a leap-back process of the second embodiment.

First the outline of the leap-back process will be described with reference to FIGS. 33A to 33E. The leap-back process is illustrated in the flow chart of FIG. 34. FIG. 33A illustrates the probe course immediately after the camera-end server search process.

Namely, a probe course of probes 33a03, 33a04, 33a05, 33a06 and 33a07 is established between a viewer-end process 33a01 and a camera-end server 33a02.

The leap-back process starts after the camera-end server 33a02 transmits a reply message 33a08 for the received search message to the last probe 33a07 of the probe course.

As the probe 33a07 receives the reply message from the camera-end server (Step S3401), it transmits a leap-back message 33b09 to the head probe 33a03 of the probe course (FIG. 33B, Step S3402). This leap-back message 33b09 contains information such as an address and a port number necessary for the communication between the transmitting probe 33a07 and receiving probe 33a03.

After transmitting the leap-back message 33a09, the probe 33a07 waits for a leap-back reply message relative to the leap-back message (Step S3403). If the leap-back reply message is not transmitted from the probe 33a03 even after a time-out (Step S3404), the probe 33a07 judges that the communication with the probe 33a03 is impossible. In this case, the probe 33a07 transmitted the leap-back message tries to transmit a leap-back message to the probe 33a04 one probe after the probe 33a03 with failed leap-back message transmission (Step S3406).

The above processes are performed for all probes (Step S3405) until the leap-back reply message relative to a leap-back message is received. If a leap-back message from the probe 33a07 can be received, the probe received this leap-back message transmits the leap-back reply message to the probe 33a07. If the probe 33a07 can receive this leap-back return message, the direct communication between the probe 33a07 and the probe transmitted the leap-back reply message is possible. Therefore, probes between the probe 33a07 and the probe transmitted the leap-back reply message are not necessary and deleted from the probe course (Step S3407).

In the example shown in FIGS. 33A to 33E, the probes 33a03 and 33a04 to which a leap-back message was transmitted fail in the leap-back process, and the leap-back reply message is able to receive from the probe 33a05 (FIGS. 33A to 33D, Step S3403). In this case, the probe 33a06 between the probes 33a05 and 33a07 is not necessary and the probe 33a07 deletes the probe 33a06 from the probe course (FIG. 33E).

Next, the transmitting side probe (33a07 in FIG. 33E) adds the information of the reconfigured probe course shown in FIG. 33E to a reply message and transmits it to the probe (33a05 in FIG. 33E) one probe before the probe (33a07 in FIG. 33E) on the new probe course (Step S3408). The probe 33a05 received the reply message performs the leap-back process relative to the probes 33a03 and 33a04 in the same manner as the probe 33a07 (Steps S3401 to S3408).

The above processes are repeated until the start probe 33a03 on the probe course receives the leap-back message and transmits the leap-back reply message.

In the above processes, however, whether the probes (in FIGS. 33A to 33E, 33a03 and 33a07) at both ends of the probe course are necessary or not is not checked in the leap-back process.

After the leap-back process, the probes at both ends are checked by the cut-end process.

Figure 35A:
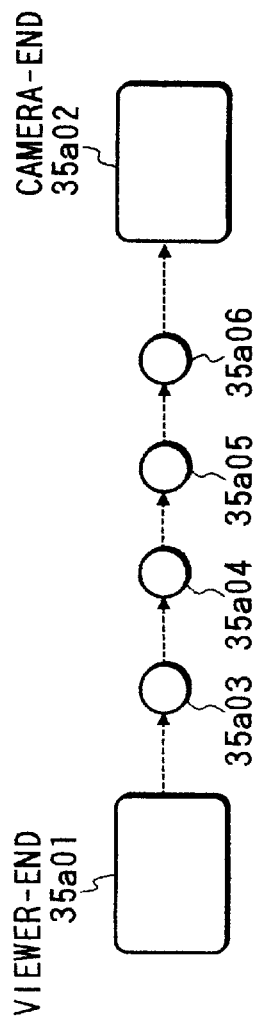
FIGS. 35A, 35B, 35C and 35D are diagrams illustrating the flow of a cut-end process for optimizing a probe path according to the second embodiment.
Figure 35B:
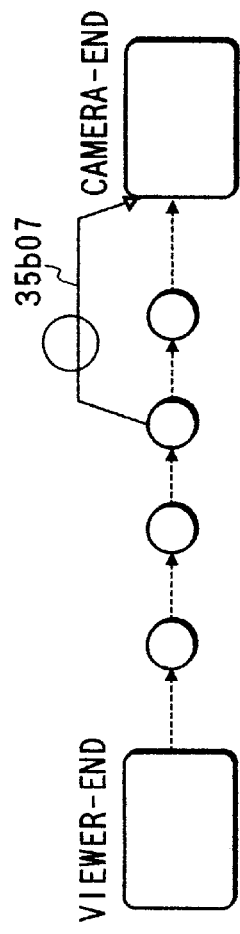
Figure 35C:
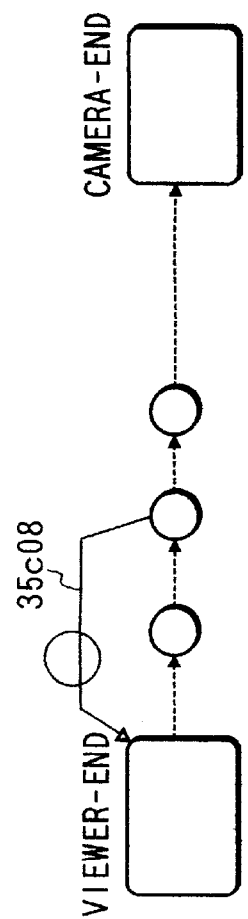
Figure 35D:
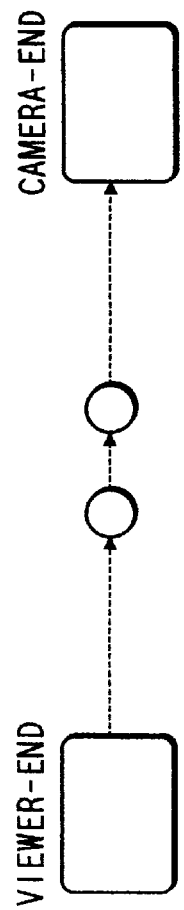
Figure 36:
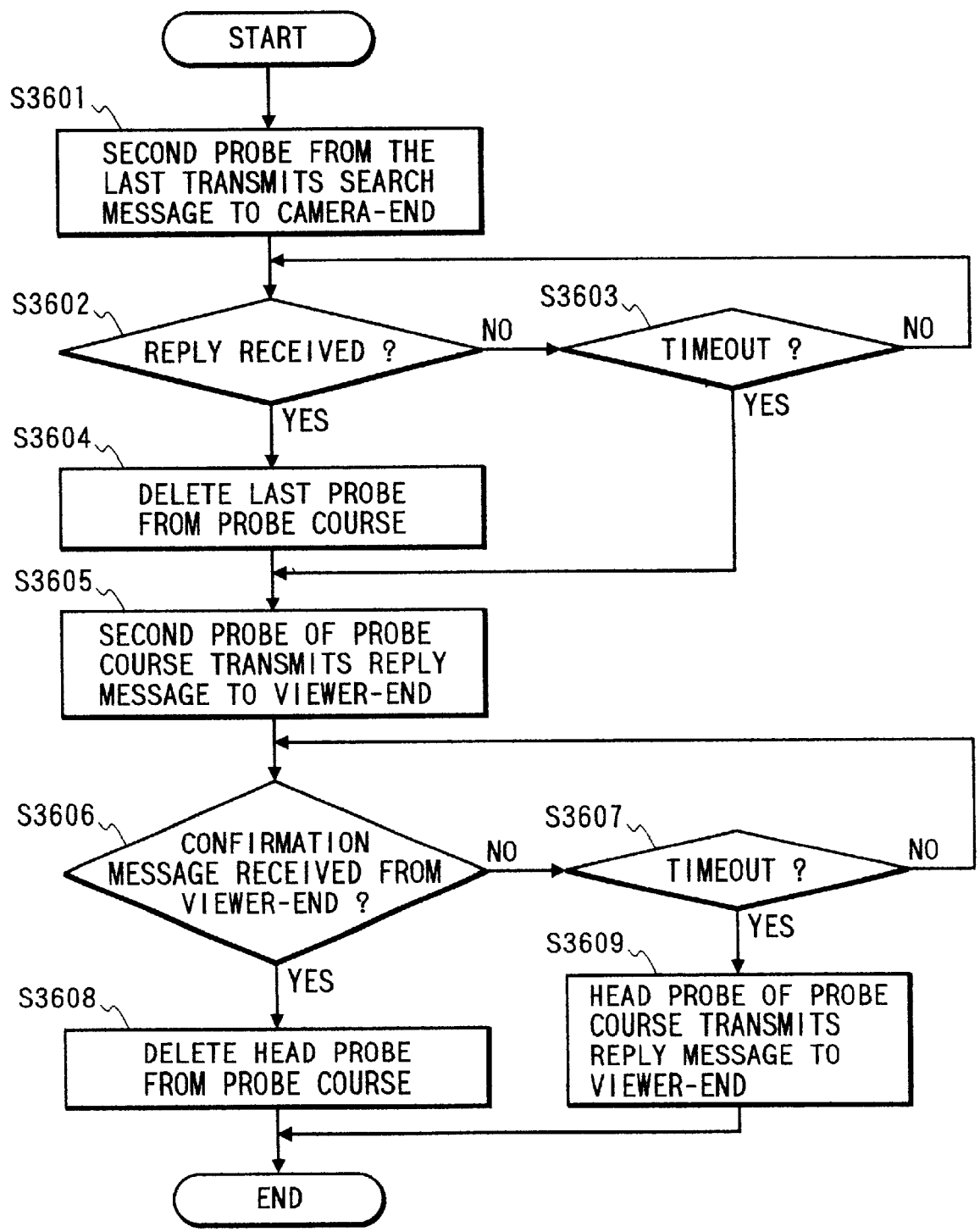
FIG. 36 is a flow chart illustrating the operation of a probe in the cut-end process of the second embodiment.

FIGS. 35A to 35D are conceptual diagrams illustrating the cut-end process, and FIG. 36 is a flow chart illustrating the cut-end process.

In FIGS. 35A to 35D, it is assumed that a probe course is formed by probes 35a03, 35a04, 35a05 and 35a06 between a viewer-end process 35a01 and a camera-end server 35a02. In the cut-end process, the probe 35a05 one probe before the last probe on the probe course transmits a search message 35b07 to a camera-end server 35a02 (Step S3601).

Upon reception of this search message 35b07, the camera-end server 35a02 transmits a reply message in response to the search message 35b07. If the probe 35a05 can receive the reply message from the camera-end server 35a02 before a time-out (Step S3602), the direct communication between the probe 35a05 and camera-end server 35a02 is possible so that the last probe 35a06 is judged to be unnecessary. In this case, the probe course with the last probe 35a06 deleted is formed by the probe 35a05 received the reply message (FIG. 35C, Step S3604).

If the reply message cannot be received (Step S3602), the last probe 35a06 is not deleted and the process at Step S3605 and following Steps are executed.

Similar processes are also performed for the head probe. Namely, the probe 35a04 one probe after the head probe on the probe course transmits a reply message 35c08 to a viewer-end process 35a01 (Step S3605).

Upon reception of this reply message 35c08, the viewer-end process 35a01 sends a confirmation message back to the transmitting probe 35a04. If the probe 35a04 can receive the confirmation message from the viewer-end process 35a01 before a time-out (Steps S3606 and S3607), the direct communication between the probe 35a04 and viewer-end process 35a01 is possible so that the head probe 35a03 is judged to be unnecessary and deleted from the probe course (FIG. 35D).

If the probe 35a04 cannot receive the confirmation message from the viewer-end process 35a01 (Steps S3606 and S3607), the probe course is not changed. In this case, the head probe (35a03) of the probe course transmits a reply message to the viewer-end process 35a01 to thereafter terminate the cut-end process (Step S3609).

With the above processes, unnecessary probes are deleted by the leap-back process and cut-end process and a shortest and optimized probe course can be formed.

The probe course formed in the above manner is also used for the transmission from the camera-end server to the viewer-end process. Video information transmitted from the camera-end server is transferred from the last probe to the head probe on the probe course.

In this case, the last probe on the probe course adds a header specific to the last probe to a packet of video information sent from the camera-end server to convert the packet into a packet specific to the last probe to be transferred to another probe. The head probe on the probe course deletes the header specific to the last probe from the received packet to recover the packet of video information at the camera-end server, and transmits it to the viewer-end process.

By temporarily converting the packet of the camera-end server into a probe packet, the packet can be transmitted over a firewall. It is however necessary to provide a transmission/reception path (communication port dedicated to a probe) on the firewall side. In order to prevent a vandalized packet from passing through the firewall by using this transmission/reception path, probes at both ends of the firewall check the authentication of a packet passing through the firewall. In order to form a probe course in the above manner, the leap-back and cut-end processes do not use the probe dedicated communication port. Since this port is not used, the leap-back and cut-end processes fail because the communication is impossible between the probes on both sides thereof. From this reason, even on the probe course after the optimizing process, there are probes-on both sides of a firewall.

The authentication of a packet passing through a firewall is certified by the protocol certifying unit 2718 of the probe. Packet certification by the protocol certifying unit 2718 may be realized by certification techniques using a general one way communication function. Only the last probe on the probe course has a specific secret key, and other probes have a public key. It is therefore possible to check whether data passing through each probe is transmitted from the last probe on the probe course via a correct path or is entered from a different intermediate path. This process can also be used for checking a packet or message passing thorough a probe which belongs to a plurality of probe courses.

As described above, in the second embodiment, even if a presence of a desired camera-end server is not known in advance, the camera-end program can search it from camera-end servers distributed in a network and an image picked up with a remote video camera can be acquired.

The optimizing process (leap-back and cut-end) of the probe course can delete unnecessary probes from the probe course.

Further, in the second embodiment, video data is transferred from a camera-end server to a viewer-end client via probes. In this case, in order to prevent vandalized data transfer, the protocol certifying unit is provided to identify the message transmitting side.

In the second embodiment, probes are used not only for the camera-end server search but also for video data transfer. Therefore, data can be transferred efficiently.

A probe as a message relaying means can avoid troubles during data transfer to be caused by a firewall or the like.

Also in the second embodiment, a camera-end server search time can be shortened at each probe. Therefore, the whole network can be searched without lowering the usage efficiency and without raising the total load of the network.

THIRD EMBODIMENT

In the second embodiment, a remote camera service system has been described. In the third embodiment, a service directory system embodying the invention will be described.

The service directory system collectively manages information of service providers such as camera-end servers of the second embodiment distributed on a network. With this service directory system, a user can acquire information on available services on the network.

Figure 37:
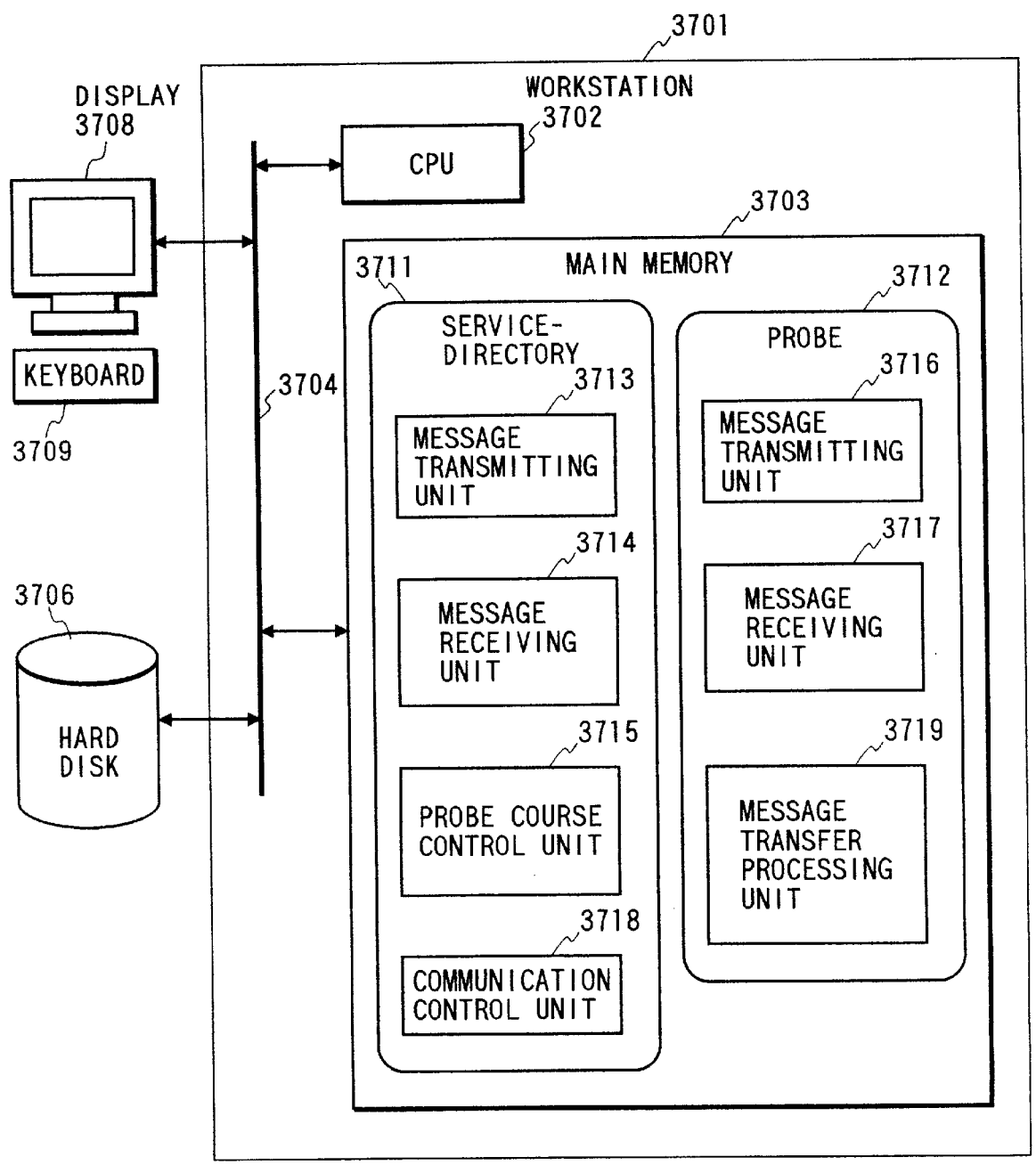
FIG. 37 is a conceptual diagram showing a service directory system according to a third embodiment of the invention.

Main constituent elements of this embodiment will be described with reference to FIG. 37. In FIG. 37, a work station (called a host, similar to the second embodiment) is configured by connecting a computer bus 3704 to a CPU 3702 constituted of a microprocessor and the like performing processes of this embodiment and to a main memory unit 3703 having a main process group 3711 and 3712 of this embodiment. The process group 3711 and 3712 performs the operations to be described later on an operating system (hereinafter called an OS) of the work station 3701.

Also connected to the work station are: a hard disk 3706 for storing binary programs of the process group 3711 and 3712 in the main memory unit 3703; a display unit 3708 and a keyboard 3709 for data input/output.

The service directory 3711 of the process group is a server process of managing information of services distributed on the network and providing an access means to services. This service directory 3711 itself functions as a service provider for providing services to a user. The service directory 3711 periodically searches service providers on the network to acquire information of the start of new services and their operation states.

The service directory 3711 is constituted of the following modules.

Message transmitting unit 3713:

This module performs the transmission of a control message such as a search message. This module may be realized in the similar manner to that of the message transmitting unit 2714 of the probe of the second embodiment.

Message receiving unit 3714:

This module receives a reply message in response to a search message and a search message from another service directory. This module may be realized also in the similar manner to that of the message receiving unit 2715 of the probe of the second embodiment.

Communication control unit 3718:

This module controls the search for services using a search message.

Probe course control unit 3715:

This module performs a leap-forward process (to be described later) for deleting unnecessary probes from a probe course formed by the results of a service search.

Also in the service search by the service directory 3711, a probe 3712 similar to the probe 2713 of the second embodiment is used to form a probe course. However, in this embodiment, since the service provider search and the probe course control are mainly realized by the service directory 3711, the probe 3712 of this embodiment is simpler than the second embodiment. The probe of the third embodiment does not perform a process necessary for dealing with a firewall and an image transfer process. Programs performing such processes may be activated at each probe on the probe course to have advantages of the second embodiment. As different from the second embodiment, the probe of the third embodiment is not automatically stopped at a time-out, but is always operating.

The probe 3712 is constituted of the following modules.

Message transmitting unit 3716:

Similar to the message transmitting unit 2714 of the second embodiment, this module performs the transmission of a search message and a probe control message. This module may be realized in the similar manner to that of the message transmitting unit 2714 of the probe of the second embodiment.

Message receiving unit 3717:

This module receives a search message and a probe control message transmitted to the probe 3712. The received message is passed to a message transfer processing unit 3719. This module may be realized also in the similar manner to that of the message receiving unit 2715 of the probe of the second embodiment.

Message transfer processing unit 3719:

This module analyzes a message received by the message receiving unit 3717, and in accordance with the analyzed results, controls the message transfer to another probe. In transferring the message, the message transfer processing unit 3719 uses the message transmitting unit 3716.

Figure 38:
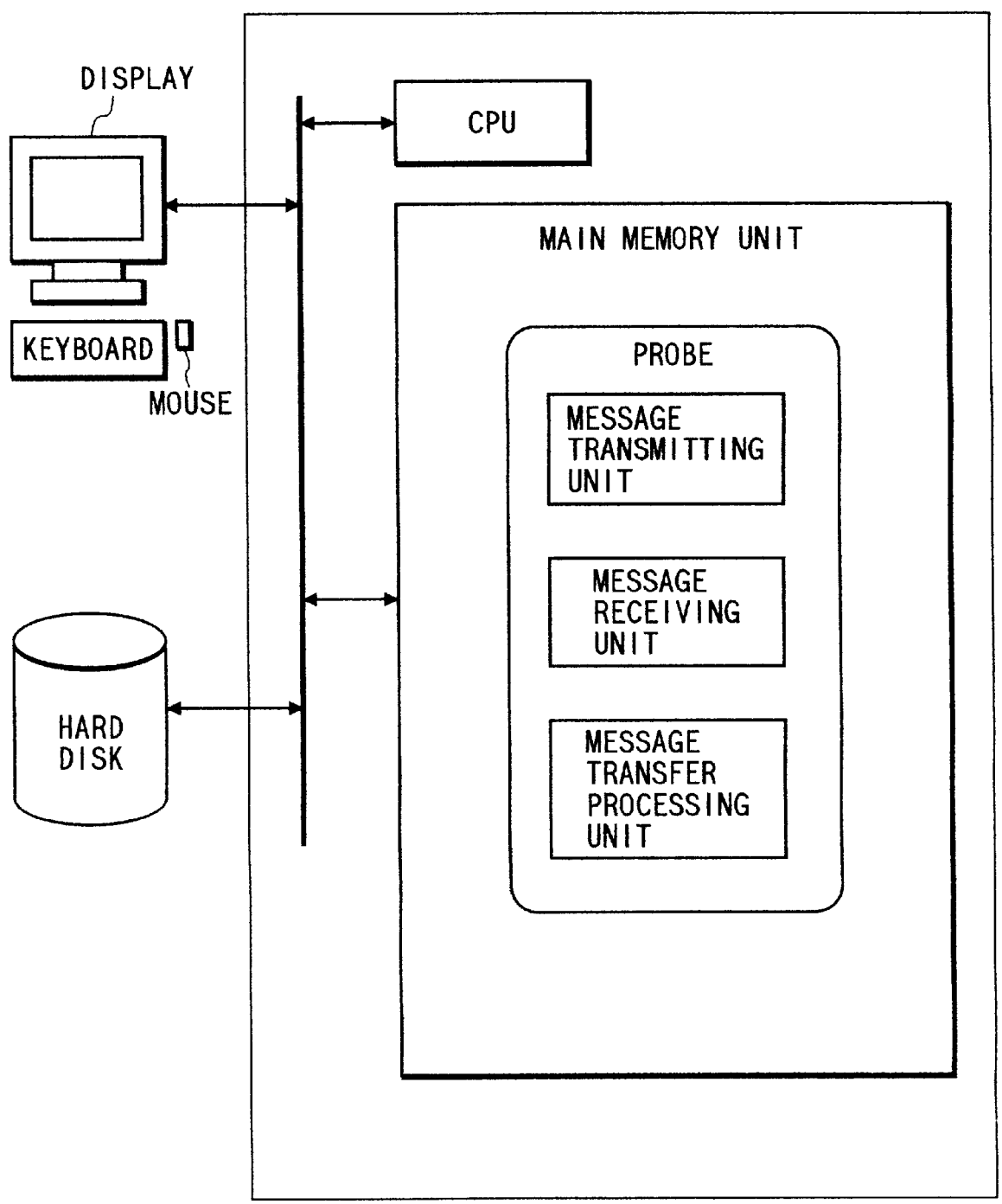
FIG. 38 is a conceptual diagram showing a service directory system according to a first modification of the third embodiment.
Figure 39:
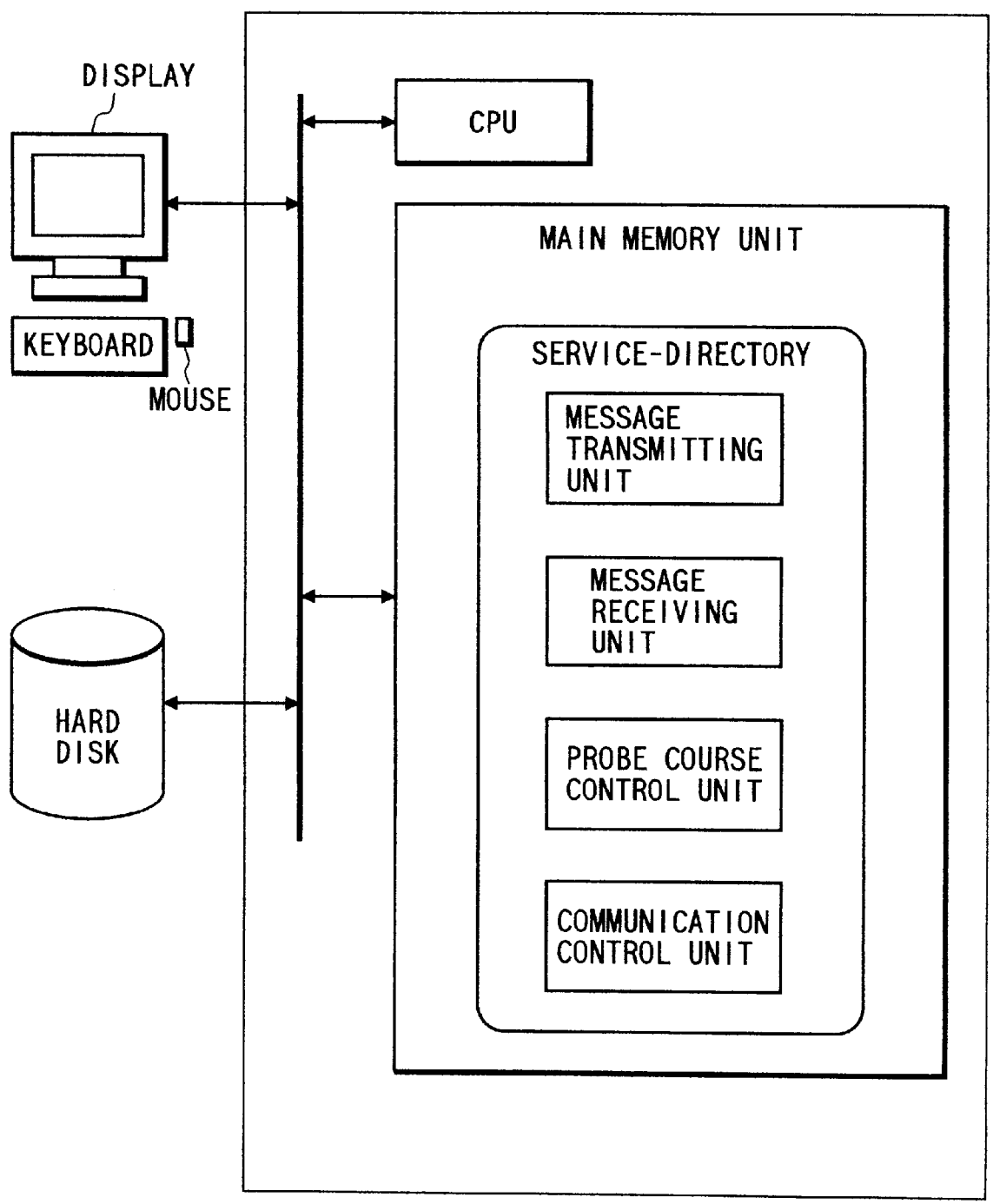
FIG. 39 is a conceptual diagram showing a service directory system according to a second modification of the third embodiment.

In FIG. 37, although the probe 3712 and service directory 3711 are operating on the same host, these may be operated on different hosts connected to the network as shown in FIGS. 38 and 39.

Similar to the second embodiment, the third embodiment assumes that the probe or service directory transmits a message and data by passing them from the message transmitting unit to a transmission function of an application operating on OS and transmitting to the network by using this transmission function, and that the probe or service directory receives a message and data by receiving them with a reception function of an application operating on OS and passing them to the message receiving unit.

Figure 40:
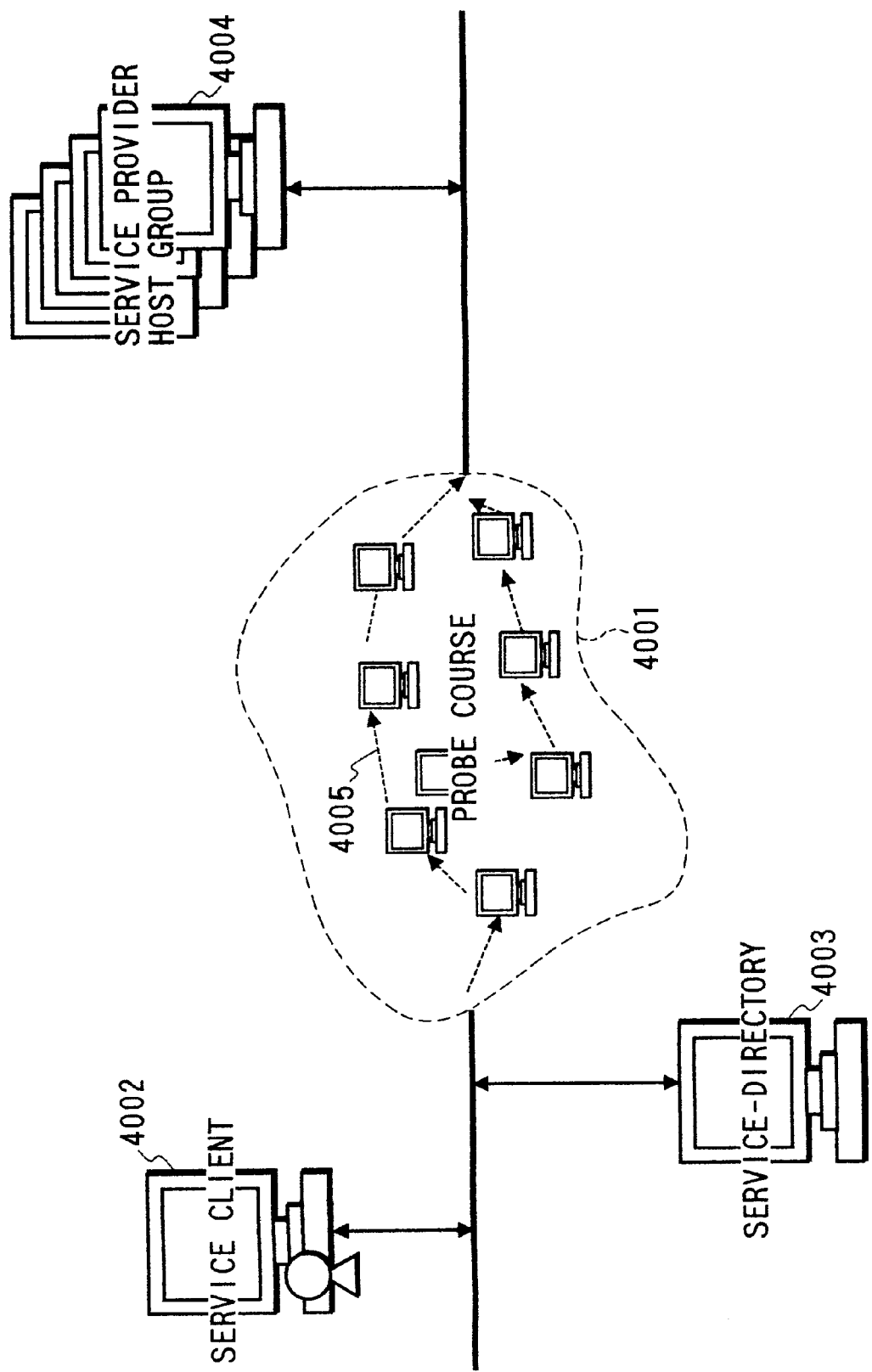
FIG. 40 is a conceptual diagram showing a service directory system according to a third modification of the third embodiment.

In this embodiment, as shown in FIG. 40, a service directory 4003 manages information of a plurality of service providers 4004 distributed on a network 4001, and a probe course 4005 is formed between the service directory 4003 and each service provider 4004.

A service client 4002 acquires information necessary for using services of each service provider 4004 from the service directory 4003. By using a probe course 4005 prepared by the service directory 4003, a communication path to the service provider 4004 can be established.

A service provider search process and a probe course control process to be executed by the service directory 4003 to realize such services will be described.

The service provider search process of this embodiment is almost the same as the camera-end server search process of the second embodiment described with FIGS. 31A and 31B. Different points are enumerated in the following.

(1) A search is started not by the service client (viewer-end process) but by the service directory.

(2) An object to be searched is not a camera-end server but a service provider.

(3) An optimizing process of a probe course after the search is different.

(4) If the searched service provider is a service directory operating on another host, service provider information is exchanged between the service directories after the probe course control.

Figure 41A:
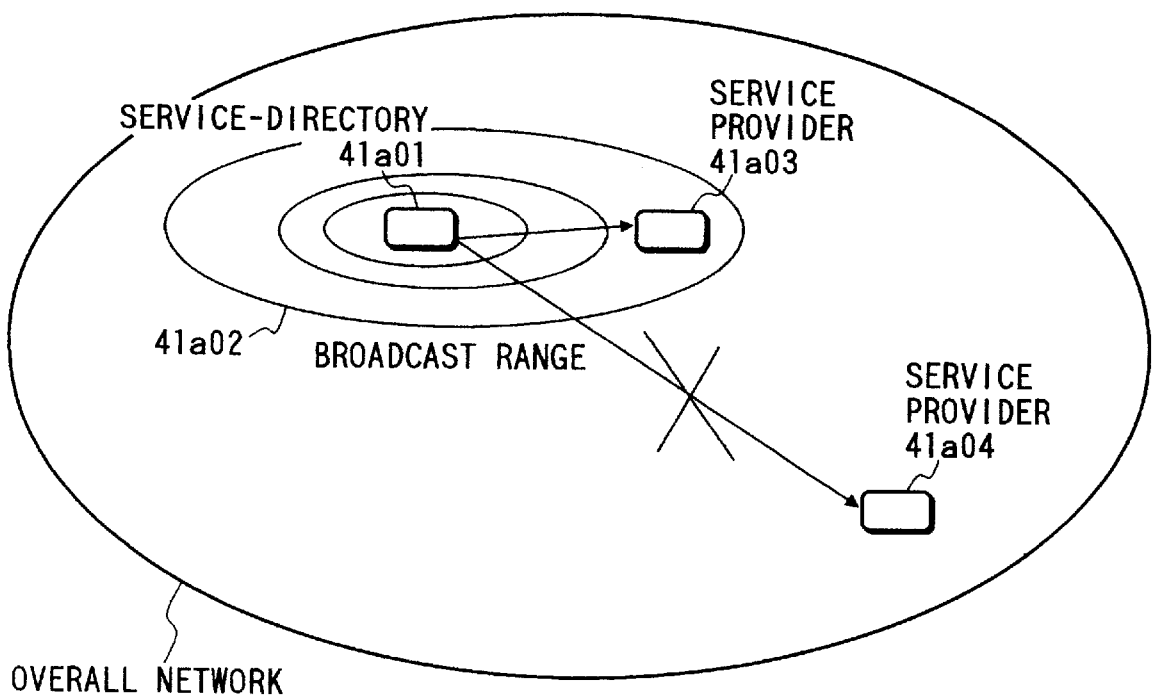
FIGS. 41A and 41B are diagrams illustrating the flow of a service provider search process according to the third embodiment of the invention.
Figure 41B:
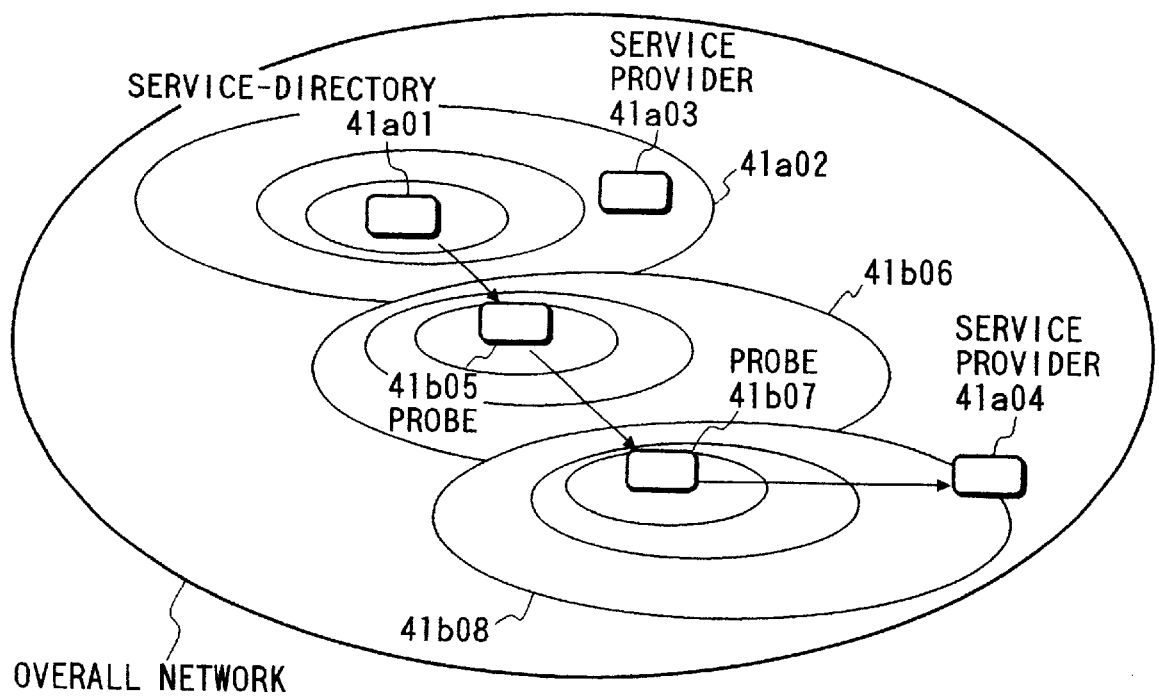

The service provider search process with the above different points is conceptually illustrated in FIGS. 41A and 41B.

In FIGS. 41A and 41B, a service directory 41a01 starts a service provider search by transmitting a search message to its broadcast area 41a02 which is a partial area of the network. In the example shown in FIG. 41A, since a service provider 41a03 is in the broadcast area 41a02 of the service directory 41a01, it can receive the search message from the service director 41a01. Upon reception of the search message from the service directory 41a01, the service provider 41a03 returns a reply message back to the service directory 41a01. Upon reception of the reply message from the service provider 41a03, the service directory 41a01 can detect the service provider 41a03 and acquire the information of the service provider 41a03.

In this embodiment, it is assumed that each probe is being activated on a proper host (probe host). In the example shown in FIG. 41B, probes 41b05 and 41b07 are being activated. Upon reception of the search message from the service directory 41a01, the probe under activation in the broadcast area 41a02 of the service directory 41a01 transmits a search message to its broadcast area 41b06.

These processes are repeated also at the probe 41b07. In the example shown in FIG. 41B, since the service provider 41a04 is in the broadcast area 41b08 of the probe 41b07, the probe 41b07 can receive the reply message from the service provider 41a04.

Immediately thereafter, the probe optimizing process is performed in the case of the second embodiment. However, in the third embodiment, the reply message from the service provider 41a04 is immediately transmitted to the service directory 41a01 via the probes 41b05 and 41b07. In this case, the reply message has the probe course information added thereto. Upon reception of the reply message from the service provider 41a04, the service directory 41a01 starts the probe course control process (leap-forward process).

Figure 43:
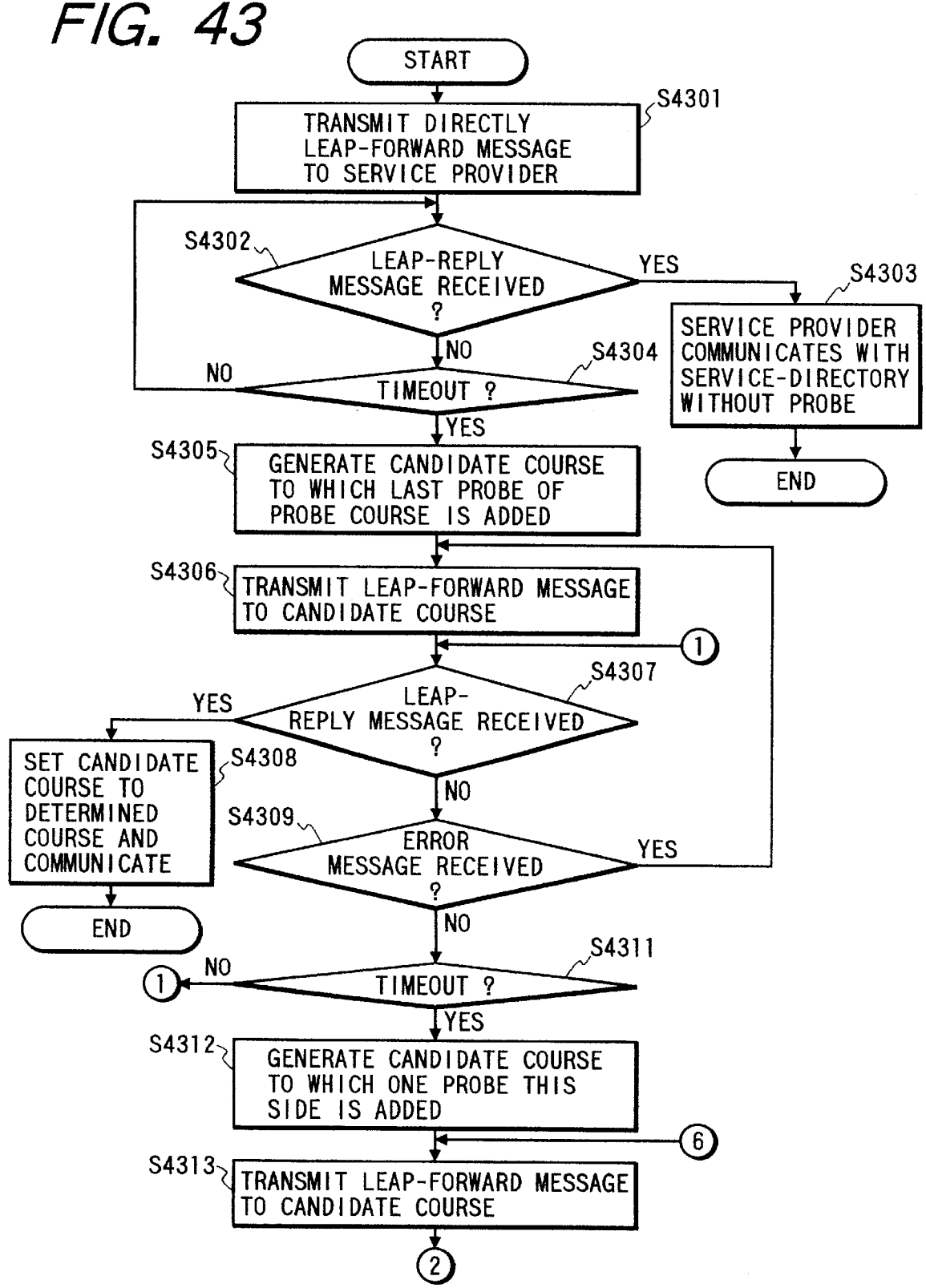
FIG. 43 is a flow chart illustrating the operation of a service-directory in the leap-forward process according to the third embodiment.
Figure 44:
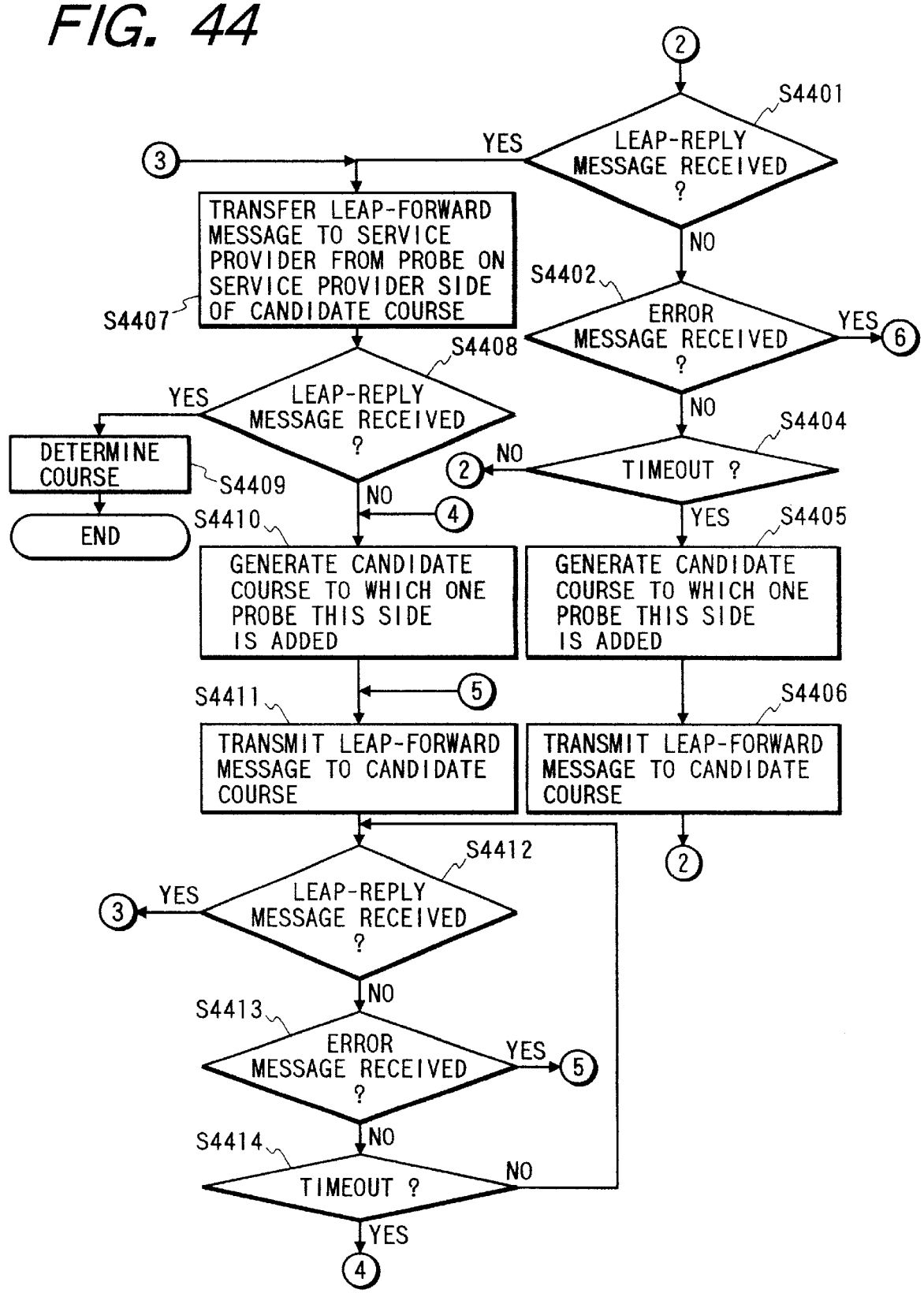
FIG. 44 is a flow chart illustrating the operation of the service-directory in the leap-forward process according to the third embodiment.

FIGS. 42A to 42E are conceptual diagrams illustrating the leap-forward process. FIGS. 43 and 44 are flow charts illustrating the operation of the probe course control unit to be executed during the leap-forward process.

FIGS. 42A to 42E show the states of a probe course formed by the service provider search process. Three probes 42a03, 42a04 and 42a05 form a probe course between a service directory 42a01 and a service provider 42a02.

The leap-forward process starts when the service directory 42a01 receives the reply message.

Figure 42A:
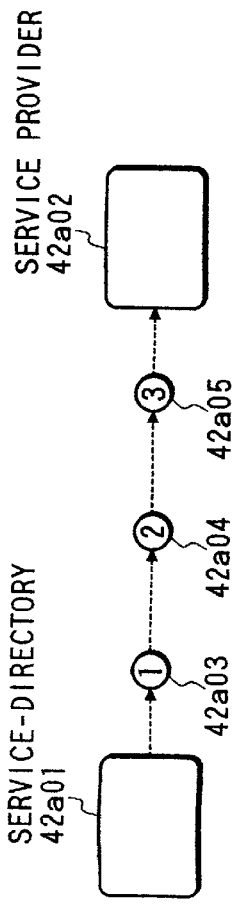
FIGS. 42A, 42B, 42C, 42D and 42E are diagrams illustrating the flow of a leap-forward process for optimizing a probe path according to the third embodiment.
Figure 42B:
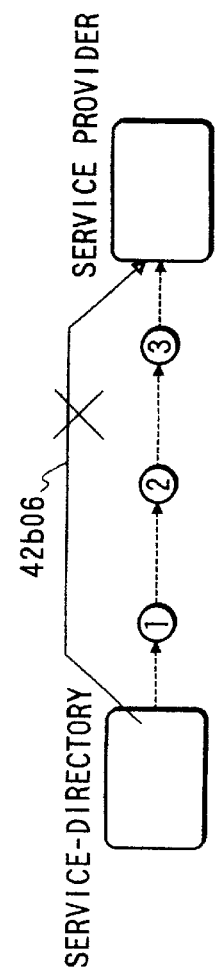
Figure 42C:
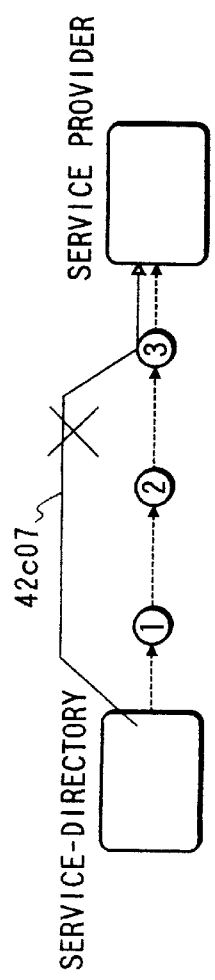

First, the service directory 42a01 transmits a leap-forward message 42b06 directly to the service provider 42a02 (Step S4301, FIG. 42B).

If a leap-forward reply message is returned from the service provider 42a02 (Step S4302) without a time-out (Step S4304), then the service directory 42a01 and service provider 42a02 directly communicate with each other (Step S4303). Therefore, the probe course information (called an established course) in the service provider related information of the service directory 42a01 takes a vacant value. Thereafter, the service directory 42a01 and service provider 42a02 communicate without probes.

If the reply message is not returned back before the time-out (Step S4302, Step S4304), the last probe 42a05 on the probe course is added to an interim transmission course (called a candidate course) (Step S4305). Thereafter, the leap-forward message 42c07 to the service provider 42a02 is transferred to the candidate course (Step S4306).

If a leap-reply message for the leap-forward message 42c07 can be received from the probe 42a05 (Step S4307), the probe 42a05 is used as the established course to perform communication (Step S4308).

If transfer of the leap-forward message from the probe 42a05 to the service provider is failed even if the probe 42a05 can receive the leap-forward message 42c07, the service directory 42a01 receives an error message from the probe 42a05 (Step S4309). In this case, the probe 42a05 is added to the established course to resume the process at Step S4306 and following Steps. Namely, the leap-forward message 42c07 is again transmitted to the same candidate course.

If the probe 42a05 cannot receive the leap-forward message 39c07, the leap-reply message wait process at the service directory 42a01 becomes time-out (Steps S4307, S4309, S4311).

Figure 42D:
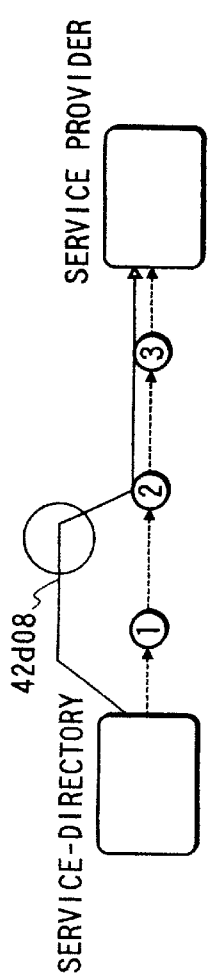

In this case, as shown in FIG. 42D, a probe course (candidate course from-service directory, probe 42a04, probe 42a05 and to service provider) is formed by adding the probe 42a04 one probe before the probe course (Step S4312) to transmit a leap-forward message 42d08 to this formed probe course (Step S4313). If a leap-reply message for this leap-forward message 42d08 can be received from the probe 42a04 (Step S4401 in FIG. 44), this probe 42a04 is used as the established course, and the leap-forward message 42d08 from the service directory 42a01 to the service provider is transferred directly from the probe (42a04 in FIGS. 42A to 42E) on the candidate course nearest to the service provider (Step S4407). If the leap-reply message for the leap-forward message 42d08 can be received from the probe 42a04 (Step S4408), communication is performed by using the probe 42a04 as the established course (Step S4409).

If the leap-reply message for the leap-forward message 42d08 cannot be received at Step S4408, a probe course (candidate course from service directory, probe 42a04, probe 42a05 to service provider) is formed by adding the probe 42a03 one probe before on the probe course (Step S4410), and the leap-forward message is transmitted to this probe course (Step S4411). If the leap-reply message for this leap-forward message can be received (Step S4412), this probe 42a04 is used as the established course to return to Step S4407. If the probe fails the transfer to the service provider even if it can receive the leap-forward message, the service directory 42a01 receives an error message from the probe (Step S4413). In this case, this probe is added to the established course to resume Step S4411 and following Steps. If the probe cannot receive the leap-forward message before the time-out, the processes at Step S4410 and following Steps are performed again.

If the probe 42a04 cannot receive the leap-reply message for the leap-forward message 42d08 at Step S4401, it is checked whether an error message is received (Step S4402), the error message indicating that although the probe 42a04 was able to receive the leap-forward message 42d08, transfer of the leap-forward message 42d08 to the service provider 42a02 was failed. If the error message is received, the probe is added to the established course and thereafter the leap-forward message is transmitted again to the same course (Step S4313). If it becomes time-out before the leap-reply message and error message are received, a probe course (candidate course from service directory, probe 42a03, probe 42a04, probe 42a05 and to service provider) is formed by adding the probe 42a03 one probe before on the probe course (Step S4405) and a leap-forward message is transmitted to this probe course (Step S4406).

In the example shown in FIGS. 42A to 42E, it is assumed that communication with the probe 42a05 fails and communication with the probe 42a04 succeeds (FIG. 42D). In this case, transfer to the service provider 42a02 is performed via the probe 42a05.

The service provider 42a02 generates a leap-reply message for the leap-forward message 42d08. The leap-reply message is returned back via the same course as the leap-forward message 42d08. The change control of this course is performed by the service provider 42a02. Generally, the same course as the leap-forward message is used as above. However, if the service provider is another service directory, the leap-forward process may be applied to this leap-reply message.

Figure 42E:
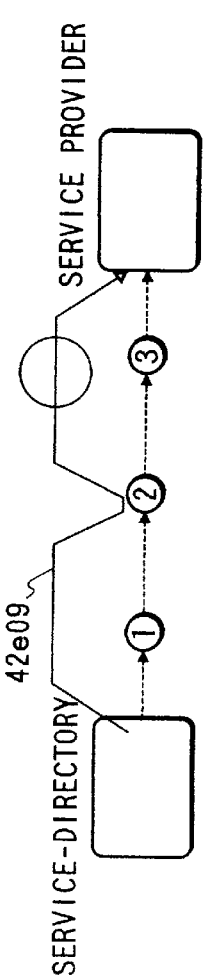

Upon reception of the leap-reply message, the service directory 42a01 adds the probe 42a04 which succeeded the process to the established course to thereby perform the leap-forward process by using this probe 42a04 as a start point (FIG. 42E). Namely, it transmits the leap-forward message to the probe 42a04. In this case, the probe 42a05 is not designated in the message as the course, but the designation is made to directly transfer the leap-forward message to the service provider 42a02.

The probe 42a04 transfers the leap-forward message. If failed, an error message is returned back to the service directory 42a01. This return course is opposite to the transmission course of the leap-forward message.

The service directory 42a01 received the error message again performs the leap-forward process by using the probe course containing the last probe 42a05.

In the example shown in FIG. 42E, since the leap-forward message 42d09 successfully reached the service provider 42a02, the shortest probe course only using the probe 42a04 is established. The service provider eventually designates only the probe 42a04 on the established course. This established course is managed by the service directory, and used when a user requests services.

After the leap-forward process, it is checked from the reply message for the search message whether the detected service provider is another service directory. If it is another service directory, service provider information which manages the search message transmitting service directory is transmitted to the other service directory. Thereafter, reception of the service provider information from the other service directory is waited until the time-out. Upon reception of the partner service provider information, the contents thereof are copied as the information in the search message transmitting service directory.

As above, in the third embodiment, it becomes possible for the service directory to acquire the course information to a desired service provider distributed in the network.

Also in the third embodiment, service directories are provided and information exchange therebetween is possible. Therefore, information of a desired service provider on the network can be efficiently collected.

Further, the probe of this embodiment is smaller in software scale than that of the second embodiment so that it can be always operated on an arbitrary host.

As described above, in the second and third embodiments, a desired service provider can be searched without too large load on the network even on a large scale network.

Still further, since the probe course is optimized, efficient communication can be established between a service client and a service provider.

Still further, it is possible to relay a message while avoiding troubles during the message transfer to be otherwise caused by a firewall or the like.

The objects of the embodiments can also be achieved by supplying a system or apparatus with a storage medium storing software program codes realizing the functions of the embodiments and by reading and executing the program codes stored in the storage medium by a computer (CPU or MPU) running on the system or apparatus.

In this case, the software program codes themselves read from the storage medium realize the embodiment functions. Therefore, the program codes themselves constitute the present invention.

The storage medium storing such program codes may be a floppy disk, a hard disk, an optical disk, a magnetooptical disk, a CD-ROM, a magnetic tape, a non-volatile memory card, and a ROM.

Obviously, the scope of the invention also includes not only the case wherein the embodiment functions are realized by executing the program codes read by the computer but also the case wherein the embodiment functions are realized by executing part or the whole of the actual tasks by an OS (operating system) on which the computer runs, in accordance with instructions of the program codes.

Furthermore, the scope of the invention also includes the case wherein in accordance with the program codes read from the storage medium and stored in a memory of a function expansion board or unit connected to the computer supplied with the program codes, a CPU or the like of the function board or unit executes part or the whole of the actual tasks for realizing the embodiment functions.

What is claimed is:

1. A communication method on a network comprising:
 a transmission step of transmitting a communication request to a communication apparatus and a plurality of relay apparatuses for a predetermined service provided by the communication apparatus;
 a reception step of receiving responses from the communication apparatus and the plurality of relay apparatuses, wherein the plurality of relay apparatuses are arranged in different positions on the network;
 a setting step of setting, after the reception of the response, a communication course to the one of the communication apparatus; and
 a resetting step of resetting the set communication course so as to reduce the number of the relay apparatuses by communicating among the relay apparatuses.

2. A communication method according to claim 1, wherein the communication apparatus includes a camera.

3. A communication method according to claim 1, wherein the relay apparatus has a predetermined area capable of communicating.

4. A communication method according to claim 3, wherein the relay apparatus judges whether the communication apparatus providing the predetermined service is in a predetermined service area of the relay apparatus, and if not, transmits a communication request to another relay apparatus.

5. A communication method according to claim 1, wherein the communication request is transmitted via Internet.

6. A communication method according to claim 3, wherein the relay apparatus starts searching the communication apparatus providing the predetermined service after a predetermined time lapse after the communication request is received.

7. A communication method according to claim 3, wherein said setting step sets a communication route by at least two methods.

8. A communication method for executing data communication via a plurality of relay apparatuses comprising:
 a setting step of setting a route via the plurality of relay apparatuses between a data transmitting side and a data transmitted side;
 a judgment step of judging whether other route different from the set route is settable or not by executing communication among the plurality of relay apparatuses included in the set feet route;
 a resetting step of resetting the route based on the result obtained in said judgment step,
 wherein the different other route is determined so as to reduce the number of relay apparatuses.

9. A method according to claim 8, wherein the data transmitting side is a camera server.

10. A method according to claim 8, wherein one of the relay apparatuses included in the set route executes said judgment step on the basis of information for the relay apparatuses included in the route set in said setting step.

11. A method according to claim 8, wherein one of the relay apparatus which received data directly from the data transmitting side adds a predetermined header to the received data.

12. A method according to claim 11, wherein the relay apparatus which transmits data directly to the data transmitted side deletes the predetermined header.

13. A method of controlling a relay apparatus of communication executed via a plurality of relay apparatuses between a data transmitting side and a data transmitted side, comprising:
 a receiving step of receiving information from an another relay apparatus which relays a Feet route that is net set for the communication;
 a communicating step of communicating with the another relay apparatus on the basis of the information received in said receiving step; and a resetting step of, in case that it is possible in said communicating step to communicate directly with the another relay apparatus, setting a new route from which the relay apparatus that is set on the way up to the another relay apparatus in the route set for the communication, is removed.

14. A method according to claim 13, wherein the data transmitting side is a camera server.

15. A relay apparatus for effecting communication between a data transmitting side and a data transmitted side on the basis of a route that is set so as to include a plurality of other relay apparatuses, comprising;

receiving means for receiving information from an another relay apparatus which relays the set route;

communicating means for communicating with the another relay apparatus on the basis of the information received by said receiving means; and resetting means for, in case that it is possible to communicate directly with the another relay apparatus by said communicating means, setting a new route from which the relay apparatus that is set on the way up to the another relay apparatus in the route set for the communication, is removed.

16. An apparatus according to claim 15, wherein the data transmitting side is a camera server.

17. An apparatus according to claim 15, wherein the relay apparatus which receives data directly from the data transmitting side adds a predetermined header to the received data.

18. An apparatus according to claim 17, wherein the relay apparatus which transmits data directly to the data transmitted side deletes the predetermined header.

* * * * *